United States Patent
Herrick et al.

(10) Patent No.: US 10,641,428 B1
(45) Date of Patent: May 5, 2020

(54) CABLE PULLING SYSTEM AND COMPONENTS THEREFOR

(71) Applicant: RODDIE, INC., Columbia Falls, MT (US)

(72) Inventors: Rod Herrick, Whitefish, MT (US); Jared W Shappell, Kalispell, MT (US)

(73) Assignee: Roddie, Inc., Columbia Falls, MT (US)

( * ) Notice: Subject to any disclaimer, the term of this patent is extended or adjusted under 35 U.S.C. 154(b) by 0 days.

(21) Appl. No.: 16/045,750

(22) Filed: Jul. 26, 2018

Related U.S. Application Data

(63) Continuation of application No. 14/726,546, filed on May 31, 2015, now Pat. No. 10,415,738.

(51) Int. Cl.
| | |
|---|---|
| *F16L 55/18* | (2006.01) |
| *B26D 3/00* | (2006.01) |
| *B66D 1/00* | (2006.01) |
| *F16L 55/165* | (2006.01) |

(52) U.S. Cl.
CPC ............ *F16L 55/18* (2013.01); *B26D 3/001* (2013.01); *B66D 1/00* (2013.01); *F16L 55/1658* (2013.01)

(58) Field of Classification Search
CPC .................................. H02G 1/081; F16L 1/028
See application file for complete search history.

(56) References Cited

U.S. PATENT DOCUMENTS

| | | |
|---|---|---|
| 6,305,880 B1 | 10/2001 | Carter |
| 6,357,967 B1 | 3/2002 | Putnam |
| 6,672,802 B2 | 1/2004 | Putnam |
| 6,799,923 B2 | 10/2004 | Carter |
| 6,913,091 B2 | 7/2005 | Wentworth et al. |
| 7,284,624 B2 | 10/2007 | Tjader |
| 8,414,225 B2 | 4/2013 | Tjader |
| 8,540,458 B2 | 9/2013 | Herrick |
| 8,702,349 B2 | 4/2014 | Carter |
| 8,784,009 B2 | 7/2014 | Tjader |
| 8,979,435 B2 | 3/2015 | Wentworth |
| 2002/0081154 A1 | 6/2002 | Herrick et al. |
| 2006/0088384 A1 | 4/2006 | Putnam |
| 2008/0181728 A1 | 7/2008 | Wentworth et al. |
| 2012/0321391 A1* | 12/2012 | Herrick ............... F16L 55/1658 405/184.3 |
| 2014/0241812 A1 | 8/2014 | Herrick |

* cited by examiner

*Primary Examiner* — Sean D Andrish
(74) *Attorney, Agent, or Firm* — Robin Kelson Consulting, Inc.

(57) ABSTRACT

Cable pulling systems and methods of use are provided suitable for trenchless cable pulling applications, including bursting head applications for laying down replacement pipe underground. A chassis is provided that accommodates laterally disposed piston assemblies, both single cylinder and dual cylinder closed path piston assemblies. Also provided are quick release manifolds for cable holding grippers and cable pulling grippers for use with both single cylinder and dual cylinder piston assemblies. A chassis and cable pulling system also are provided for trenchless pipe extraction applications and which accommodate closed path piston assemblies. Small and large pipe diameter bursting head devices also are provided with integrated cable gripping and release assemblies. Also provided are methods for sealing cable ends.

27 Claims, 33 Drawing Sheets

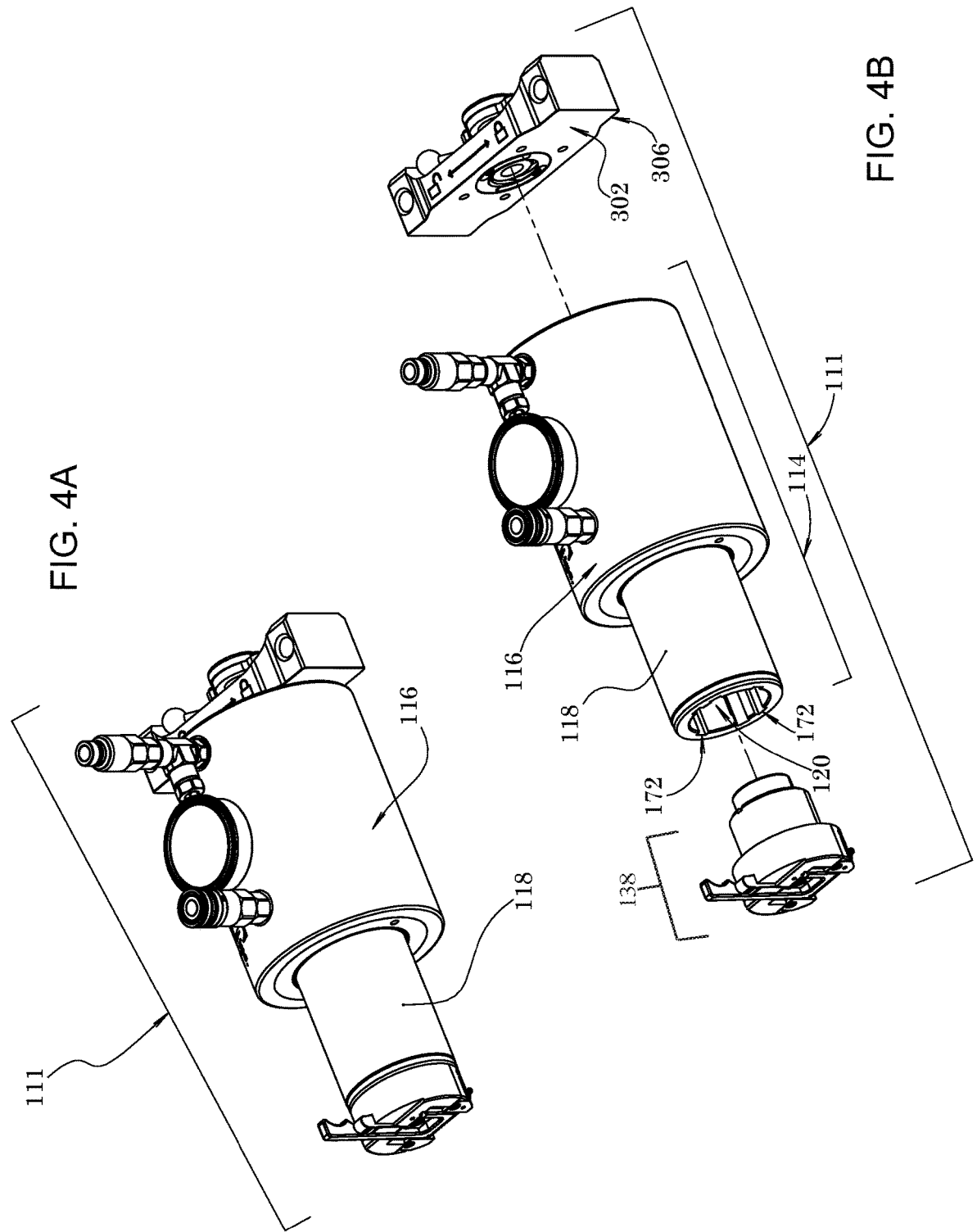

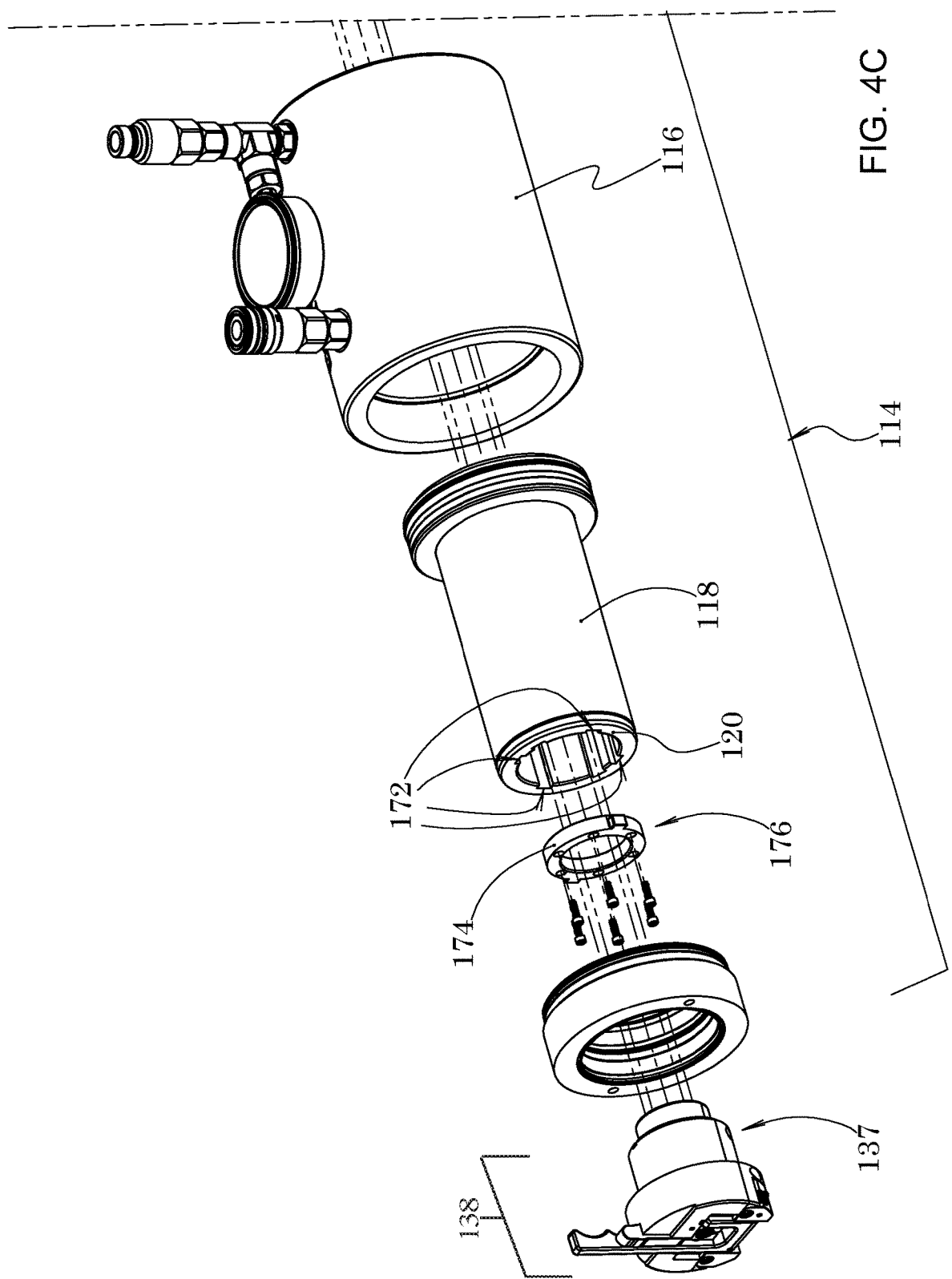

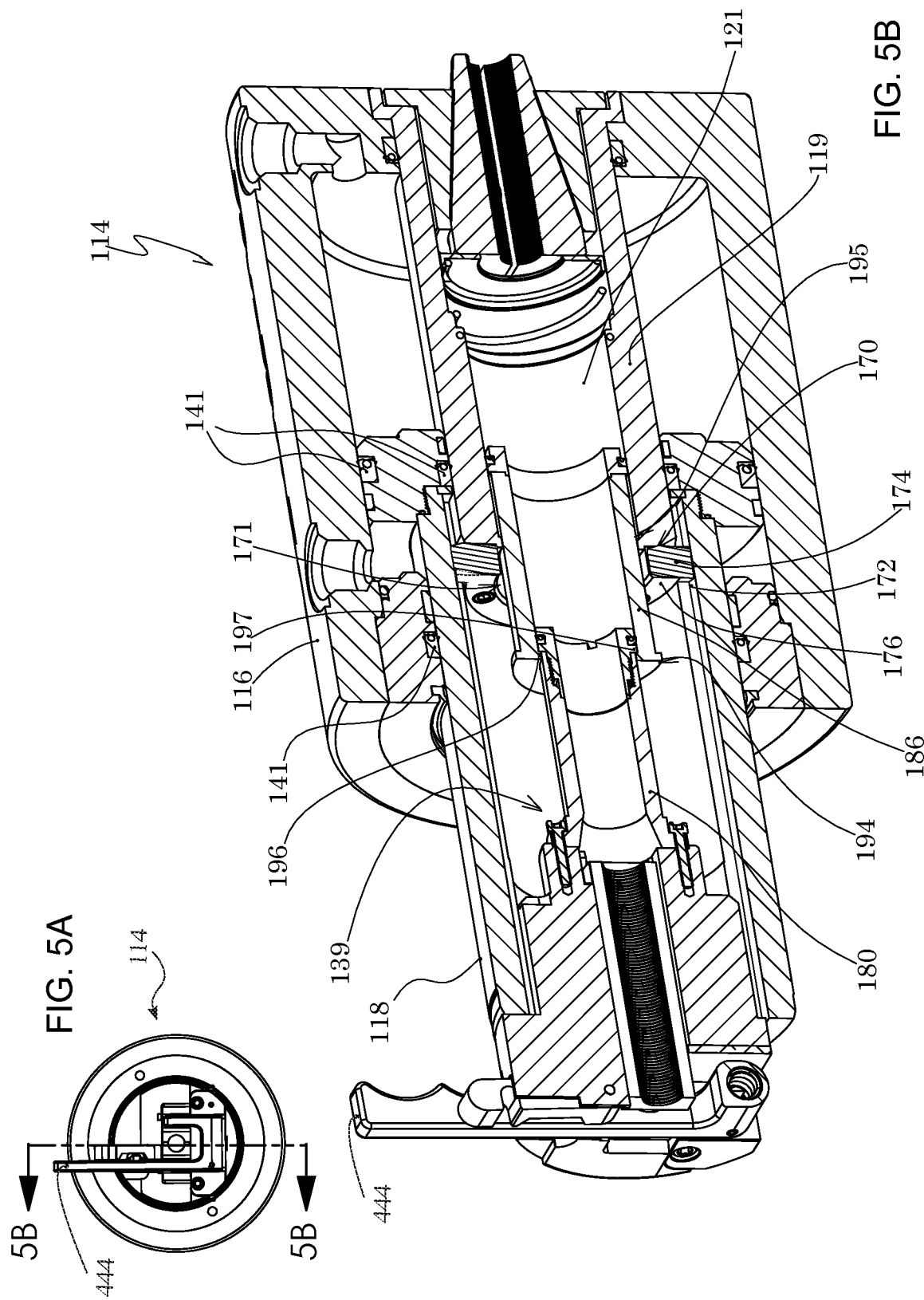

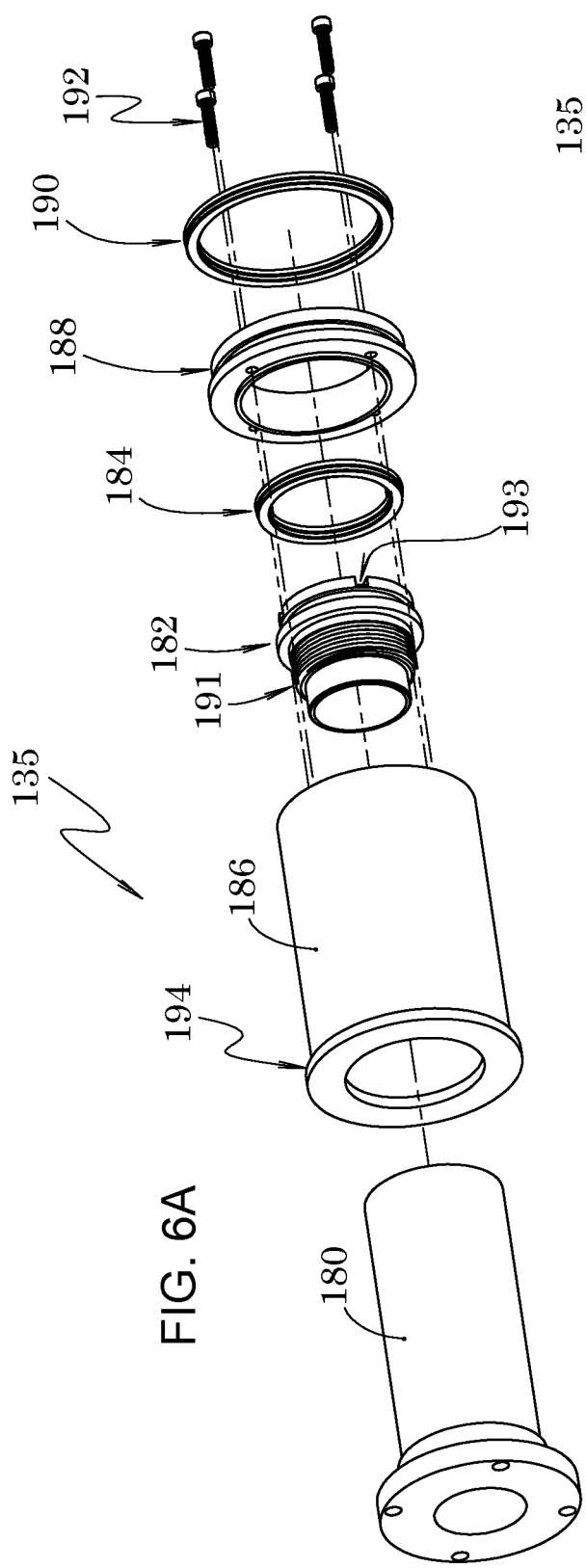
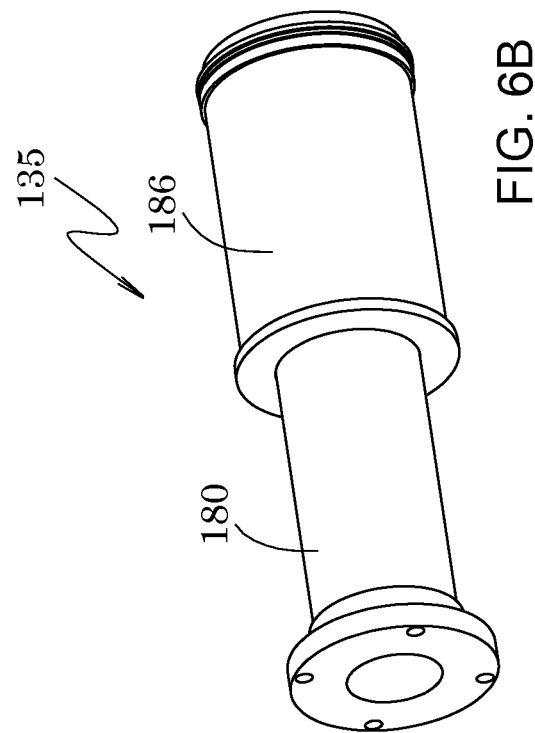
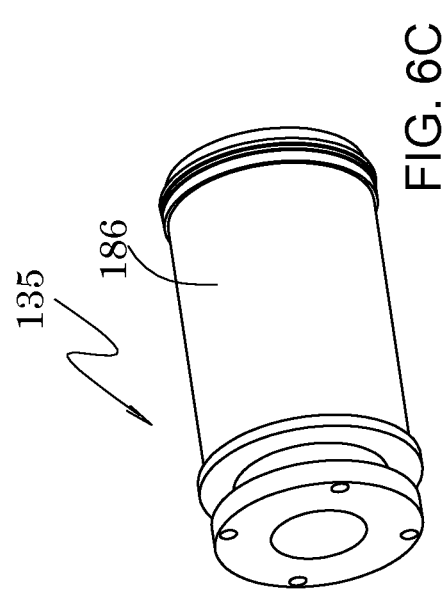
FIG. 6A
FIG. 6B
FIG. 6C

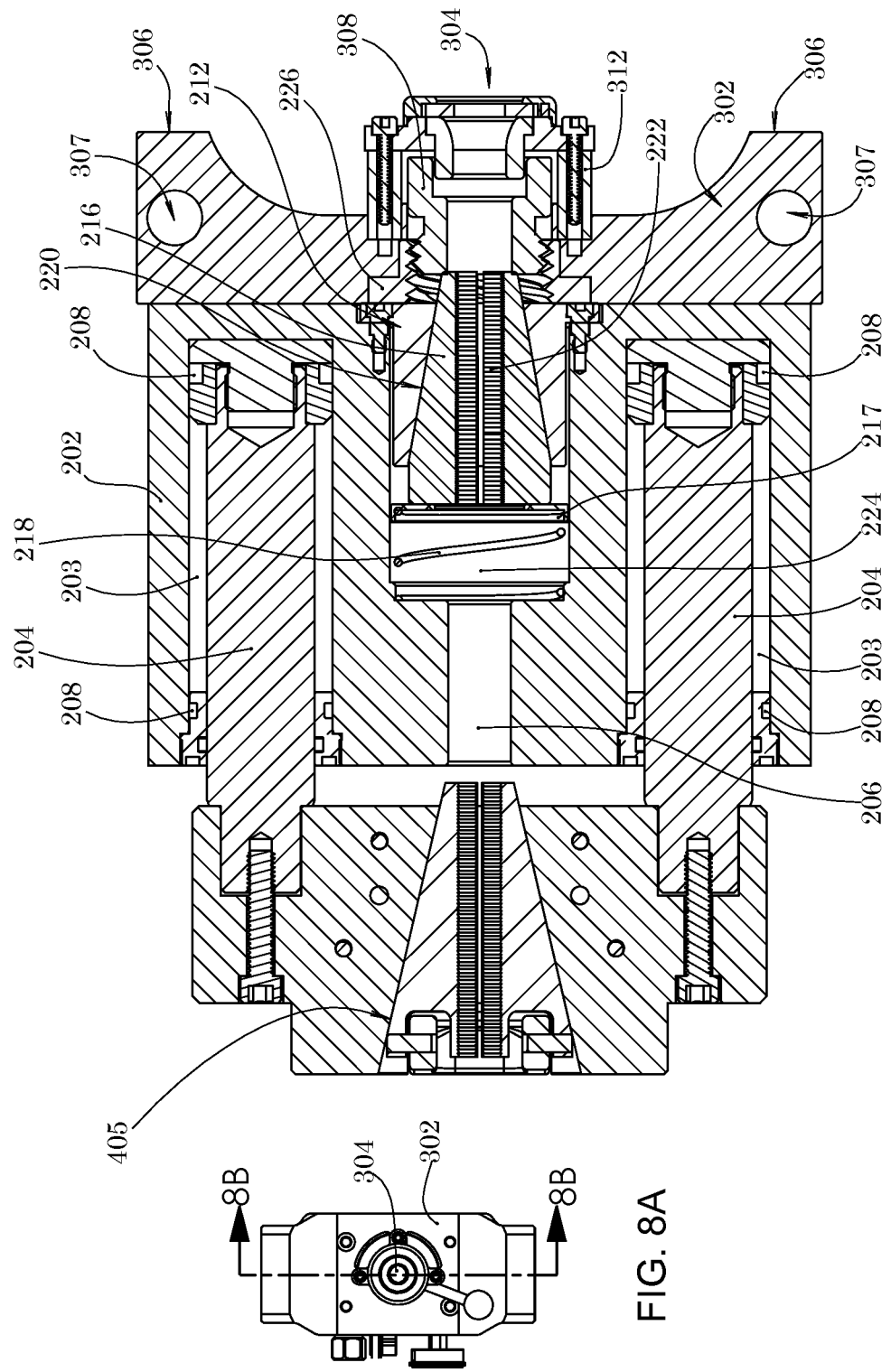

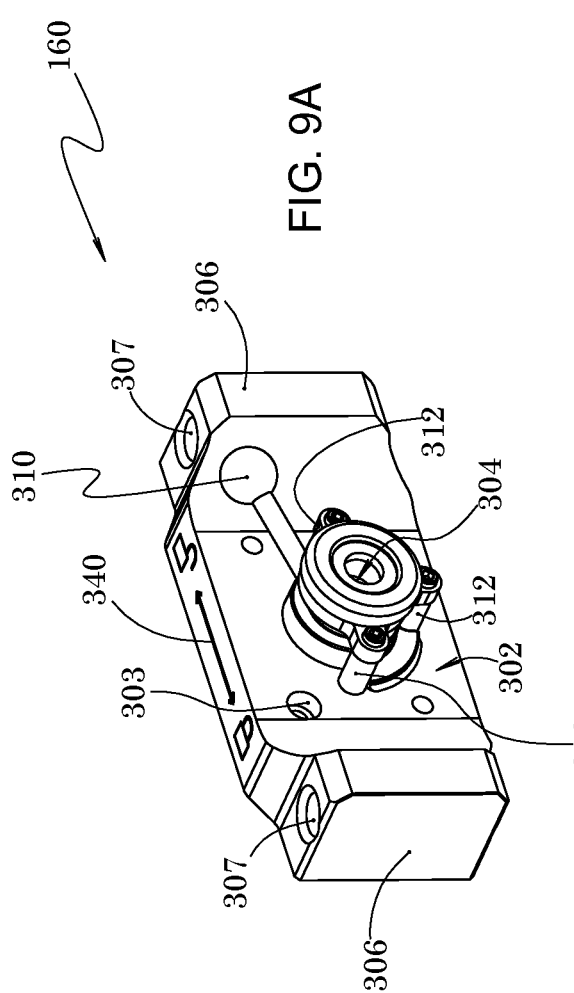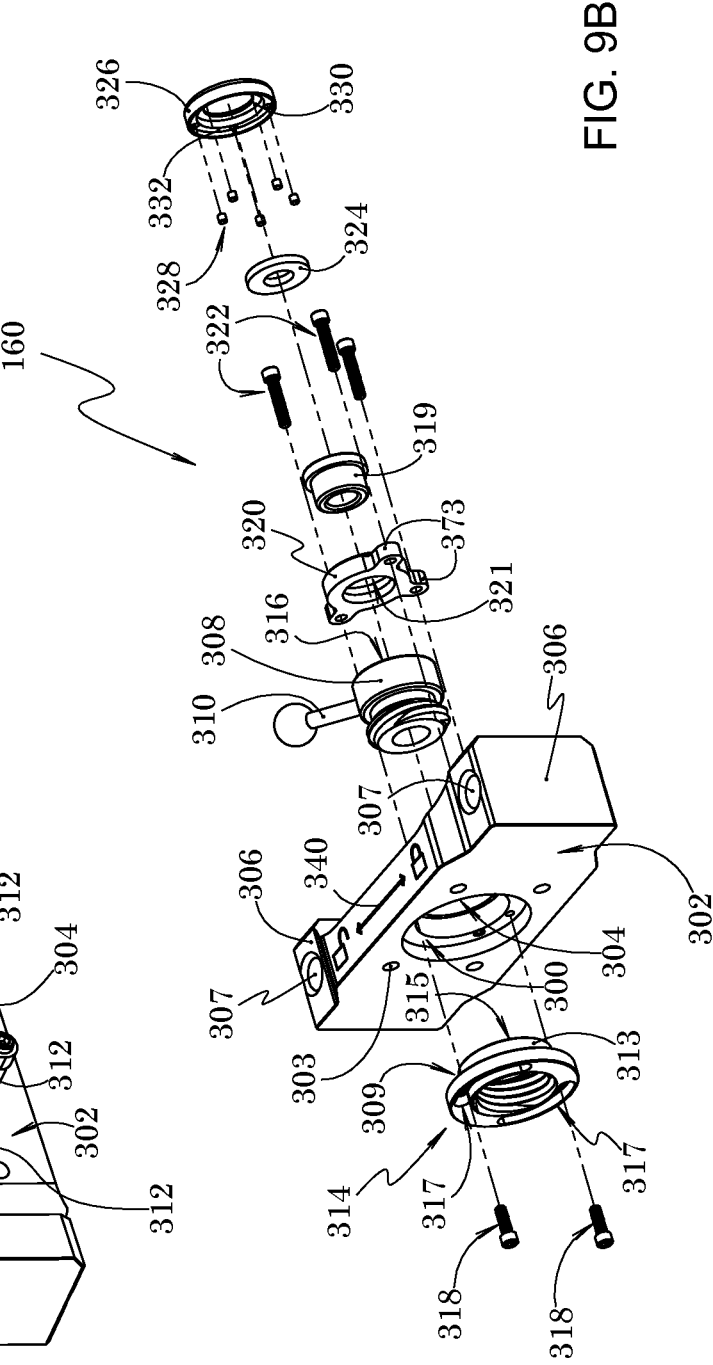

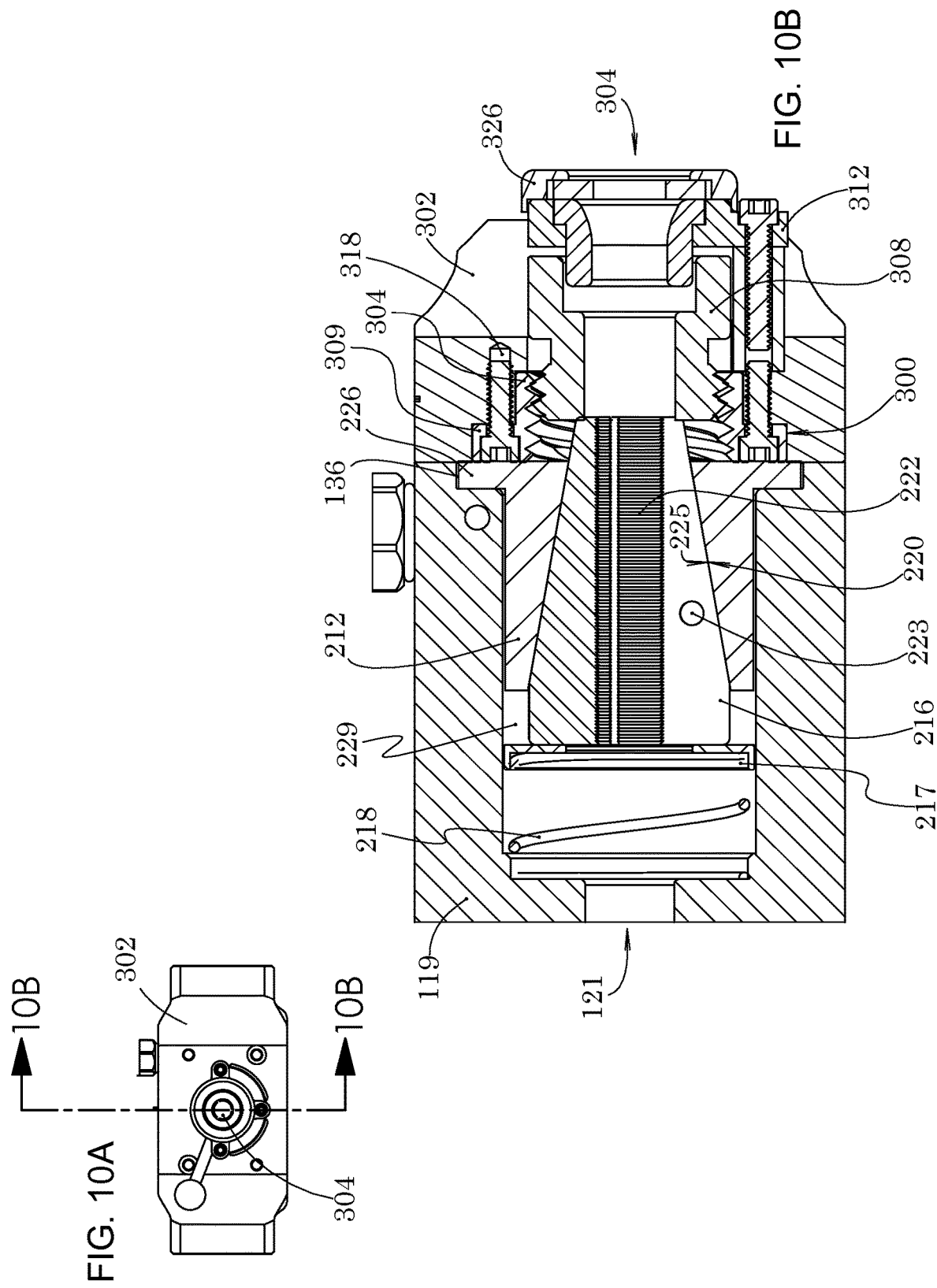

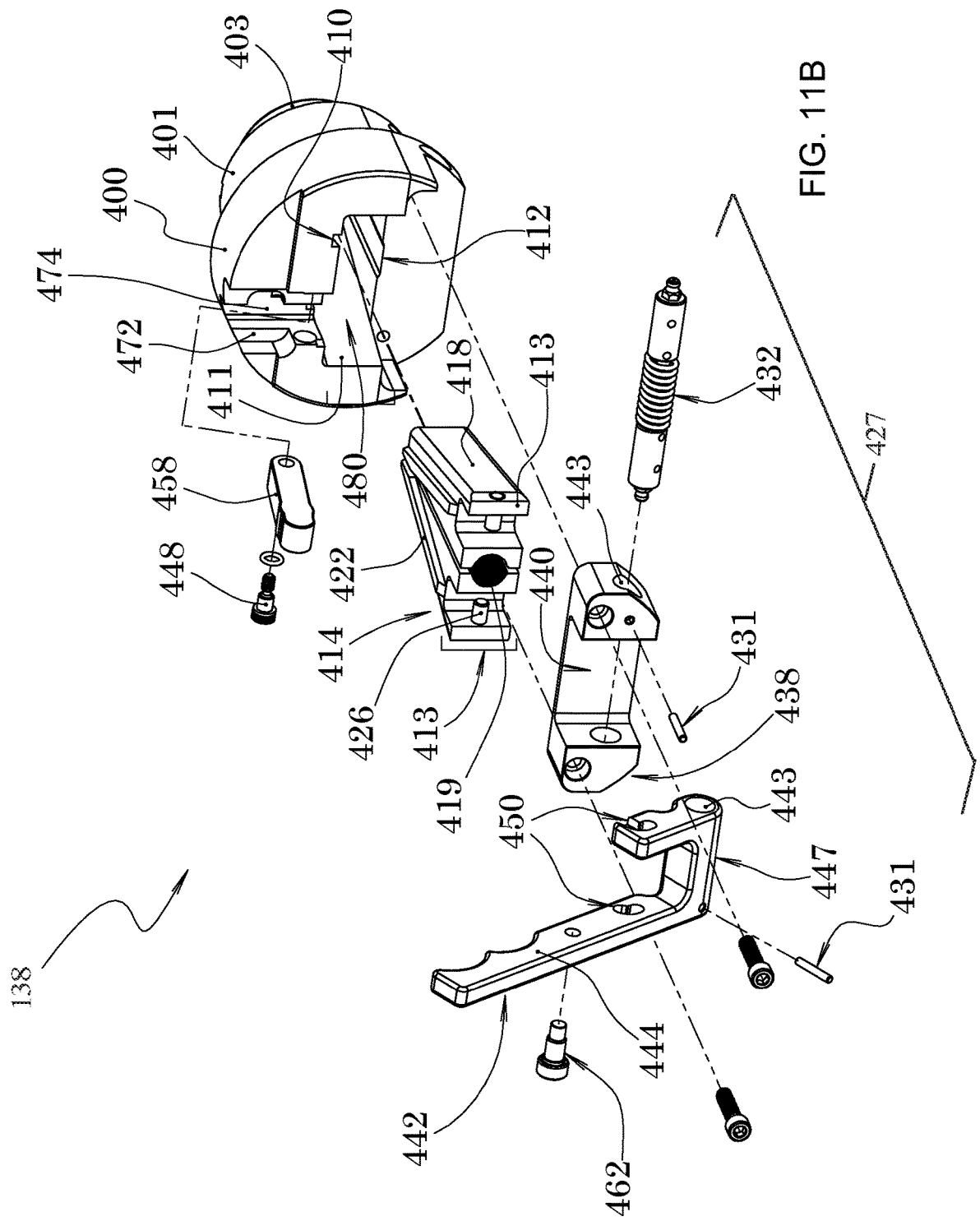

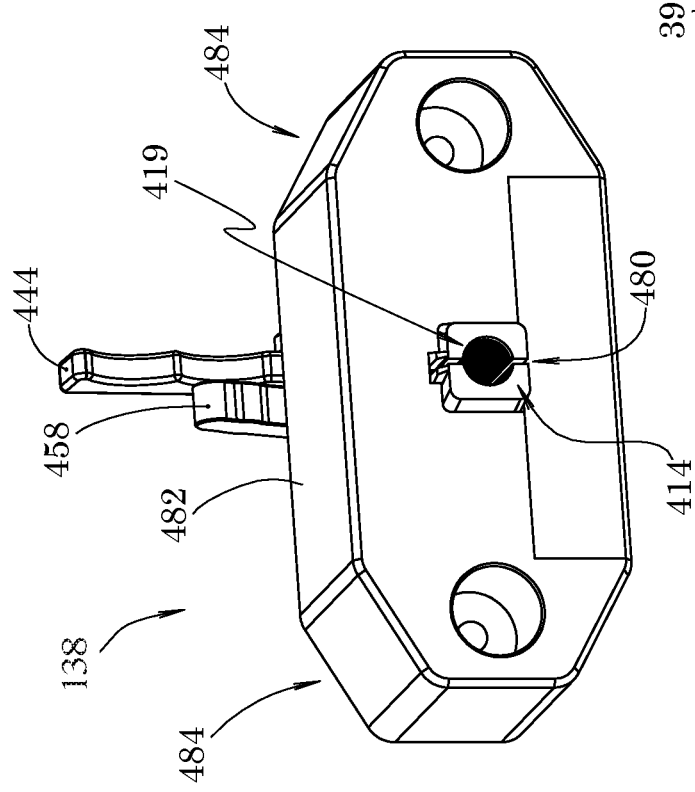
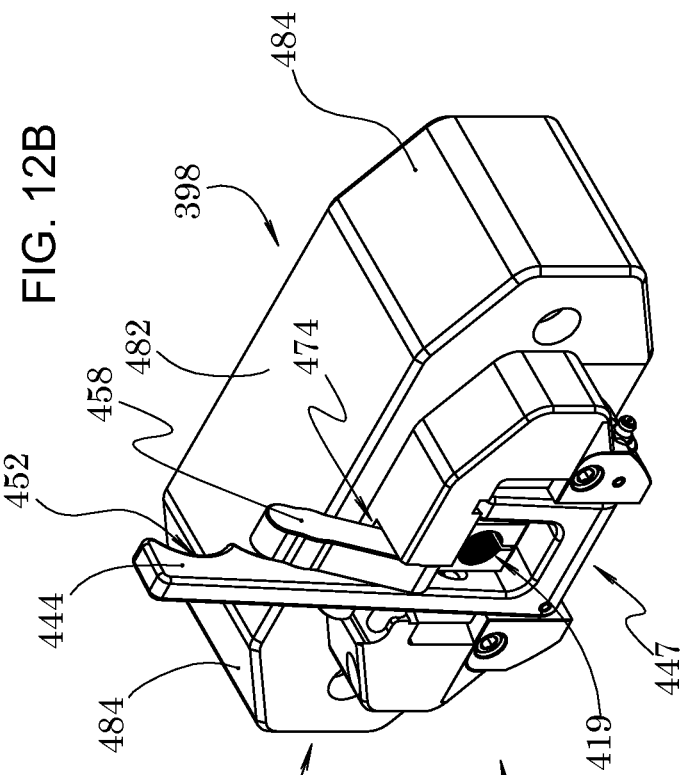

CABLE PULLING SYSTEM AND COMPONENTS THEREFOR

CROSS REFERENCE TO RELATED APPLICATIONS

This application claims the benefit of patent application U.S. Ser. No. 14/726,546, filed May 31, 2015, the disclosure of which is hereby expressly incorporated in its entirety by reference herein.

FIELD OF USE

Embodiments of the present disclosure find applicability in the field of systems designed to pull cable and/or pipe, particularly for pulling cable and/or pipe through space underground. One useful field includes systems for bursting and placing gas, water, sewer or other underground pipes.

BACKGROUND

Trenchless cable pulling systems and trenchless pipe bursting/pipe replacement systems are a fast growing standard in the pipe replacement industry. Such "trenchless" systems require only two pits to be dug, one at each end of the pipe to be replaced. One end of a pulling cable is attached to the front end of a bursting pipe head device, and the other end is threaded through the existing pipe from an entry point accessible in the entry pit and provided to a pulling apparatus located in the exit pit. The pulling apparatus then pulls the cable and the attached bursting pipe head device through the existing cable, typically by a hydraulic mechanism which may be electrical or gas-powered. The bursting pipe head device bursts or fractures the existing pipe as it is pulled through, and brings with it replacement or product pipe attached at the back end of the bursting pipe head device. Pat. Nos. US Patent Application Publications US 2002/0081154; US 2006/0088384; US 2008/0181728; US 2104/0241812; and U.S. Pat. Nos. 6,305,880; 6,357,967; 6,672,802; 6,913,091; 6,799,923; 7,284,624; 8,414,225; 8,540,458; 8,702,349; 8,784,009; and 8,979,435 are representative of the state of the art.

There is an on-going desire to improve these trenchless pulling systems, including to: (1) minimize the size of the pits to be dug; (2) reduce the weight and size of the pulling apparatus; (3) provide maximum flexibility for hydraulic power sources; (4) enhance cable fidelity and minimize breakage or binding during the cable pulling process; (5) increase the facility and ease for engaging cable with and disengaging cable from both the pulling apparatus and the bursting head; (6) increase the facility and ease for cable disengagement for large and small pipe diameter bursting heads; (7) increase the facility and ease of maintaining and using small and large pipe diameter bursting pipe head devices; and (8) managing pipe extraction in small diameter pipe replacement applications.

The present disclosure describes improvements in cable pulling systems and methods and trenchless replacement pipe pulling systems and methods that overcome deficiencies in the systems and methods of the prior art.

SUMMARY

This summary is provided to introduce a selection of concepts in a simplified form that are further described below in the Detailed Description. This summary is not intended to identify key features of the claimed subject matter on its own, nor is it intended to be used on its own as an aid in determining the scope of the claimed subject matter or to limit the scope of the claimed subject matter. Similarly, the advancements to the art provided by the disclosure made herein are not limited to implementations that address the particular techniques, tools, environments, disadvantages, or advantages discussed in the Background, Detailed Description or attached drawings.

Provided herein are cable pulling systems, apparatuses, components and methods of use therefor suitable for trenchless cable pulling applications, including bursting head applications for laying down replacement pipe underground. In one embodiment, a chassis and system are provided that accommodate laterally disposed piston assemblies, including single cylinder or dual cylinder closed path piston assemblies. In another embodiment, improvements in single and dual cylinder piston assemblies suitable for cable pulling systems are provided. These improvements include single cylinder piston assemblies with internal debris containment systems and with internal anti-rotation assemblies. In another embodiment, improvements in dual cylinder piston assemblies are provided, including for laterally disposed assemblies and closed path assemblies, including closed pathway high pressure dual cylinder ram systems. Also provided are quick release manifolds for cable holding grippers and for cable pulling grippers for use with both single cylinder and dual cylinder piston assemblies. A chassis and cable pulling system also are provided for trenchless pipe extraction applications and which accommodate closed path piston assemblies. Small and large pipe diameter bursting head devices also are provided with integrated cable gripping and release assemblies. In one embodiment these integrated assemblies do not require tools to initiate cable gripping or release. Also provided are methods for sealing cable ends.

In one aspect, a detachable pipe splitting tool for cutting coaxial pipe extruded together with a cable being pulled through space and method of use therefor are provided. The tool comprises (a) means for receiving a cable being pulled through space; (b) means for guiding a coaxially located pipe surrounding the cable to at least one cutting blade distal to the cable receiving means, such that as the cable is pulled through the cable receiving means the pipe is split by the cutting blade; and (c) means for removably attaching the pipe splitting tool to a rigid surface such that the tool extends perpendicularly from that surface. In another embodiment, the pipe splitting tool attaches to the rigid surface by magnetic means.

In another aspect, a method for sealing a cable end is provided comprising the steps of: (1) girdling a cable perimeter near the end to be sealed so as to remove a portion of the cable outer perimeter and expose a central stem; (2) providing a metal cuff having an interior diameter dimensioned to receive the exposed stem and an outer diameter substantially equal to the cable outer perimeter; (3) placing the cuff over the stem; and (4) providing a bonding material in liquid form to the interface of the cable outer perimeter and the cuff, the bonding material having a liquid and a solid form, such that the bonding material infiltrates the interface and the cuff interior and bonds the stem and cable interface to the cuff when the bonding material solidifies. In one embodiment, the bonding material can be a soldering material.

In another aspect, an integrated cable clamping and release mechanism useful in a bursting head device is provided, the mechanism comprising (a) a gripper component comprising a plurality of gripper members, each member having an inner cable gripping surface, an outer tapered surface dimensioned to interact with a tapered interior surface of a bursting head cone, and opposing member adjoining surfaces having an indexed magnet embedded therein and competent to repel a magnet on an adjoining surface; (b) a rigid component removably coupled to the distal end of the gripper component and having an axial cavity dimensioned to receive a cable; and (c) means for actuating longitudinal movement of the integrated cable clamping and release mechanism in the bursting head, the actuating means being attached to the distal end of the rigid component and having an operational end on the distal exterior surface of the bursting head, such that the actuating means can cause the gripper component to grip a cable surface by initiating forward movement of the integrated mechanism in the bursting head cone. The actuating means also can cause the gripper component to release the cable by initiating rearward movement of the integrated mechanism in the bursting head cone. In one embodiment the structural component coupling comprises an interlocking lip and groove mechanism. In another embodiment, the longitudinal movement of the integrated mechanism initiated by the integrated actuating means occurs by rotational movement of the rigid component along a threaded channel in the bursting head device and engaged with the outer surface of the rigid component. In still another component, the threaded channel occurs in a bursting head device endcap. In another embodiment, the integrated actuating means operational end can comprise a handle or a hex screw.

In another aspect, a pipe extraction apparatus comprising a chassis, a piston assembly competent to pull cable through space, a pulley, and a pipe splitting tool is provided. The chassis comprises a faceplate and a back plate, each defining an aperture for receiving a cable and connected by a plurality of side trusses; an angled shelf assembly extending distally from the backplate and positioned above the backplate aperture, the shelf assembly being configured to receive and hold the piston assembly. In one embodiment, the piston assembly can be a single or dual cylinder closed path assembly. In another embodiment, the pipe extraction apparatus shelf assembly includes means for slidably interconnecting with the piston assembly.

In another aspect, an integrated cable release manifold is provided for a cable pulling device comprising a spring-loaded cable gripping assembly having a cable gripper component with a tapered proximal end and a compression spring component at its distal end. The manifold includes: (a) a housing having an aperture positioned to receive the proximal end of a cable gripper comprising a plurality of gripper members, each member having an inner cable gripping surface and an outer tapered surface dimensioned to interact with a tapered interior surface in the cable pulling device; (b) means for attaching the manifold housing to the cable pulling device, and (c) actuating means for initiating longitudinal movement of the spring-loaded cable gripping assembly rearward in the cable pulling device. In particular, the actuating means can be attached to an outer surface of the manifold and competent to contact the cable gripper proximal end, the contact initiating rearward movement of the gripper away from the tapered interior surface, compression of the distally located spring, and release of the gripper members from the cable surface. In one embodiment the gripper members further comprise opposing member adjoining surfaces having an indexed magnet embedded therein and competent to repel a magnet on an adjoining surface. In another embodiment the actuating means can comprise a multi-lead threaded piston that can contact the proximal gripper end by rotational movement of the piston along a threaded channel in the aperture. In another embodiment, rotation of the threaded piston can be initiated by a lever attached to an outer surface of the threaded piston. In another embodiment, release of the actuating means contact from the gripper component proximal end can initiate decompression of the spring and forward longitudinal movement of the gripper members into the tapered interior and onto the cable surface.

In another aspect, a mechanism for modulating the rearward movement of a cable gripper along a channel in a tapered cavity is provided. Here, the cable gripper comprises a plurality of gripper sections having an inner cable gripping surface and an outer surface comprising a ridge engaged with the channel and allowing travel of the gripper section along the channel. The mechanism can include engagement means for removably engaging the cable gripper in the channel, the engagement means comprising a torsion spring activated by the gripper rearward movement when the engagement means is engaged with the gripper, and configured to modulate the speed and distance of the gripper rearward movement in the channel. The mechanism also can include a housing containing the engagement means and comprising means for attaching to the distal end of the tapered cavity. In one embodiment, the gripper can comprise a pin extending out from a surface of the gripper, and the engagement means can include a lever arm defining a catch that engages the pin and can extend rearward with the traveling gripper. In another embodiment, the catch can define an angled channel on the lever arm along which the pin travels during its rearward movement. In another embodiment, the gripper channel comprises a groove in a tapered cavity at the open distal end of a piston rod, such that forward movement of the piston rod initiates rearward movement of the gripper along the channel and off a cable surface; rearward movement of the piston rod initiates forward movement of the gripper along the channel and onto the cable surface, and the engagement means is provided to the open distal cavity in the housing. In another embodiment the gripper comprises two gripper sections, each having a pin, and the engagement means includes two lever arms attached to the torsion spring and configured to catch the pins.

In another aspect a latching means is provided that holds the engagement in an extended position away from the gripper distal end so that the grippers can be removed. In one embodiment, the latching means can include a hinged bar attached to the engagement means housing and having an angled channel that can engage a pin on a lever arm and hold the arm extended.

In another aspect, an internal anti-rotation mechanism useful for an single cylinder piston assembly is provided. In one embodiment the mechanism includes: (a) a hollow piston rod having an axial opening for receiving a cable, the interior surface of the piston rod being dimensioned to receive a shaft and allow longitudinal movement of the piston rod along a portion of the shaft's outer surface, and the piston rod interior surface further comprising a slot along its longitudinal axis; and (b) a hollow shaft dimensioned to fit in the hollow piston rod and having an axial opening for receiving a cable, and comprising a protrusion extending perpendicularly from the shaft outer surface and dimensioned to fit in the slot, such that lateral rotation of the piston rod relative to the shaft is inhibited as the piston rod travels longitudinally along the shaft. In one embodiment the piston rod interior surface comprises a plurality of channels and the shaft outer surface includes a matching number of protrusions.

In another aspect, an internal cable debris containment mechanism useful in a single cylinder piston assembly is provided. The mechanism can include a telescoping hollow channel dimensioned to allow cable passage therethrough to the interior of the piston rod, such that the distal end of the shaft is coupled to the distal end of the piston rod, and cable debris in the shaft interior is prevented from entering the piston rod interior.

In another aspect a closed pathway dual cylinder piston assembly for pulling cable through space is provided. The piston assembly can include a housing, two piston rods, a cable holding gripping assembly and manifold, and a cable pulling gripping assembly and manifold. In particular, the piston assembly housing can include: (1) two laterally disposed cylindrical cavities having axial openings at the distal end of the housing and dimensioned to receive two piston rods; and (2) a central axial channel positioned between the cavities and dimensioned to receive a cable. In addition, the cable holding gripper assembly can be positioned at the proximal end of the housing cable channel and configured to grip a cable surface during a piston recovery stroke. The holding cable gripper manifold can be positioned anterior to the holding gripper and provide means for coupling the assembly to a frame and means for releasing the gripper from a cable surface. The cable pulling gripper manifold can be attached to the free axial distal ends of the piston rods in the assembly and can comprise a cable pulling gripping assembly aligned with the assembly housing's central axial channel and configured to grip a cable surface during a piston pulling stroke, and release the cable during the recovery stroke.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, where like-numbered parts reference like-membered components and wherein:

FIGS. 6A-6C are perspective views of an internal wiper system;

FIGS. 8A and 8B are a general view (8A) and a cross section view (8B) of the same closed path dual cylinder piston assembly;

FIGS. 9A and 9B are perspective views of an assembled (9A) and an exploded (9B) front holding gripper manifold;

FIGS. 10A and 10B are a general view (10A) and a cross section view (10B) of a front holding gripper manifold;

FIGS. 11A-11D are assembled (11A), exploded (11B), rear (110) and cross section (11D) views of a front holding gripper manifold for a single cylinder piston assembly;

FIGS. 12A-12D are rear (12A), perspective (12B), exploded top (12C), and exploded bottom (12D) views of a front holding gripper manifold for a dual cylinder piston assembly;

DETAILED DESCRIPTION

Figure 1A:
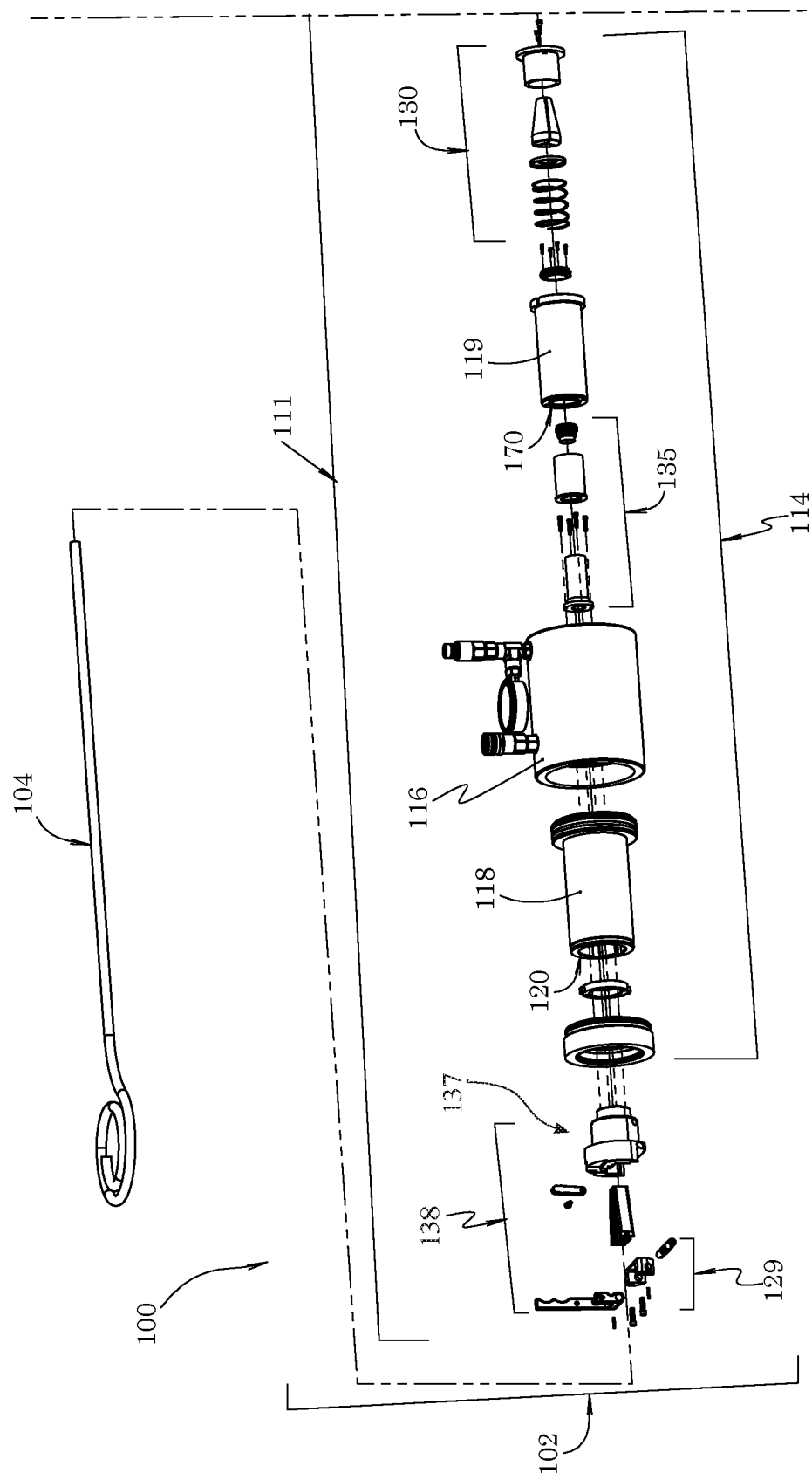
FIGS. 1A and 1B are exploded perspective views of a cable pulling system with a single cylinder piston assembly.

Embodiments of the present disclosure provide devices, components, mechanisms and methods of use directed to systems for pulling a cable or pipe through space. Of particular applicability are trenchless systems for pulling a cable or pipe through space underground, including trenchless systems for pulling cable or replacement pipe through an existing underground pipe.

Terms and Definitions

As used herein, the terms "chassis" and "frame" can be used interchangably and refer to a rigid structure typically designed to provide support. As used herein, the terms "channel" or "groove" or "keyed path" can be used interchangably and refer to a slot in a first component that accommodates a second component having a ridge that fits in the slot to couple both components. If desired, the slot can also allow the second component to travel along the path created by the slot in the first component. The terms "axial opening" and "aperture" both refer to an opening. The terms "cylinder" and "barrel" both refer to a tubular shape with a central channel.

Materials

A range of suitable materials useful in the manufacture of the systems, apparatuses and components disclosed herein are well known in the art and can be used, as will be appreciated by those having ordinary skill in the art. Material choice will depend on the functionality of the item and the corresponding need for durability, strength and weight. For example, choosing an aluminum material, particularly a high strength aluminum, for components benefiting from low weight, such as, for example, lateral piston assembly frame 110 or piston housings 116 or 202, can be used to advantage. One useful such material includes 70/75 aluminum. For other components a steel, including a mild steel, stainless steel or heat-tempered steel, can provide the desired characteristics.

The systems, components and methods of use are described hereinbelow in the following order:
I. Overall Cable Pulling System
II. Chassis for Lateral Piston Assembly
III. Internal Anti-Rotation Single Cylinder Piston & Wiper Assembly
IV. Closed Path Dual Cylinder Piston Assembly
V. Holding Gripper Assembly
VI. Holding Gripper Quick Release Manifold
VII. Rear Pulling Gripper and Cable Release Latch Assembly
VIII. Small Diameter Pipe Extraction Chassis
IX. Rear Cable Release Pipe Bursting Head
X. Sealed Cable Ends
XI. Method of Operation I. Overall Cable Pulling System Referring to FIGS. 1A, 1B, 2A and 2B, two embodiments of a cable pulling system in accordance with the present disclosure are shown. The system 100 can include a cable pulling apparatus 102, which can pull a cable 104. In these illustrated embodiments, cable 104 is attached to a bursting head 106 and replacement pipe attachment assembly 108. As pulling apparatus 102 pulls bursting head 106 through space underground, such as through an existing pipe underground (not shown), bursting head 106 can burst the existing pipe and replacement pipe (not shown) can be pulled into place inside the void left by bursting head 106.

Figure 1B:
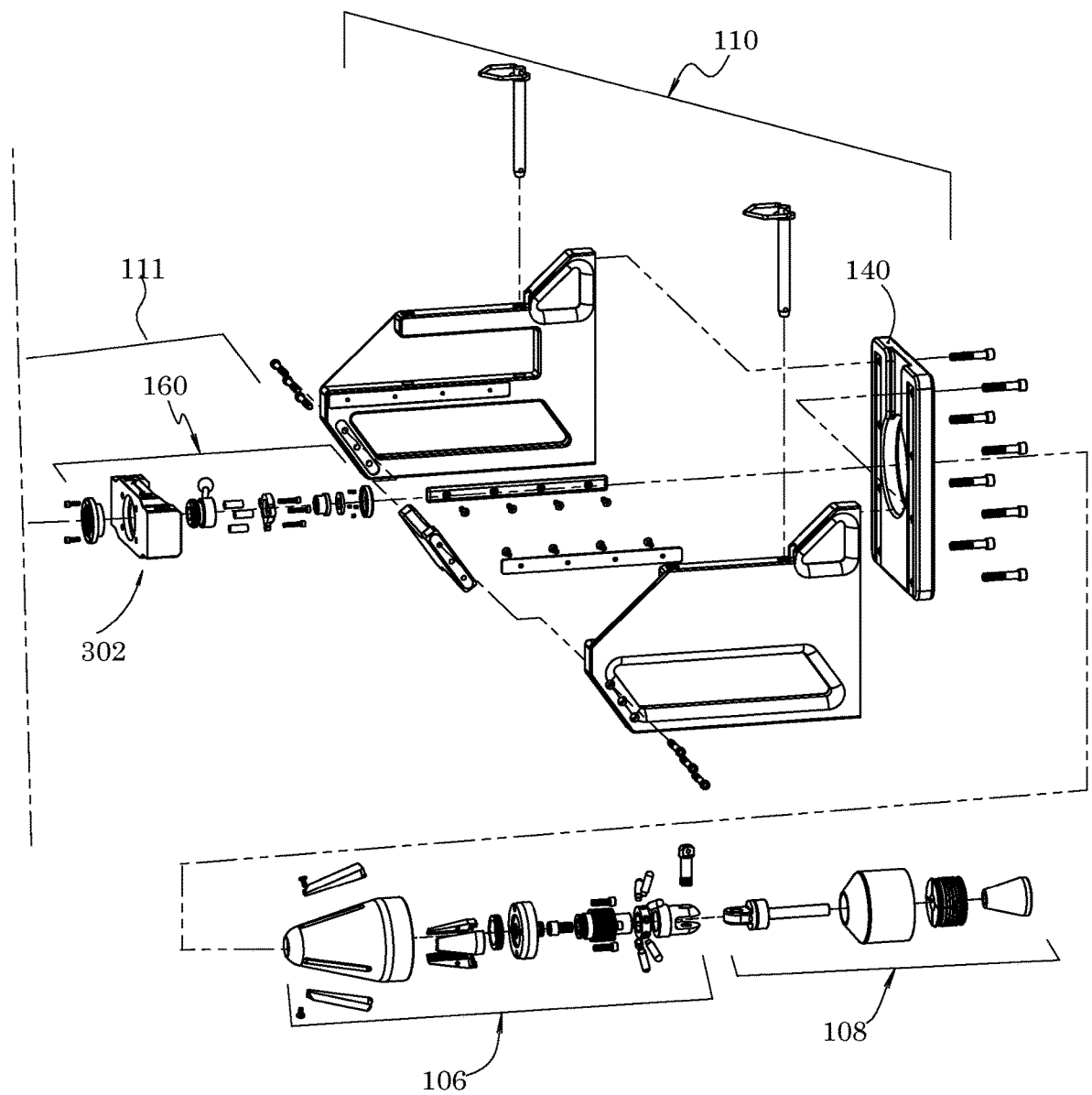
Figure 2A:
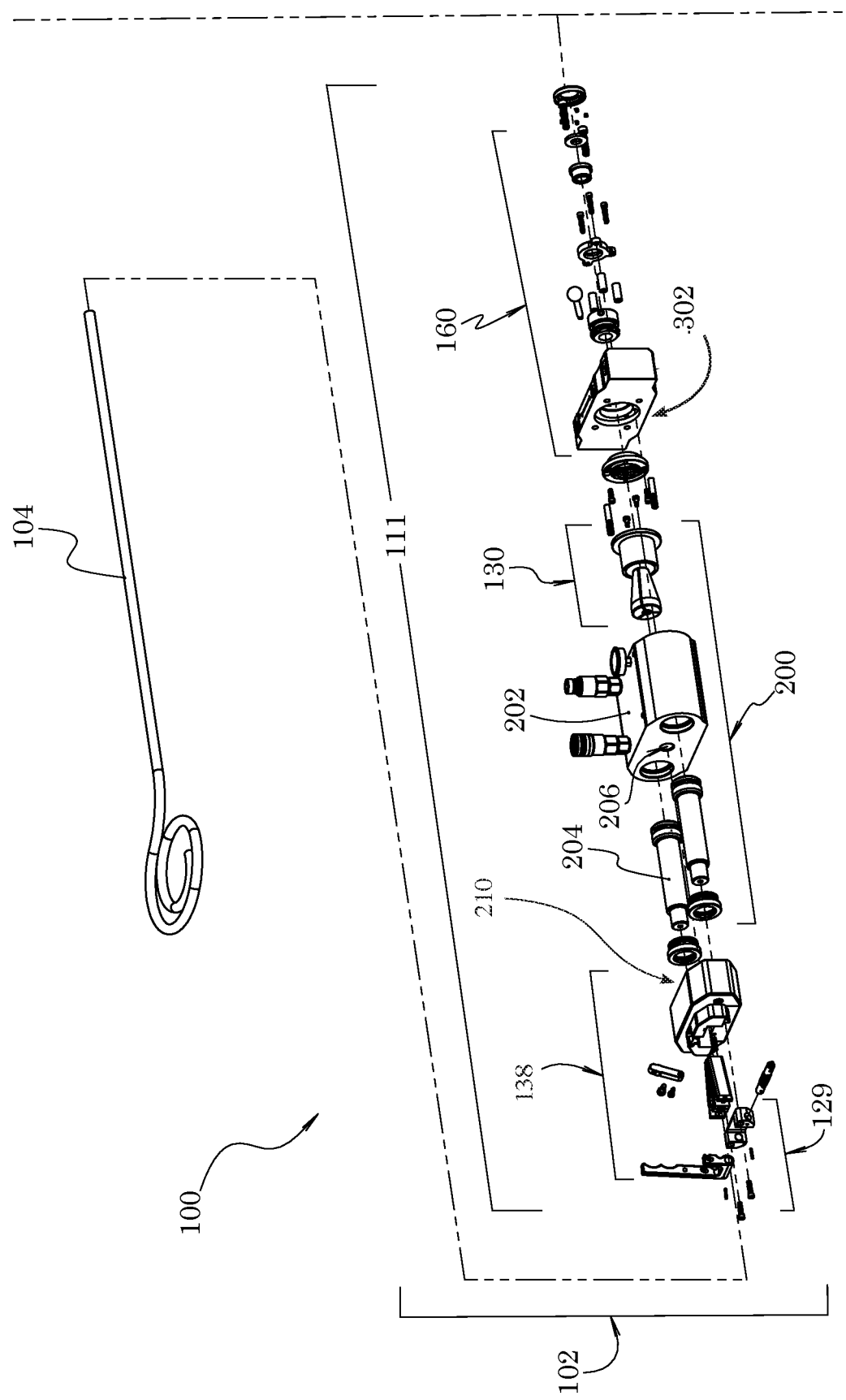
FIGS. 2A and 2B are exploded perspective views of a cable pulling system with a closed path dual cylinder piston assembly.
Figure 2B:
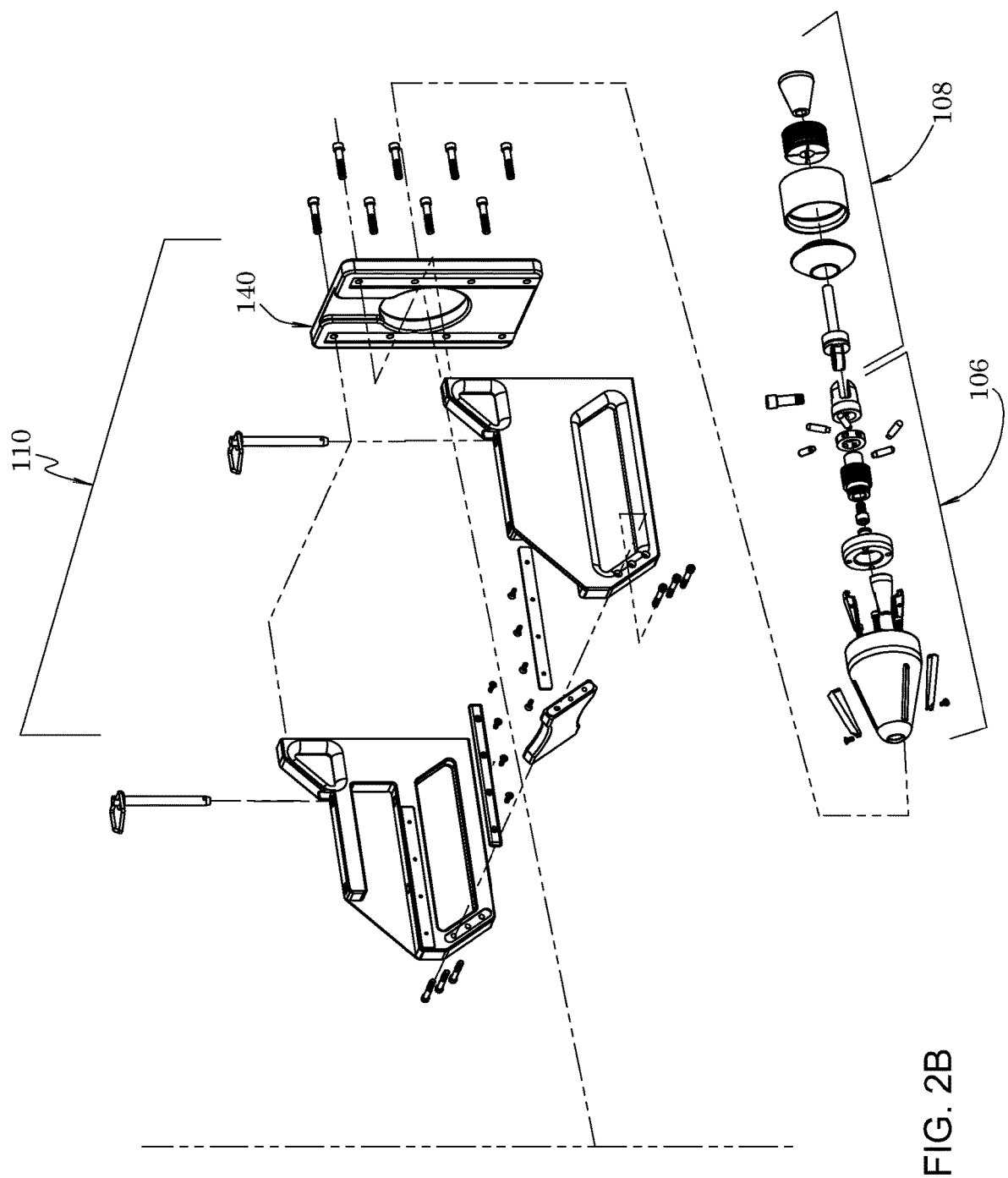

The pulling apparatus 102 can include a frame 110 that supports a laterally positioned piston assembly 111. Frame 110 can include a faceplate 140. Unless otherwise noted, throughout this detailed description, faceplate 140 identifies the front or anterior orientation of system 100 and its components. Piston assembly 111 may be a single or multiple cylinder assembly (see below). In FIGS. 1A and 1B piston assembly 111 includes a closed path single cylinder center hole piston assembly 114 having an outer barrel housing 116, an internal piston rod or cylinder 118 and a shaft 119. Piston rod 118 defines an axial hole or channel 120 extending through piston rod 118 dimensioned to allow cable passage therethrough and an internal front holding gripper system 130 configured to grip cable 104 and hold it through the piston recovery stroke. Piston assembly 114 further can include an internal telescoping wiper system 135 for keeping debris from impacting the piston mechanism. In FIGS. 2A and 2B the piston assembly is a closed path dual cylinder piston assembly 200 comprising a housing 202 that encases two piston cylinders 204 flanking a central channel 206 for cable passage through housing 202, at least part of the channel having an inner surface dimensioned to receive a front cable holding gripper assembly 130 configured to grip cable 104 and hold it through the piston recovery stroke. This recovery occurs in response to repeating pulling strokes of piston rod or cylinder 118 or 204 in a pulling direction, each pulling stroke being followed by a recovery stroke of piston rod or cylinder 118 or 204 in a recovery direction that is opposite the pulling direction. In dual cylinder piston assembly 200, piston cylinders 204 operate in tandem.

Piston assembly 111 further includes rear pulling gripper assembly 138 for pulling cable 104 during the piston pulling stroke and releasing cable 104 during the piston recovery stroke. In FIG. 1 rear pulling gripper assembly 138 includes a manifold 137 configured for a single cylinder piston assembly 114. In FIG. 2, rear pulling gripper assembly 138 includes a manifold 210 configured for a dual cylinder piston assembly 200. Rear pulling gripper assembly 138 further can include a spring tension latch system 129 configured to release the rear pulling grippers from assembly 138.

A piston assembly 111 further can include a front manifold assembly 160 which provides means for moving holding gripper system 130 into position for gripping cable 104, or out of position so cable can be released from pulling apparatus 102. Holding gripper system 130 is configured to grip cable 104 and hold it during a piston recovery stroke, and to let cable 104 slide during the pulling stroke.

Pulling apparatus 102 has the advantage of providing a frame 110 adapted for different laterally positioned piston assemblies, including single and dual cylinder assemblies. Laterally positioned piston assemblies have the advantage of not requiring a pulley to redirect cable 104 before cable 104 reaches the piston assembly and pulling gripper assembly. Not requiring a pulley and a structure to hold a vertically positioned piston assembly in place can reduce system cost and weight, and reduce the size of the exit pit to be dug. It also can increase cable life and integrity for a given cable type.

The subject matter defined in the appended claims is not necessarily limited to the benefits described herein. A particular implementation of the advancements to the art disclosed herein may provide all, some or none of the benefits described herein. Although operations for the various techniques may be described herein in a particular sequential order for the sake of presentation, it will be understood that this manner of description encompasses rearrangements in the order of operations, unless a particular ordering is required. For example, operations or acts described sequentially may in some cases be rearranged or performed concurrently.

Components of the cable/pipe pulling system 100 will now be described. It should be understood that this description and the accompanying illustrations depict several examples of a cable pulling system, pipe bursting apparatus and methods of use, and changes may be made to the structure and function of the system and apparatus without departing from the essence to the advancements to the art made by the disclosure herein. Also, some standard features of the system and components therefor (e.g., some screws for securing parts together, etc.) may not be described in detail for the sake of brevity and clarity in the description. Those skilled in the art will understand their inclusion.

II. Chassis for Lateral Piston Assembly

Useful cable pulling and replacement pipe pulling systems typically utilize a hydraulic cylinder or piston mechanism, also known in the art as a ram puller, to pull a cable. Many cable pulling systems in the art utilize a dual cylinder piston assembly. Dual piston assemblies of the art typically have an open pathway, with the cable exposed between the two cylinders. Generally, although not always, the dual piston assembly is configured in a vertical position, perpendicular to the ground and supported by a frame extending up from the exit pit. The cable exiting the existing pipe underground pipe horizontally into the exit pit is maneuvered up between the open path cylinders, typically by means of a pulley, and is held in place by a cable pulling gripping system. U.S. Pat. Nos. 6,305,880; 6,672,802; and 6,799,923 are representative of this art. Where dual piston assemblies are configured in a lateral position, the cylinders are dimensioned and spaced to allow a bursting head to be pulled out of the ground and into the space between them. U.S. Pat. No. 8,702,349 is representative of this art.

Dual cylinder piston assemblies useful for pulling cable generally use high pressure to drive the cylinders (on the order of 10,000 psi) and can run on smaller-sized power sources as compared with a single cylinder system which generally uses low pressure (on the order of about 3,000 psi). Disadvantages of vertical systems in the art are that they tend to be large and heavy, making them particularly difficult to use in small spaces such as basements, crawl spaces, man holes, and septic tanks. They also can be difficult to angle appropriately and can require additional frame structure to hold the pistons in place. Vertical systems also require cable to be angled vertically, typically by means of a pulley. This can impact the cable's integrity, depending on the angle used, cable size and pulling requirements of the system. In laterally positioned open pathway dual cylinder systems of the art, access to the bursting head can be cumbersome, and larger exit pits than desired may be required. Described below is a compact, lightweight chassis designed to accommodate a laterally positioned ram puller, be it a single or dual cylinder assembly, and wherein the ram puller can be staged for pulling or for easily accessing an extracted bursting head. Many features of chassis 110 are described in U.S. Pat. No. 8,540,458.

Figure 3A:
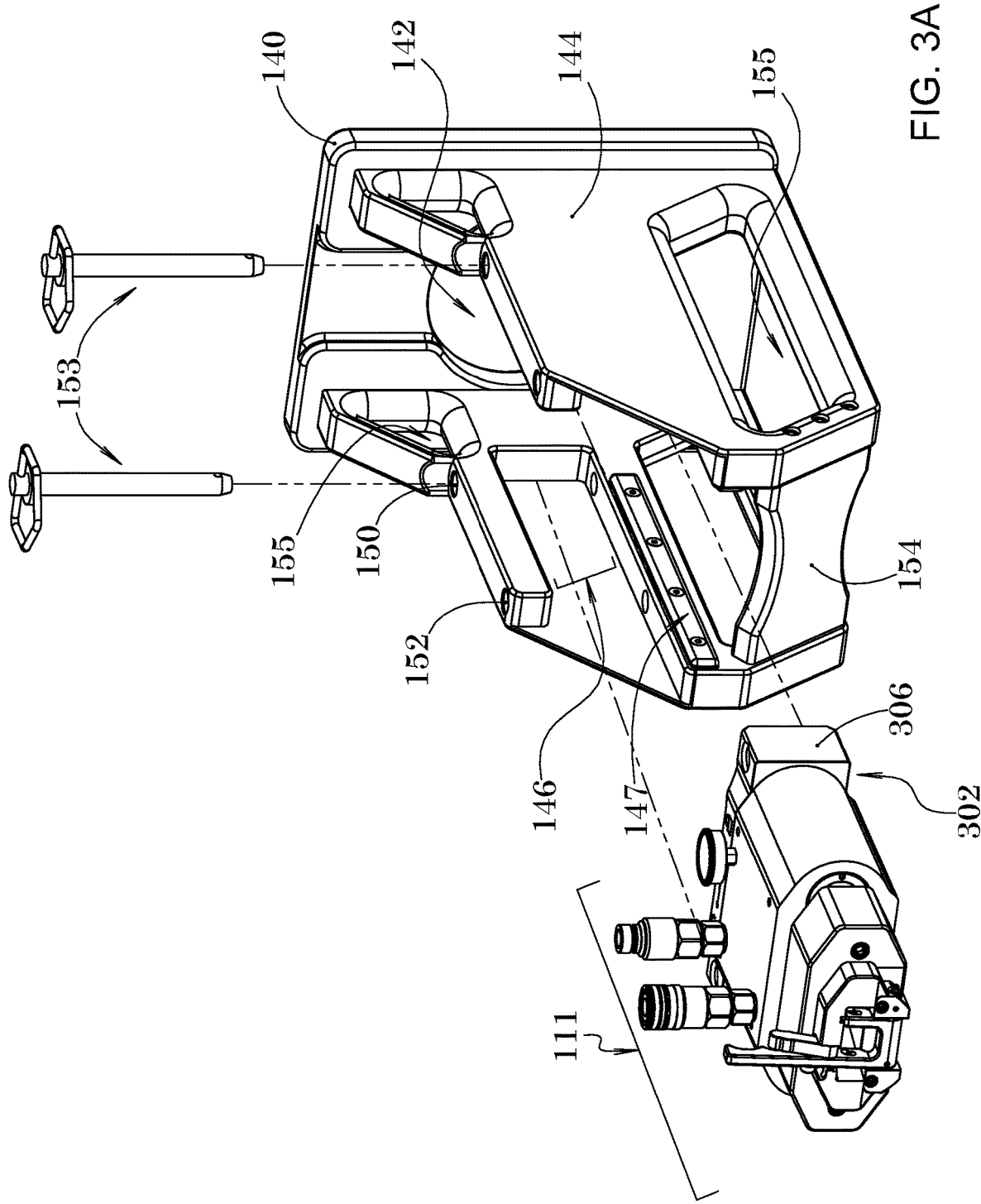
FIGS. 3A and 3B are perspective views of an assembled chassis (FIG. 3A) and exploded chassis (3B)
Figure 3B:
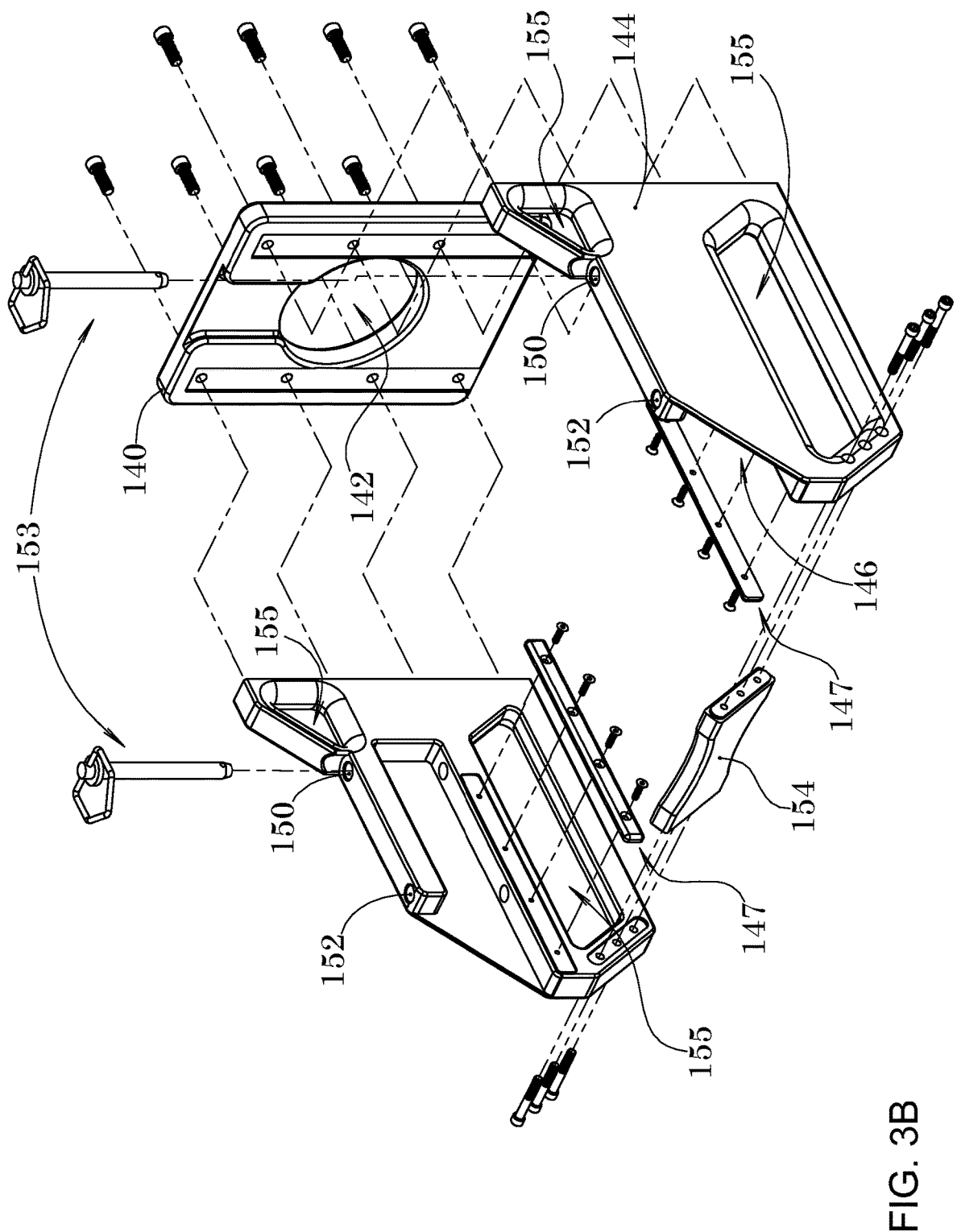
Figure 4D:
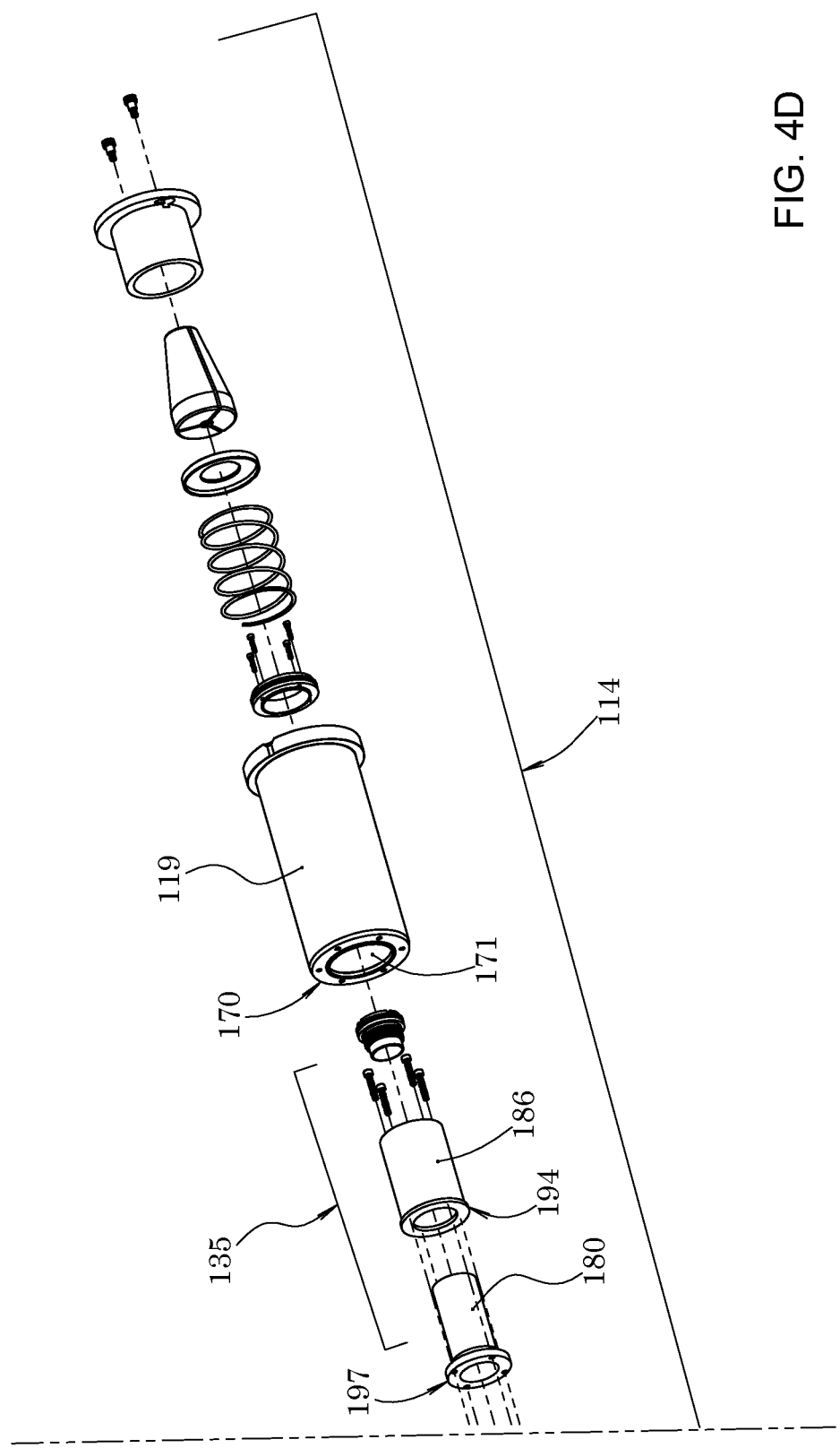
FIGS. 4A 4B, and 4C are perspective views of an assembled (4A, 4B) and exploded (40) cable pulling system with a single cylinder piston assembly.

Referring to FIGS. 3A and 3B, the frame or chassis 110 can include a face plate 140 which can define a hole 142 therein that is large enough for a bursting head 106 to fit through. A pair of side panels 144 can extend back from opposite sides of face plate 140. Side panels 144 each define a slot 146 that opens towards the opposite side panel 144. Each slot 146 can extend forward from the back of the side panel 144, ending just short of the front of side panel 144. Side panel 144 further can include a track 147 extending along the length of the interior side of side panel 144 and positioned along the bottom of side panel 144 at a height such that the base of a piston assembly 111 can travels along the top edge of track 147 when the lateral protrusions 306 of piston assembly front manifold body 302 are engaged in slots 146. In the embodiment illustrated in FIG. 3A, piston assembly 111 is a dual cylinder piston assembly. In one embodiment track 147 is made of a hard plastic to facilitate travel along the track. Each side panel 144 can also include a front pin hole 150 and a rear pin hole 152 that both extend from a top of side panel 144 above slot 146 and down into side panel 144 below slot 146. Pins 153 can be placed through pin holes 150 and 152. Additionally, truss 154 can extend between lower portions of side panels 144 to secure side panels 144 together. Face place 140, side panels 144 and trusses 154 can be rigidly secured together so that frame 110 is rigid. Side panels 144 also can include one or more openings 155 to reduce overall frame weight and/or to provide handles. Choice of materials also can reduce overall frame weight. In one embodiment, lateral piston assembly frames can advantageously be made of aluminum and have an overall weight of less than about 55 lbs. In another embodiment, the assembled frame can have an overall length of less than about 24 inches, an overall height of less than about 18 inches, and an overall width of less than about 14 inches.

Frame 110 with slots 146 and pins 153 allow a laterally positioned piston assembly 111 as described herein to be contained within the chassis during all stages of operation. This provides for a compact system that can fit into small spaces. In particular, as described hereinbelow, during a cable pulling operation pins 153 can hold a piston assembly in a distal position relative to chassis faceplate 140, and piston cycling, for example to pull a bursting head and replacement pipe through a n existing buried pipe, occurs within the chassis interior. Once the bursting head is at the pipe exit, the piston assembly can be restaged at a second forward position and secured there with pins 153 placed in forward pin holes 150. The interior of chassis 110 now is free for the bursting head to be pulled into its interior for removal from the replacement pipe.

Faceplate 140 can be positioned against material surrounding a tunnel or hole (e.g., against material surrounding an end of an existing pipe) from which cable 104 and a bursting head 106 can emerge. Faceplate 140 can act as a brace and keep frame 110 from being pulled into the tunnel or hole. If faceplate 140 is insufficient for this purpose, an additional backup or resistance plate may be placed between the faceplate and the cable exit hole. In addition or alternatively, timbers or other materials may be used to brace the faceplate. In one embodiment, the resistance plate can have an opening of sufficient diameter for a cable to pass through, and an opening sufficient for a bursting head to pass through. In another embodiment, these openings are separate. In still another embodiment, the separate openings are vertically aligned and connected via a channel of sufficient width to allow passage of a cable therethrough, and vertical movement of the resistance plate aligns the desired resistance plate opening with faceplate opening 142.

III. Internal Anti-Rotation Single Cylinder Piston & Wiper Assembly

Referring to FIGS. 1A, 1B and FIGS. 4A, 4B, 4C, 4D, 5A, 5B, 5C, and 6A, 6B, 6C a single cylinder piston assembly 114 for lateral positioning in a chassis is described. The piston assembly described herein provides improvements on the single cylinder assembly disclosed in U.S. Pat. No. 8,540,458, referred to therein as a center hole ram assembly. The center hole ram assembly embodiments disclosed herein include a single cylinder piston with an internal anti-rotation mechanism and internal wiper system.

Single cylinder piston assembly 114 includes barrel housing 116, internal piston rod 118, axial opening 120 providing a central substantially hollow channel configured for cable passage through piston assembly 114, and shaft 119 defining at least part of the internal channel through piston assembly 114 for cable passage. The outer surface of piston rod 118 may include a visual indicator of when piston rod 118 is nearing the end of its pulling stroke. The visual indicator may advantageously include a band of color positioned on the piston rod 118 external surface such that the band is exposed to view as piston rod nears the end of its pulling stroke. Presence of a visual indicator may support an operator in proper and timely cycling of piston rod 118 in barrel housing 116.

An internal anti-rotation mechanism can be provided that limits lateral rotation of piston rod 118 relative to housing 116 or shaft 119 during cable pulling operation. In one embodiment, anti-rotation means can be provided by providing means for slidably engaging piston rod 118 with shaft 119 such that piston rod 118 is inhibited from lateral rotation relative to shaft 119. In one embodiment, illustrated in FIGS. 4-6, the internal surface of piston rod 118 can include at least one groove or slot 172 extending along the longitudinal axis of piston rod 118. In another embodiment, a plurality of slots 172 are provided. In one embodiment, length of slot 172 at least equals the distance piston rod 118 travels relative to the shaft posterior end 170 during piston operation. In another embodiment, slot 172 extends the length of piston rod 118. Slot 172 can engage a protrusion, commonly called a ridge or key 174 extending perpendicularly from the outer surface of shaft 119 and dimensioned to fit in slot 172 and slide along the slot path. As will be appreciated by those having ordinary skill in the art, key 174 can be integral to shaft 119 or removably attached by standard means. In the embodiment illustrated in the figures, shaft 119 can engage with slot 172 by means of an anti-rotation key or protrusion 174 extending perpendicularly from the surface of shaft posterior end 170's axial opening 171. The anti-rotation key 174 is dimensioned and positioned to fit in a slot 172, allowing piston rod 118 to move along shaft 119's outer longitudinal axis while inhibiting lateral movement of piston rod 118 relative to shaft 119. As will be appreciated by those skilled in the art, shaft 119 is attached to housing 116, and the anti-rotation mechanism described herein also inhibits lateral rotation of piston rod 118 relative to housing 116.

In the embodiment illustrated in FIGS. 4A, 4B, 4C, 4D, 5A, 5B, 5C, and 6A, 6B, 6C, key 174 can be provided to shaft end 170 by means of a plate 176 which can be attached to shaft end 170 by standard means. As will be appreciated by those skilled in the art, an anti-rotation key may be made integral to shaft end 170 rather than provided as part of a plate, and may even extend forward along the longitudinal axis of shaft 119's outer surface. At least one key-and-groove engagement pairing means are contemplated for providing anti-rotation capability. A plurality of key-and-groove pairs also are contemplated. In the embodiment illustrated in the figures, four pairs are illustrated, with four channels 172 distributed radially about piston rod 118's internal surface, and anti-rotation keyed plate 176 comprising four keys positioned about plate 176 to fit in slots 172. A smaller or larger plurality of key-and-groove pairings also are contemplated.

Single cylinder piston assembly 114 further can include an internal cable debris wiper or cable debris containment system 135 providing means for inhibiting debris that may be pulled into the shaft, for example on the cable, from entering the piston rod cavity 139 and possibly compromising one or more hydraulic seals such as seal 141. Internal wiper system 135 advantageously can be a telescoping system as illustrated in FIGS. 4-6, comprising a central channel dimensioned to receive a cable and competent to continually span the distance between shaft 119 posterior end 170 and the posterior end of piston rod cavity 139 during all phases of the piston stroke cycle. In the illustrated embodiment, wiper system 135 can include a substantially hollow first wiper tube 180 having a posterior end that engages the posterior end of piston rod cavity 139, and dimensioned to fit within a larger second wiper tube 186, which itself is substantially hollow and dimensioned to fit within shaft 119. Wiper tubes 180 and 186 preferably comprise hydraulic seals 184 and 190, respectively, to provide seals between (1) the outer surface of first wiper tube 180 and the inner surface of second wiper tube 186, and (2) the outer surface of second wiper tube 186 and the inner surface of shaft 119. Advantageously, seals 184 and 190 can be associated with wiper tubes 180 and 186, respectively, by means of wiper caps 182 and 188, respectively, and which comprise a grooved or channeled perimeter on their outer surface into which seals 184 and 190 fit. Optionally, seals 184 and 190 may be seated into channels or grooves on the outer circumference of the anterior end of wiper tubes 180 and 186. Useful seals include hydraulic seals well known in the art, including, without limitation B-Lip polyseals and loaded U-cup seals.

Wiper caps 182 and 188 may be removably connected to their respective wiper tube by any means known in the art. In the embodiment illustrated, connections include threaded coupling 191 and bolted coupling 192. Advantageously, a wiper cap may include a tool receiving surface 193 to facilitate uncoupling the cap from the wiper tube. In the illustrated embodiment, first wiper cap 182 includes a tool receiving surface 193 comprising a plurality of slots for receiving, for example, a spanner tool to uncouple wiper cap 182 from first wiper tube 180.

Preferably, second wiper tube's anterior and posterior axial openings define a lip 194 that extends out from the tube surface and piston shaft 119's posterior axial opening also defines a lip 195 that extends inward from its inner surface. Lips 194 and 195 are dimensioned such that shaft lip 195 contacts and holds piston lips 194 during directional movement of second wiper tube 186, preventing additional directional movement and retaining second wiper tube 186 within the shaft interior as piston rod 118 pulls and recovers, and wiper system 135 telescopes in and out. As will be appreciated by those skilled in the art, the anterior lip 194 of wiper tube 186 can be integral to tube 186 or can be provided or can proved by engaged wiper cap 188.

Similarly, the posterior axial opening of second wiper tube 186 also preferably includes a lip 196 extending inward along its inner circumference, and the anterior axial opening of first wiper tube 180 comprises a lip 197 extending out from the tube outer surface. Lips 196 and 197 are dimensioned such that second wiper tube lip 196 contacts and holds lip 197 during directional movement of first wiper tube 180, preventing additional directional movement and retaining first wiper tube 180 within the second wiper tube 186 interior during the piston rod stroke action and wiper system 135 extension. As will be appreciated by those skilled in the art, lip 197 may occur on first wiper tube body 180 or cap 182.

In one embodiment, single cylinder piston assembly 114 also can include holding gripper assembly 130 and pulling gripper assembly 138, each of which includes a quick release mechanism. These assemblies are described in detail below.

IV. Closed Path Dual Cylinder Piston Assembly

Figure 7:
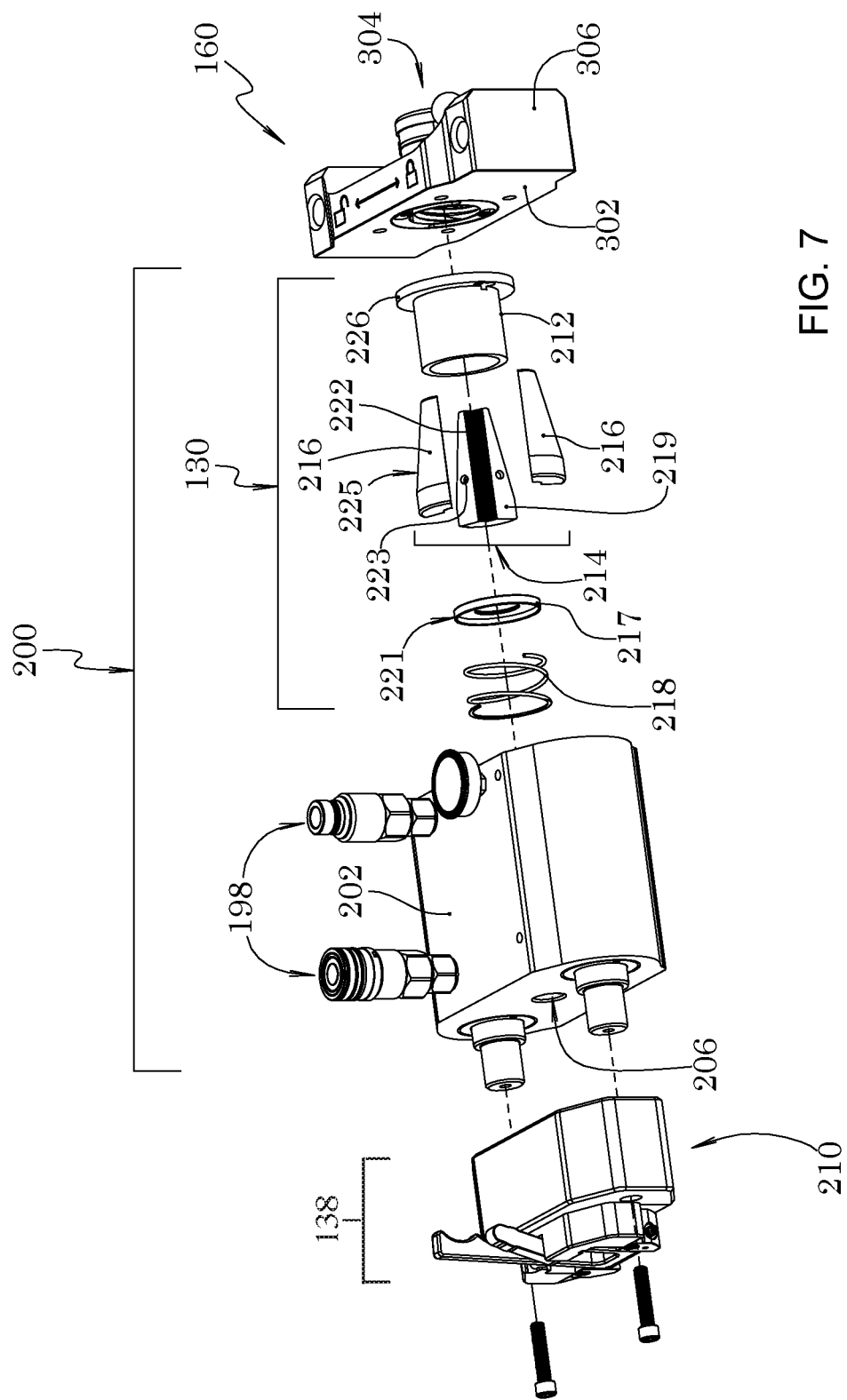
FIG. 7 is an exploded view of a closed path dual cylinder piston assembly.
Figure 11A:
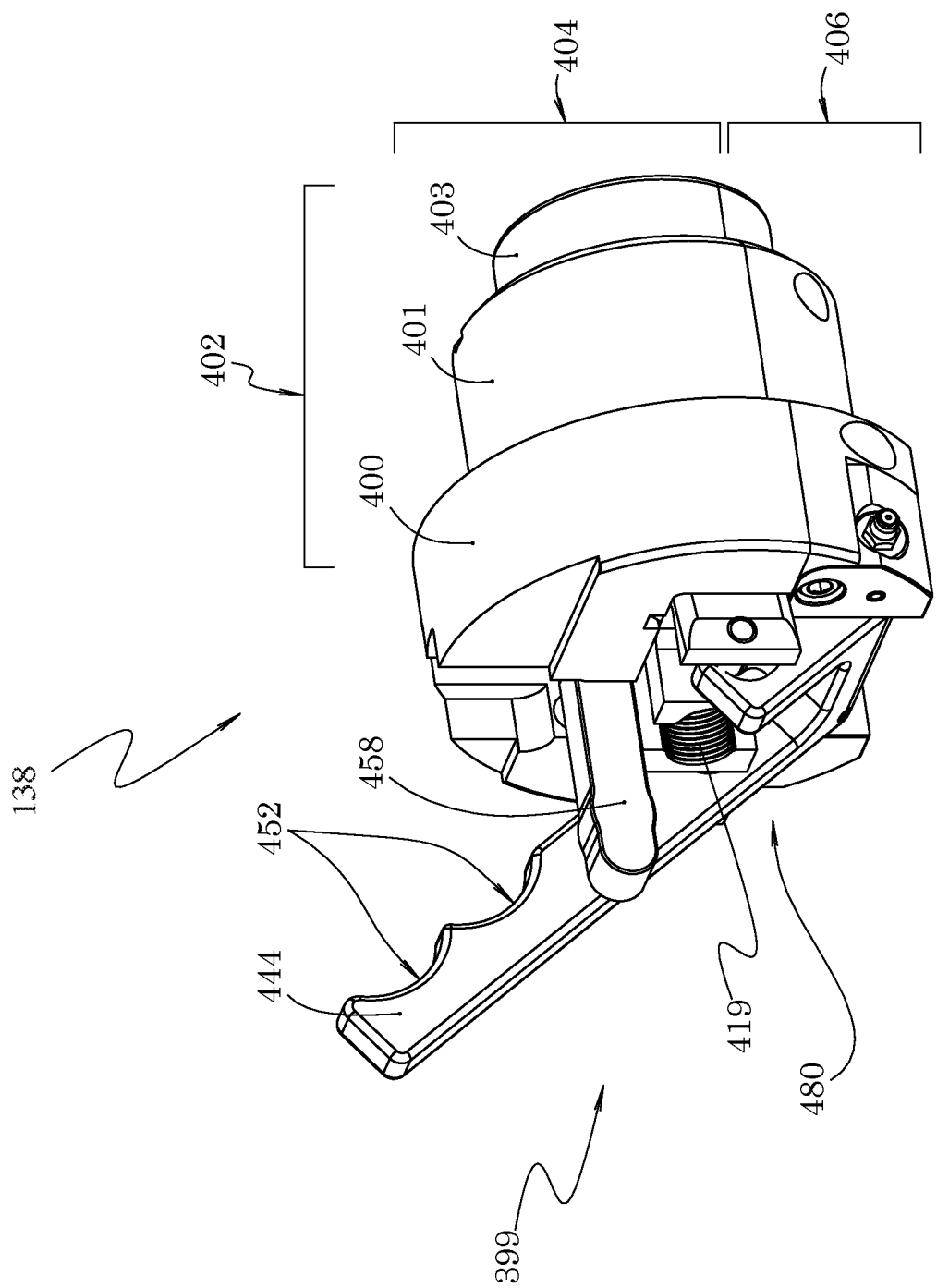
Figure 11C:
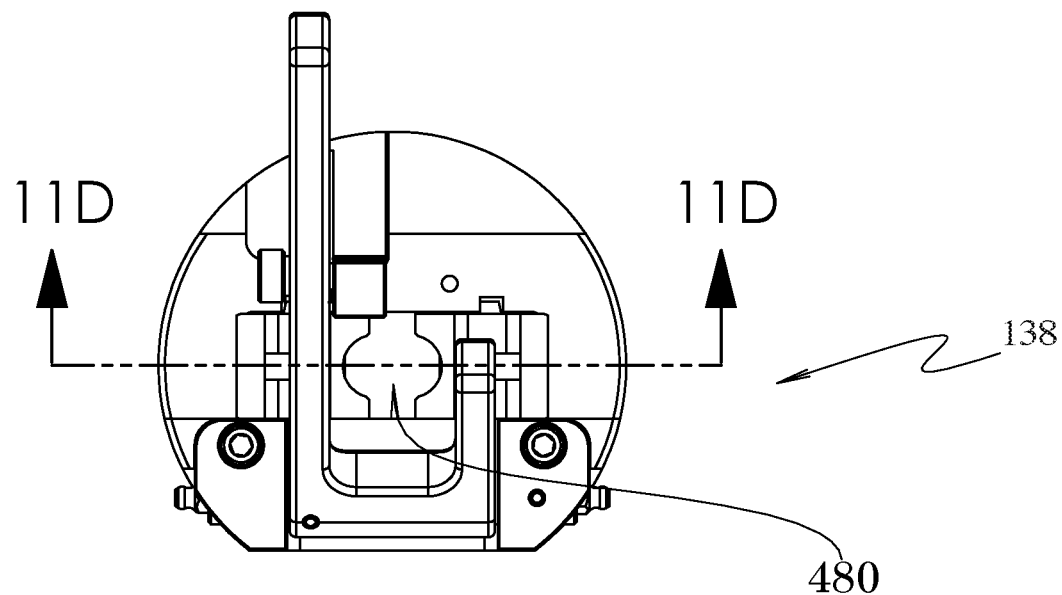
Figure 11D:
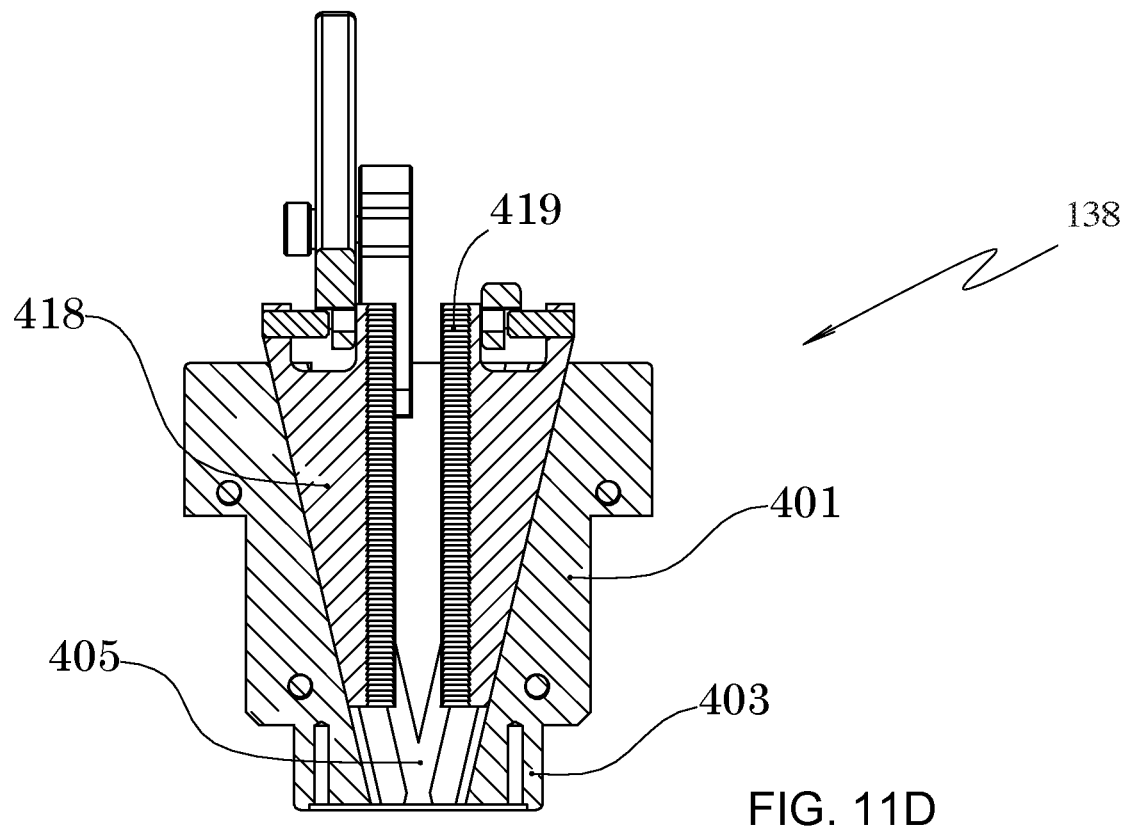

Turning now to FIGS. 7, 8A and 8B, a closed path dual cylinder piston assembly 200 is described. Assembly 200 includes a housing 202 having a center hole or channel 206 traversing the axial length of housing 202. Channel 206 is substantially hollow and dimensioned to allow passage of a cable 104 (not shown) therethrough. In one preferred embodiment, at least part of channel 206 is dimensioned to receive holding gripper assembly 130 (see below).

Housing 202 further comprises two cavities 203 that flank central channel 206, each cavity dimensioned to receive a piston rod 204 through an axial opening at the posterior end of housing 202. Cavities 203 flank central channel 206 and are equidistant therefrom, providing balanced distribution of piston rod 204 weight within housing 202. In a preferred embodiment, cavities 203 does not extend all the way through housing 202 and function as a piston barrel housing. As will be appreciated by those having ordinary skill in the art, piston rods 204 advantageously may include standard hydraulic seals 208 typically included in piston operation. Also as will be appreciated by those having ordinary skill in the art, hydraulic connectors 198 include conduits within housing 202 such that hydraulic fluid is provided to or expelled from both cylinders in tandem.

The closed path dual cylinder piston assembly 200 described herein is compact and lightweight while still providing sufficient power to pull cable in a range of sizes through an underground space. Usual cable diameters can be, without limitation, in the range of about 10 mm to 22 mm, or about ⅜-inch to ⅞-inch diameters. Bursting heads useful in the systems disclosed herein can be for small diameter pipe (e.g., 1-3-inch bursting head) or larger (e.g., 4-inch bursting head or larger). In one embodiment, piston assembly 200 accommodates piston cylinders in the range of at least about 1.5-inches to 3-inches. One useful piston cylinder can include a 2-inch cylinder. In another embodiment, assembly 200 can have an overall weight of less than about 50 pounds. In another embodiment, assembly 200 can have an overall length of less than about 14 inches. In still another embodiment, assembly 200 can have an overall width of less than about 10 inches.

V. Holding Gripper Assembly

Dual Cylinder

Dual cylinder housing 202 further can accommodate a front holding gripper assembly 130. In the embodiment illustrated in FIGS. 1A, 1B, 2A, 2B, 7 and 8A, 8B, holding gripper assembly 130 includes, from anterior to posterior end: a gripper housing 212; a holding gripper 214 tapered at its anterior end to define a cone, and preferably comprising a plurality of sections or members 216 competent to compress together and expand apart; and a compression spring 218. Gripper assembly 130 further can define an interior channel through which a cable can pass. In operation, the compression spring 218 anterior end contacts the posterior end of holding gripper 214 and rearward movement of gripper 214 compresses spring 218 against a backstop. When compression spring is extended, gripper 214 is pushed forward and onto a cable. The spring tension supports utility of the gripping system described in detail below as part of a holding gripper assembly.

In one embodiment, the outer diameter of compression spring 218 substantially matches the outer diameter of gripper housing 212. In another embodiment, a compression spring front cap 217 can be included between compression spring 218 and the posterior end of gripper 214, and cap 217 provides the compressing contact with spring 218. In another embodiment, cap 217 can include an annulus with a central opening dimensioned to allow cable passage, and an outer diameter that substantially matches spring 218 diameter, or slightly exceeds it. In another embodiment, cap 217 can be dimensioned to fit in piston cavity 203. In another embodiment, cap 217 includes a lip 221 that extends out perpendicularly from cap 217's outer circumference to create a bounded recess into which the anterior end of spring 218 can fit.

Gripper housing 212 preferably defines a substantially hollow channel dimensioned to receive tapered holding gripper 214. The gripper housing channel inner surface 220 preferably is tapered at its anterior end such that passage of the gripper 214 anterior end through the anterior end of the channel is inhibited. Gripper 214 can comprise multiple member pieces or sections 216, typically between 2-4 pieces that fit together to define a hollow cone shape having an outer camming surface 225 competent to engage the gripper housing tapered inner surface 220. In the embodiment illustrated herein, holding gripper 214 comprises three member pieces 216. Member pieces 216 preferably have interior concave surfaces 222 along their axial length that allow sections 216 to sit on cable 104 (not shown), the interior concave surfaces preferably comprising barbs or ridges which further may be slanted such that when gripper sections 216 are compressed onto cable 104, the ridges grip cable 104 and prevent movement of the cable, such that gripper 214 acts as a clamping jaw or cable gripping jaw. In a preferred embodiment, gripper member pieces have a smooth outer camming surface, reducing friction as the camming surface moves along the tapered interior surface 220 of gripper housing 212.

In one embodiment, each gripper member 216 can contact its adjacent member section through a joining member surface 219 on each member. In one preferred embodiment, each joining member surface 219 can include a magnet 223 located to align with the magnet on the corresponding joining surface 219. In one embodiment magnet 223 can be embedded in the member joining surface such that it lies flush with the member joining surface. As will be appreciated by those having ordinary skill in the art, a range of magnet sizes and magnetic force may be used effectively in the devices disclosed herein. In one embodiment, a useful magnet size is ¼-inch by ¼-inch, although larger and smaller magnet sizes are contemplated, including ⅜-inch (0.375-inch). In another embodiment, a magnet strength of N50 is used, also known as a rare earth or neodymium magnet, and magnets of stronger and weaker strength also are contemplated. A selected magnet strength will be competent to repel two adjacent member joining surfaces from one another when the magnets are aligned and properly indexed. In another embodiment, the magnet can located at the balance point on the member joining surface. Other positions on member joining surface 219 also can be used for locating the magnet, provided the position selected is the same on each member joining surface. In another embodiment, magnets 223 on joining member surfaces 219 are indexed so that the same pole (positive or negative) is exposed on each member joining surface 219 and the magnets repel one another when two member joining surfaces are joined and the magnets are aligned.

In the embodiment illustrated herein holding gripper 214 includes three member pieces 216 and one magnet 223 per joining surface 219. It will be appreciated by those skilled in the art that more magnets could be utilized if desired. When used in the method described hereinbelow, the magnetized gripper members 216 can minimize undesired cable binding during the cable pulling process, and facilitate quick and easy cable release at the end of operations. In addition, magnetized gripper 214 obviates the need for O-rings, bands, or other means currently described in the art holding the gripper members together.

In one embodiment, useful springs of the present disclosure are in the range of about 1-inch to 5-inches in length. In another embodiment, useful springs are in the range of about 1.5-inches to −3-inches in length. Preferred spring lengths will depend on the overall length chosen for the gripper housing inner surface 220, as well as the selected length of the gripper 214.

In one preferred embodiment, at least part of piston housing channel 206 defines a cavity 224 at the piston housing channel 206 anterior end, cavity 224 having a larger diameter than channel 206 at its posterior end. In one embodiment, cavity 224 is dimensioned to receive holding gripper assembly 130. In one preferred embodiment, cavity 224 has an axial length substantially equal to the axial length of the gripper housing 212 cylinder and compression spring 218 in an uncompressed or only partially compressed position. Advantageously, the posterior end of cavity 224 (formed by the juncture of cavity 224 and channel 206) can act as a backstop for compression spring 218. It will be appreciated by those skilled in the art that compression spring 218 may also include a spanner element, eg., at its posterior end to extend spring 218's overall length.

In another preferred embodiment, means are provided for securing gripper housing 212 to piston housing 202. In one embodiment, gripper housing 212 can include a lip or edge 226 about its anterior axial opening, competent to lie flush against housing 202's outer front-facing surface and encircling the axial opening of cavity 224. When gripper housing 212 is inserted in cavity 224, lip 226 provides attachment means for securing gripper housing 212 to piston housing 202. in one embodiment, attachment means can include threaded bolts or screws. Preferably, cavity 224 is dimensioned such that when spring 218 is compressed by, for example, pushing gripper 214 rearward, gripper 214 can fit completely within cavity 224 and when spring 218 extended, the anterior end of gripper 214 can protrude at least partially through the anterior opening of gripper housing 212.

Single Cylinder

Similarly, and as illustrated in FIGS. 5A, 5B, 5C and 10A, 10B, in a single cylinder piston assembly 114 the anterior end of shaft 119 can define a cavity 229 dimensioned to receive a front holding gripper assembly 130, described hereinabove. In one preferred embodiment, cavity 229 has a larger diameter than shaft 119 posterior channel 121. In another embodiment, the corner created by the juncture of cavity 229's posterior end and shaft channel 121's anterior end can function as a backstop for compression spring 218. In another embodiment, a disc or cap 217 having a central opening dimensioned for cable passage can be included between the gripper 214 posterior end and the compression spring 218 anterior end. Disc 217 can serve to enhance contact between gripper 214 and spring 218. In the embodiment illustrated in FIGS. 5A-5C, 10A and 10B, lip 226 of gripper housing 212 can fit into a channel or groove 136 about shaft end axial opening 171 such that gripper housing 212 is recessed into cavity 229 and its anterior end is substantially flush with the outer surface of piston housing 116.

VI. Holding Gripper Quick Release Manifold

Turning now to FIGS. 1A, 1B, 2A, 2B, 9A, 9B and 10A-10B, piston assemblies 114 and 200 further can include a holding gripper manifold assembly 160. Manifold assembly 160 can include manifold body 302 which further can include a central axial opening 304 and opposing protrusions 306. Manifold body 302 advantageously can include means for coupling manifold assembly 160 to the anterior end of a piston assembly, such as assembly 114 or 200. Useful coupling means can include, without limitation, bolt holes 303. Manifold protrusions 306 preferably are dimensioned to extend into and moveably slide along side panel slots 146 of frame 110. During use, protrusions 306 may abut front ends of slots 146 to keep manifold assembly 160 from sliding further forward relative to frame 110. Protrusions 306 also can include pin holes 307 that extend through the protrusions. Pin holes 307 are dimensioned to receive pins 153 such that manifold pin holes 307 can be aligned with front pin holes 150 on frame 110 for restaging a piston assembly during a cable pulling system operation as described below.

Manifold assembly 160 further comprises means for positioning holding gripper 214 forward onto a cable surface (not shown), or for moving gripper 214 rearward and away from the cable surface, as desired. In one preferred embodiment this positioning mechanism can include a piston 308 that moveably couples with an insert 314 having an adjustable collar 313. In one preferred embodiment, the coupling mechanism also transfers motion so that as piston 308 couples with insert 314, piston 308 can contact gripper 214 and move it rearward. In another preferred embodiment piston 308 is a threaded piston having external threads on its posterior end which couple with internal threads on the interior of collar 313. In another preferred embodiment, the threads on piston 308 are multiple-lead or multiple-start threads, allowing greater travel along the thread axis per piston rotation. For example, a multiple-lead thread can provide travel of $^{400}/_{1000}$ inch with less than ½ of a piston turn. Advantageously, multiple lead threads can provide more power and leverage through rotation than a single lead thread. Currently preferred are multiple-lead threads having 2 or more leads or starts, more preferably having 3-6 leads.

Means for coupling piston 308 to insert 314 can be any means known in the art. In the embodiment illustrated herein, piston 308 can be advantageously coupled to insert 314 by means of a lever mechanism 310 attached to piston 308. In use, manifold body 302 is provided to the anterior end of a piston assembly such as piston rod or cylinder assembly 114 or 200 with collar 313 of insert 314, dimensioned to fit inside manifold axial opening 304, inserted through axial opening 304 from the posterior end of manifold body 302, and piston 308 inserted into collar 313 from the anterior end of manifold body 302. Lever 310 then can be used to rotate piston 308 rearward into insert 314. such that the posterior end of piston 308 contacts gripper 214 and moves it rearward by compressing spring 218 positioned posterior to gripper 214. In one embodiment, holding gripper assembly 130 is dimensioned such that when spring 218 is in a substantially extended (not compressed) state, gripper 214 can extend at least partially out of the anterior axial opening of the piston assembly and into the axial opening defined by collar 313 of insert 314. When gripper 214 is moved rearward out of the tapered cavity of gripper housing 212 by contact with threaded piston 308 and compression of spring 218, the indexed magnets on gripper joining member surfaces 219 repel member sections 216 away from one another sufficiently that member sections 216 are held back and away from the cable surface. Member sections are stable in this position, bound in on direction by the gripper housing cavity walls and in another direction by the repelling force of magnets 223. This spring compressed position is referred to as an unlocked position, allowing cable to be threaded into or out of piston rod or cylinder assembly 114 or 200.

To put the cable into a locked position held by gripper assembly 130, lever 310 can be used to rotate piston 308 forward and away from insert 314. This forward movement can decompress spring 218 and push gripper 214 forward into the tapered cavity of gripper housing 212. The decompressing spring's forward movement provides sufficient force to overcome magnet 223's repelling forces and gripper members 216 are pushed forward and together, and forced down onto the cable surface by the cavity's tapered inner surface 222. In one preferred embodiment manifold body 302 can include a visual representation 340 indicating lever positioning for the locked and unlocked position. One example of a visual representation is illustrated in FIGS. 9A and 9B.

In one preferred embodiment, threaded insert 314 can be removably attached to the posterior end of manifold body 302. In one embodiment, attachment can occur by means of a lip 309 extending out radially from the posterior outer circumference of insert 314. In one embodiment, lip 309 provides a surface for bolting insert 314 to manifold body 302. In another embodiment, lip 309 is dimensioned to fit into circular groove or recess 300 surrounding axial opening 304 on the posterior surface of manifold body 302, such that lip 309 lies flush with the outer surface of manifold body 302 when threaded insert 314 is placed in axial opening 304. In another preferred embodiment, means are provided for adjusting the thread start position of insert 314 relative to piston 308. In one embodiment, insert 314's thread start position can be adjusted by means of one or more timing slots 317 on lip 309. In FIG. 9 B, two timing slots 317 are depicted. As will be appreciated by those skilled in the art, a fewer or greater number of timing slots can be utilized advantageously. In another embodiment, insert attachment means also can include timing slot bolts 318.

Means also can be provided for removably coupling piston 308 to manifold body 302. Any means known in the art may be used to advantage. In one embodiment, preferred coupling means also provide means for varying the starting position or distance of piston 308 relative to threaded insert collar axial opening 315. In one preferred embodiment, such means are provided by removably coupling piston 308 to manifold body 302 by means of one or more extensions, also known as stand-offs or stand-off pins. Stand-off pins 312 are configured about manifold body axial opening 304 and extend forward from the manifold body 302 in a plane perpendicular to the manifold body plane. Bolts 322 can thread into standoff pins 312 and can attach piston 308 to pins 312. The distance piston 308 enters manifold axial opening 304 can be modulated by varying the distance bolts 322 are screwed into stand-off pins 312. In one preferred embodiment piston 308 is coupled to stand-off pins 312 by means of a bolting plate 320 which can couple to the anterior end of piston 308 and which further can include one or more protrusions 373 extending out from the plate perimeter, and configured about the perimeter to align with stand-off pins 312. Bolting plate 320 further can include an axial opening 321 dimensioned to allow cable passage there through. Bolting plate 320 can be coupled to piston 308 by any standard means known in the art. In one embodiment, a hollow sleeve or bushing or other substantially hollow cylindrical spacer 319, dimensioned to fit through bolting plate axial opening 321 and into threaded piston anterior axial opening 316, can be used to advantage. In another embodiment the outer surface of spacer 319 can include threads for aligning and coupling with threads on the interior surface of piston 308's anterior axial opening 316. In another embodiment, spacer 319 can seat into a groove or channel in the piston 308 interior surface. Bolting plate 320 can couple to the anterior end of spacer 319 and attach both spacer 319 and piston 308 to manifold body 302. In the embodiment where spacer 319 threads into piston 308, further modulation of piston 308 positioning relative to manifold axial opening 304 is available.

A cable wiper also can be included in front manifold assembly 160 by any standard means known in the art. Disclosed herein is an easy access wiper assembly. An elastomeric wiper 324 is provided having an axial opening dimensioned to allow cable passage therethrough, the opening being sufficiently snug such that the axial opening inner perimeter wipes the cable surface as the cable passes through. In one embodiment wiper 324 can be dimensioned to fit on bolting plate anterior axial opening 321. In another embodiment a wiper cap 326 is provided for removably coupling wiper 324 to bolting plate axial opening 321. In one preferred embodiment wiper cap 326 can include an axial opening. In another preferred embodiment wiper cap 326 can include an interior recess configured about its axial opening and dimensioned to receive wiper 324. In another embodiment wiper cap 326 can have an outer diameter dimensioned such that cap 326 fits on the bushing plate surface such that the wiper 324 axial opening aligns with bushing plate axial opening 321. In still another preferred embodiment, wiper cap 326 can include one or more magnets 328 that couple wiper cap 326, and associated wiper 324, to bolting plate 320. In the embodiment disclosed herein, wiper cap 326 includes a substantially hollow shallow cylinder. The inner surface of the wiper cap 326 cylinder includes a first channel 330 configured to seat and hold wiper 324. The inner surface of wiper cap 326 also can include a second channel 332 dimensioned to fit over the bolting plate 320 anterior surface. Second channel 332 can have a larger diameter than first channel 330. In one preferred embodiment, the posterior end of wiper cap 326 includes one or more magnets embedded in its surface and competent to secure wiper cap 326 to bolting plate 320. In another preferred embodiment, wiper cap 326 includes a plurality of rare earth magnets the number and strength of which are selected to provide a secure fit, and also allow ease of removability without requiring tools.

VII. Rear Pulling Gripper and Cable Release Latch Assembly

The ability of a gripper assembly to readily and reliably grab and pull cable during the piston pulling stroke and then release the cable so the attached piston rod can retract in a recovery stroke is a critical feature of useful cable pulling systems. Issues that can arise include gripper members binding to the cable surface and not releasing properly during the recovery stroke; and gripper members coming out of position and not re-engaging effectively with the cable surface in a subsequent piston pulling stroke. Referring to FIGS. 1A, 1B, 2A, 2B, 4A, 4B, 4C, 4D, 5A, 5B, 5C, 8A, 8B and 11A, 11B, 12A, 12B, 12C, 12D and 13, an improved rear pulling gripper and cable release assembly will be described. The system has applicability for both single and dual cylinder assemblies.

Single Cylinder

In the drawings, rear pulling gripper and cable release assembly 138 can be provided to the posterior end of single cylinder piston assembly 114 or dual cylinder piston assembly 200. For ease of description, the assembly will be described first for a single cylinder piston assembly, and variations that can have applicability for a dual cylinder system will follow. As with all drawings in this disclosure, like-numbered parts reference like-membered components.

Figure 12C:
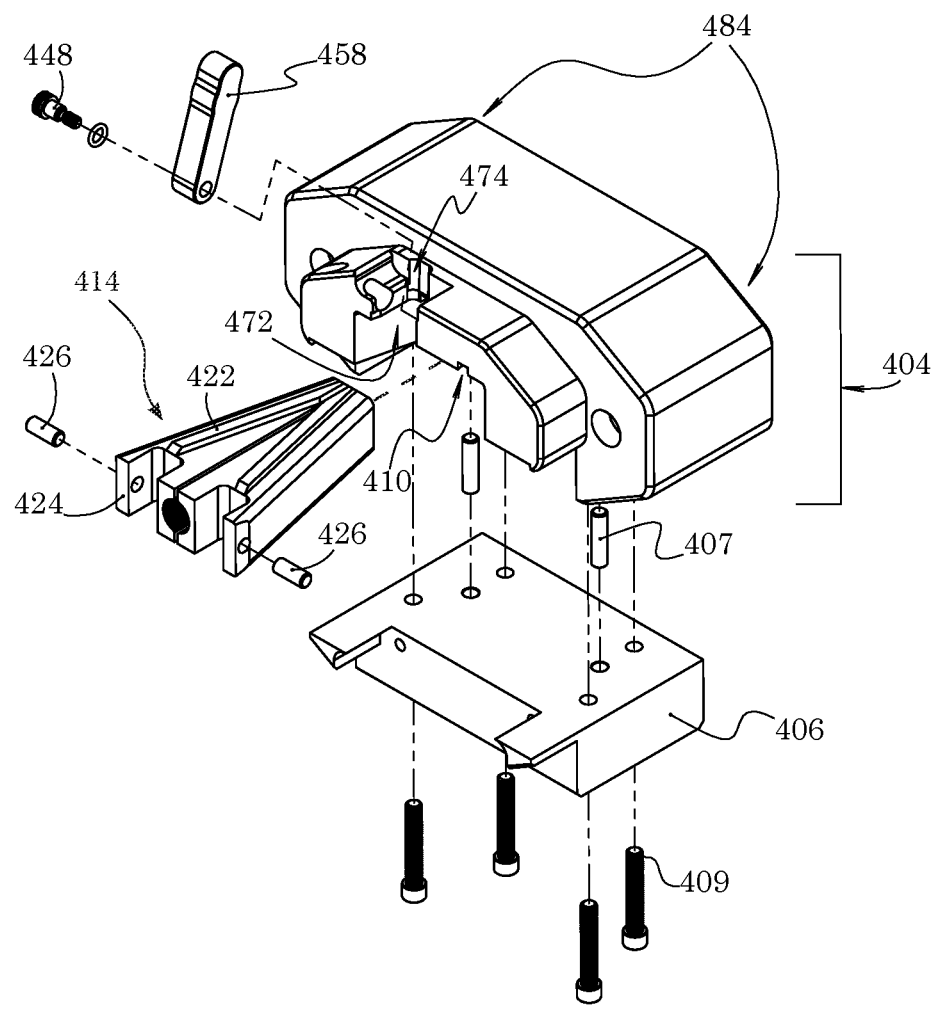
Figure 12D:
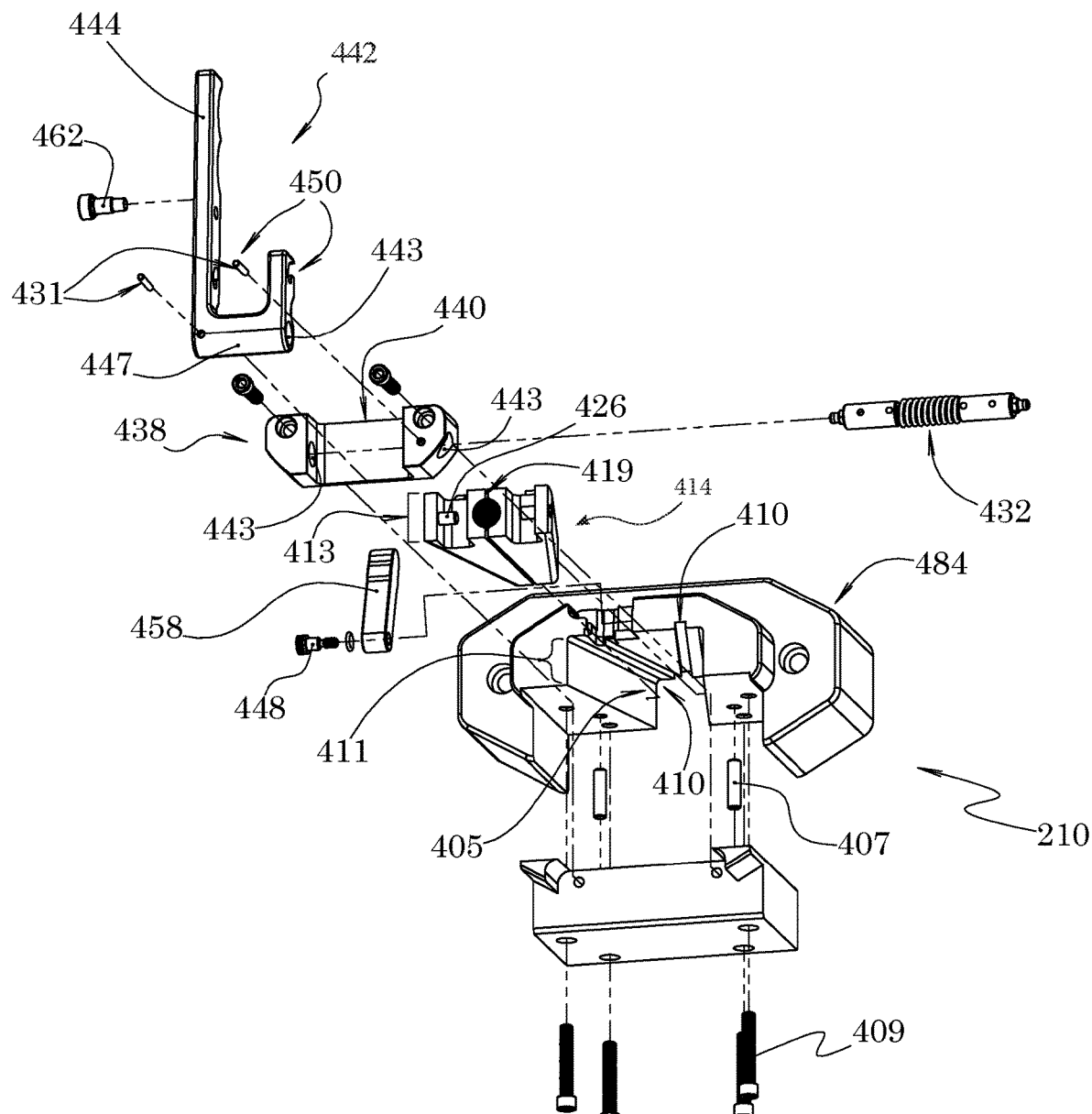
Figure 13:
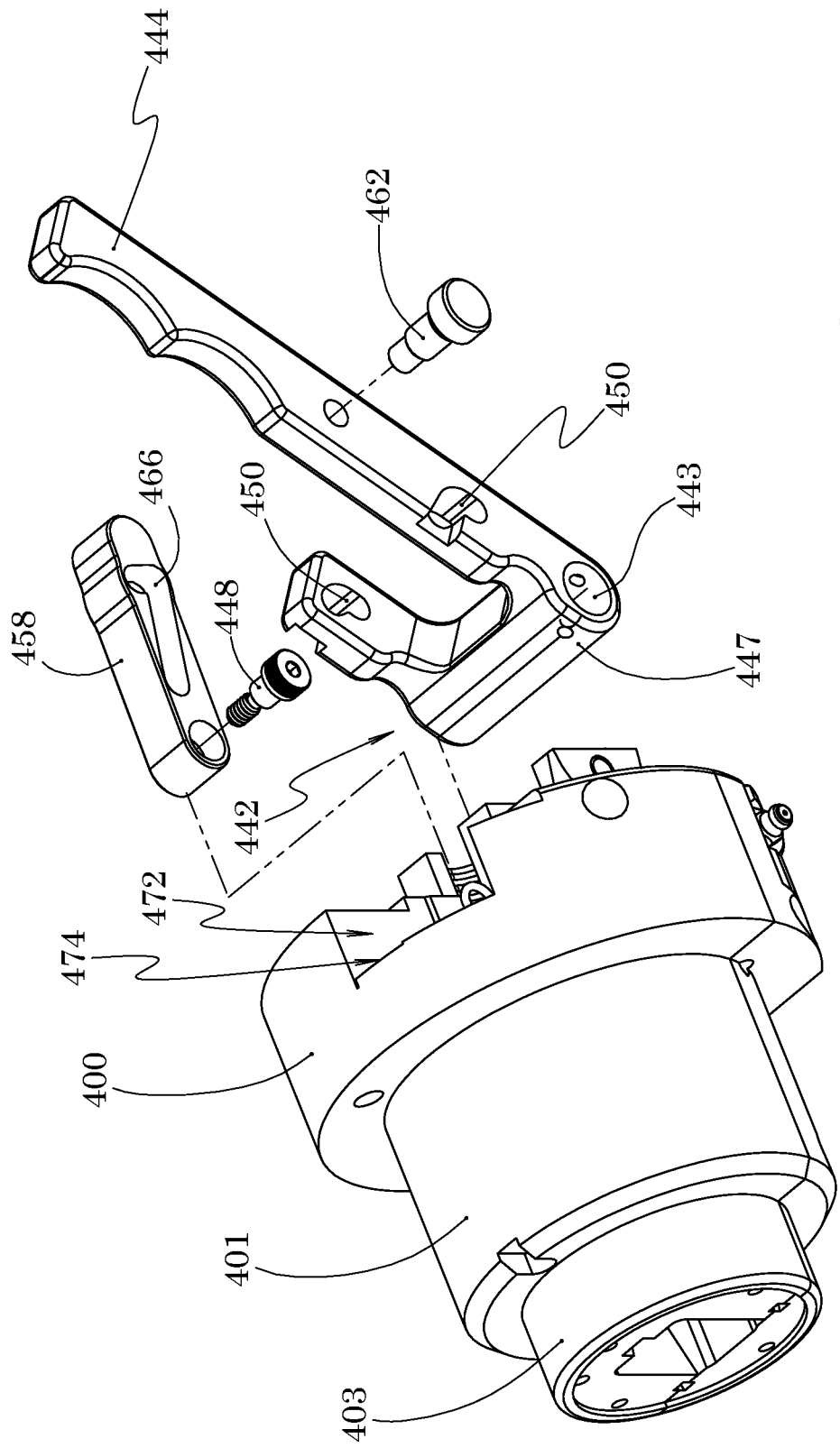
FIG. 13 is an exploded view of a rear release latching assembly.
Figure 14:
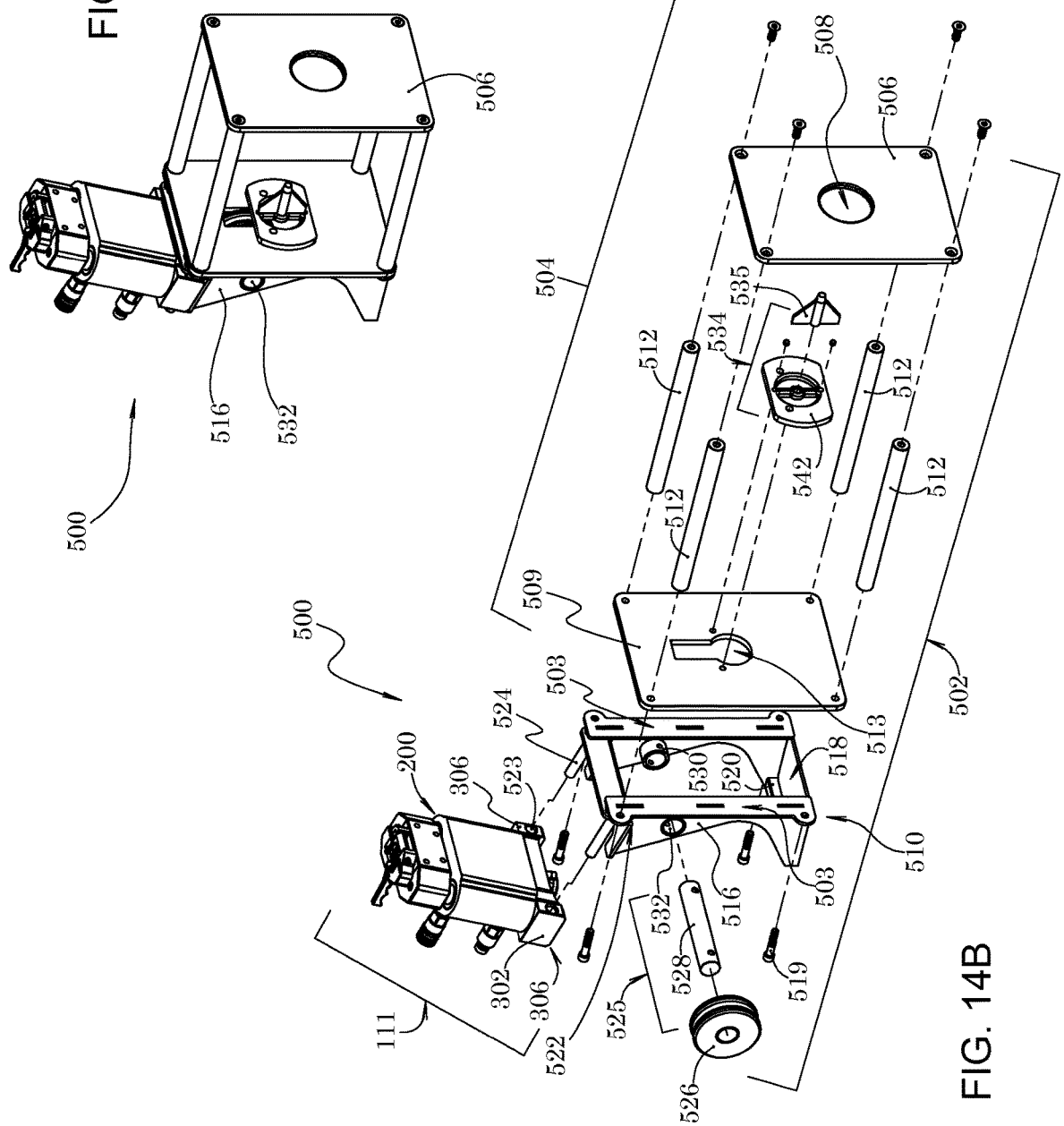
FIGS. 14A and 14B are assembled (14A) and exploded (14B) views of a pipe extraction chassis and pulling apparatus.
Figure 15:
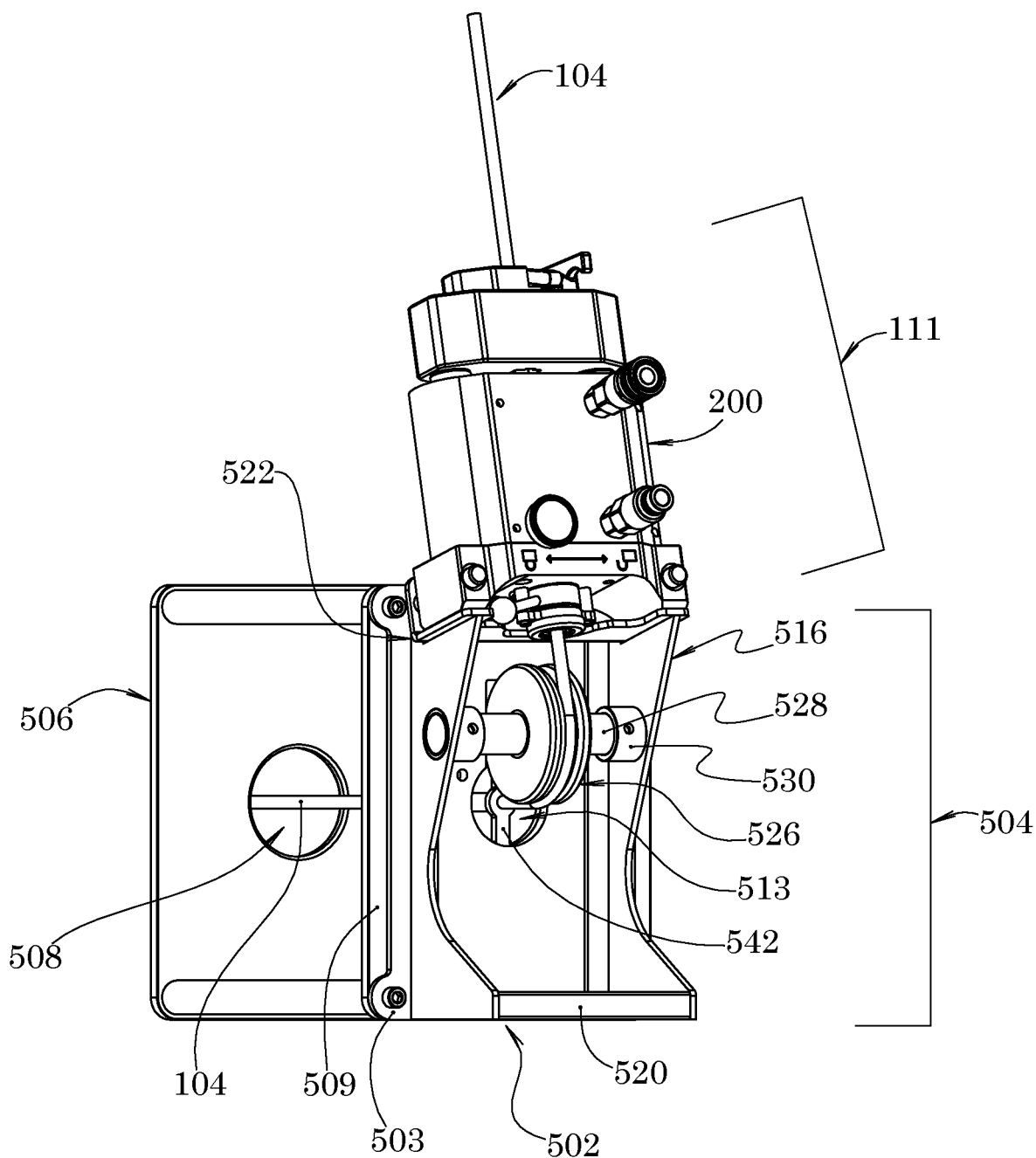
FIG. 15 is a rear view of a pipe extraction pulling apparatus.
Figure 16:
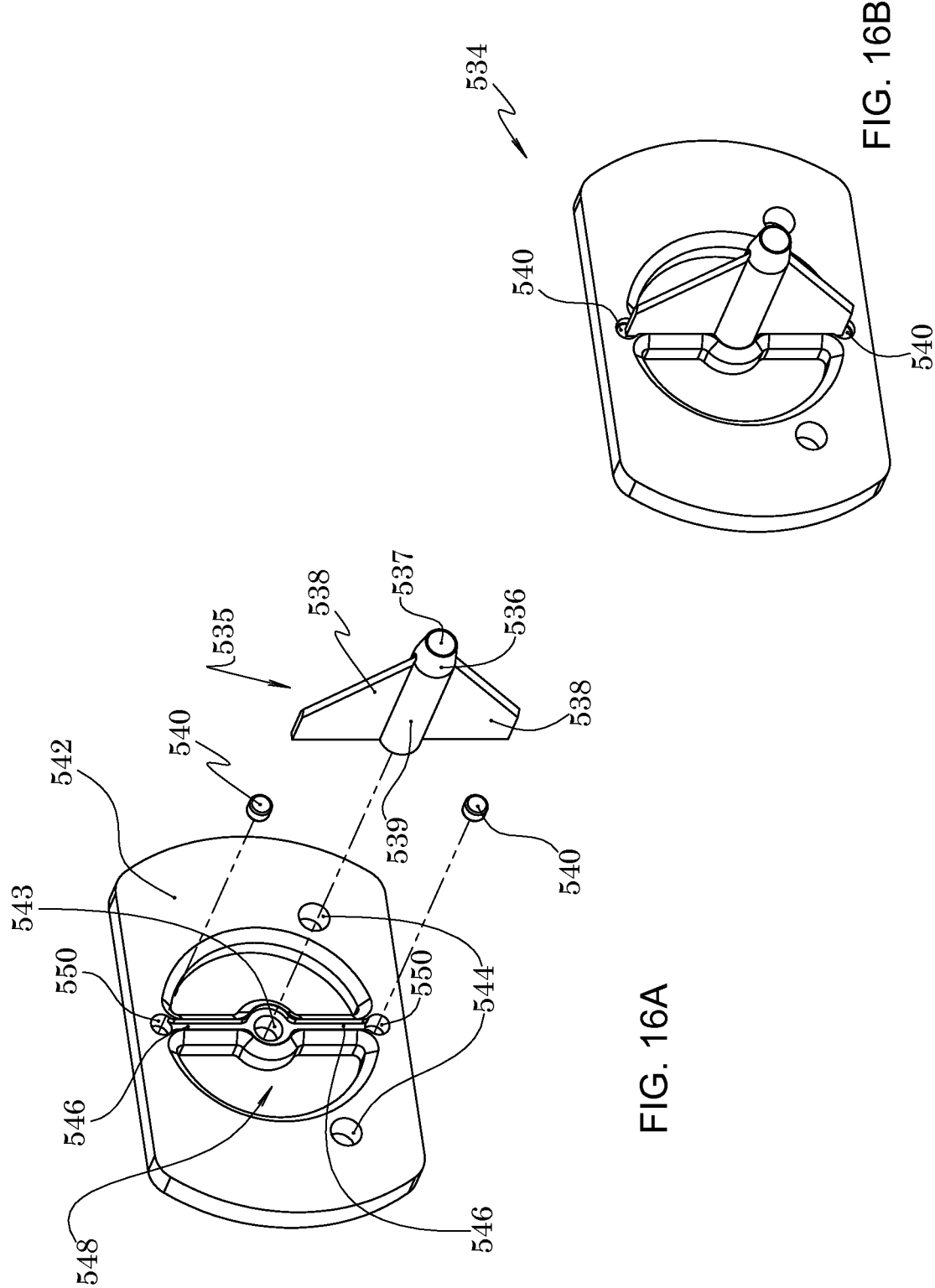
FIGS. 16A and 16B are exploded (16A) and assembled (16B) views of a pipe splitter tool.

Rear gripper and cable release assembly 138 having utility for a single cylinder assembly 114 can include a housing 402, which may include a top portion 404 and a bottom portion 406, wherein bottom portion 406 is attached to top portion 404 by any standard means, including, for example, bolts 409 (see FIGS. 12C, 12D). If desired, positioning dowels 407 also can be used to advantage. In another embodiment, top portion 404 and bottom portion 406 may be a single integral unit. Housing 402 further can include an axial opening 480 through which cable 104 (not shown) can pass. Housing 402 also can include an anterior end 398 and a posterior end 399. Posterior end 399 includes a quick release latch assembly described in detail below.

In the single cylinder system, housing 402 can be substantially cylindrical in shape and dimensioned to fit through the posterior axial opening of piston rod 118 and into piston rod cavity 139 (see, e.g., FIGS. 4B and 5A, 5B, 5C). In one embodiment, illustrated in FIGS. 11A, 11B, housing 402 can be press-fit to the piston rod 118 inner surface. In another embodiment, the outer surface of housing 402 can include a first cylinder portion 403 and a second cylinder portion 401 posterior to first cylinder portion 403, with first cylinder portion 403 having a smaller diameter than second cylinder portion 401 such that the two cylinder portions are stepped relative to one another. In this embodiment piston rod 118 can include a circumferential protrusion or shelf protruding from its inner surface into cavity 139, to provide a girdle having an axial opening dimensioned to receive first cylinder portion 403 but not cylinder portion 401. The piston girdle and stepped cylinder portions 401 and 403 together can provide additional points of contact between piston rod 118 and rear gripper assembly housing 402, for additional support and stability if desired.

Figure 5C:
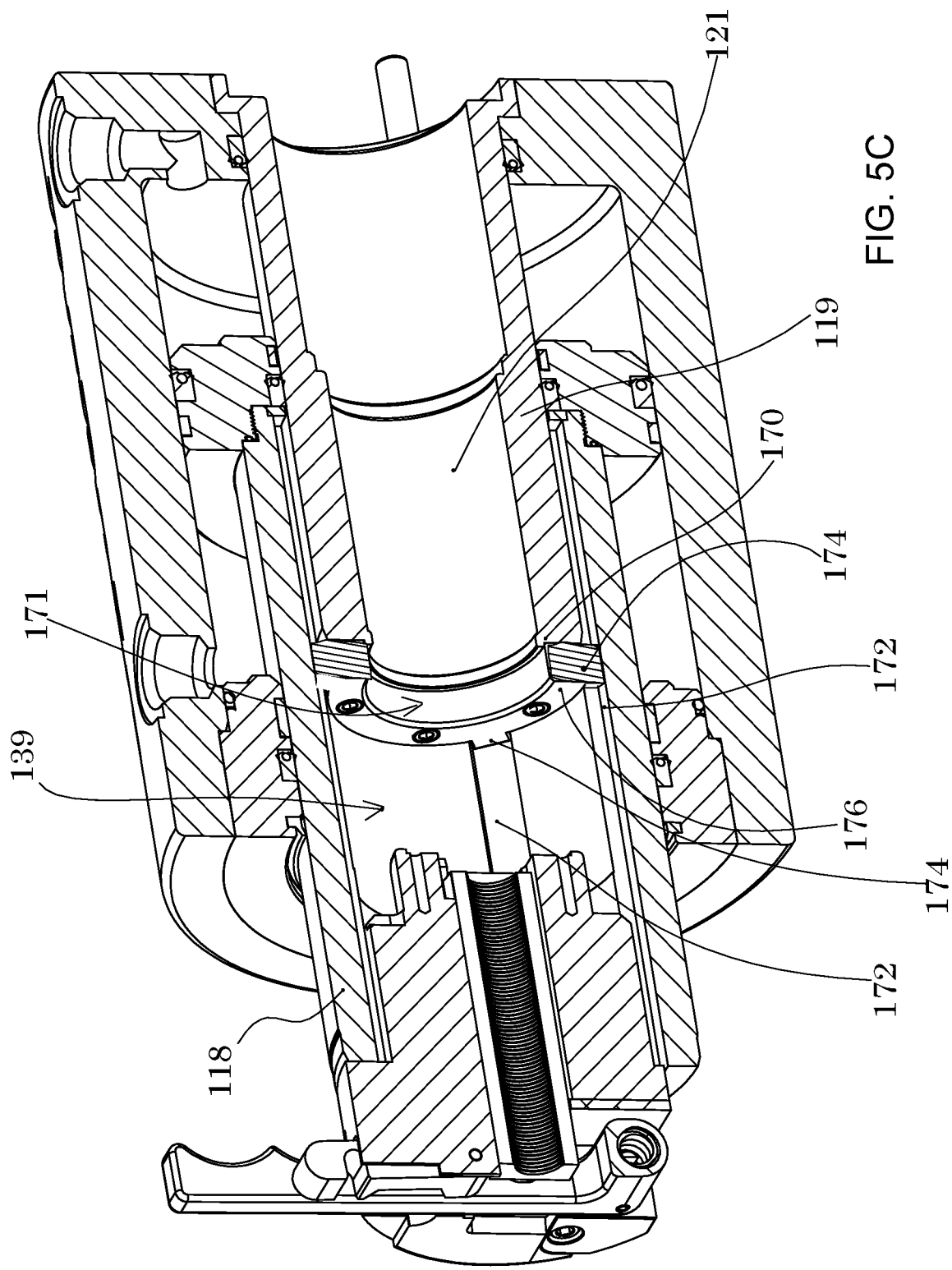
FIGS. 5A and 5B are a general view (5A) and a cross section view (5B) of a single cylinder piston assembly with attached front and rear gripping manifolds.

In the embodiment where single cylinder piston assembly 114 includes an internal anti-rotation means, the annular perimeter of anti-rotation keyed plate 176 can be dimensioned to fit into the outer surface stepped junction between cylinder portions 401 and 403 (see, e.g., FIGS. 5A, 5B, 5C).

In another embodiment, housing 402 can include a third cylinder component 400 posterior to cylinder 401 and which includes a quick release latch assembly 129 described in detail below. The outer surface of third cylinder component 400 can have a diameter larger than second cylinder component 401, such that cylinder components 400 and 401 are stepped relative to one another the step or junction can act as a lip. In another embodiment, the outer perimeter of posterior cylinder component 400 can be dimensioned to substantially match the outer diameter of piston rod 118 such that cylinder component 400 abuts the posterior end of piston rod 118 as a lip when housing 402 is inserted into piston rod 118, providing points of contact for additional stability if desired.

Housing 402 can include an inner cavity accessible through axial opening 480 and dimensioned to receive a rear pulling gripper 414. Gripper 414 preferably comprises a plurality of member pieces 418 that fit together to define a hollow gripper having an inner surface 419 that defines an axial hole or channel of a dimension and texture competent to engage a pulling cable surface 104 (not shown) and bite into the cable. In one preferred embodiment, the inner surface or channel 419 is threaded such that the threads act like teeth to bite into the cable and the cable clamping gripper 414 acts as a clamping jaw or cable gripping jaw. In another embodiment, gripper 414 includes two gripper member pieces 418. In another embodiment, member pieces 418 can include "square gripper" pieces. In another embodiment, member pieces 418 fit together to define a hollow, substantially triangular shaped gripper 414. In one embodiment, gripper member pieces 418 can have a substantially right-angled shape and gripper 414 can have an isosceles triangular shape. In another embodiment, housing cavity 405 can include a corresponding triangular shaped cavity. In addition, the gripper 414 outer surface and cavity 405 inner surface can include one or more coupling or interconnecting means for guiding the axial directional movement of gripper member pieces 418 in cavity 405 during the cable pulling operation. In one embodiment, the interconnecting means can: (1) guide directional movement of gripper 414 forward during the piston pulling stroke so gripper inner surface 419 can engage cable 104; and (2) guide directional movement of gripper 414 rearward during the piston recovery stroke so gripper inner surface disengages from cable 104. Use of a means for guiding gripper 414 in and out of position can improve efficient cable pulling function. Useful interconnecting means between gripper 414 and cavity 405 can include one or more ribs and channels, keys and key plates, grooves and ridges, sleeves or slots and ribs, and the like.

In one embodiment, gripper member 418 can include a ridge or key 422 configured to fit into a channel or groove or key plate 410 in the housing cavity 405 inner surface. In one embodiment, ridge 422 protrudes up from the top surface of gripper member 418, and groove or slot 410 defines a directional channel in the top inner surface of cavity 405. In another embodiment, opposing outer lateral sides 413 of gripper 414 can function as ribs, configured to fit into opposing channels or slots 411 in the left and right sides of the cavity 405 inner surface. In one embodiment, the bottom of housing cavity 405 also can include a recess or channel 412 along its longitudinal axis. In another embodiment, the bottom inner surface of cavity 405 is substantially flat. As will be appreciated by those having ordinary skill in the art, various configurations of interconnecting grooves or slots and rib or ridges or keys can be configured to advantage, provided that the interlocking mechanism allows gripper 414 to travel unrestricted, and the path can move gripper in and out of cavity 405. In addition, the selected slope of the gripper 414 lateral sides and the cavity 405 lateral sides will depend on the length of gripper 414 selected and the size of housing cavity 405.

Rear gripper assembly 138 also can include means for modulating directional movement of rear pulling gripper 414 during piston operation. In particular, means can be provided for modulating the degree of gripper member 418 rearward directional movement in cavity 405 during a piston recovery stroke. In one embodiment rearward directional movement of gripper member 418 during a piston recovery stroke can be modulated by a spring-loaded levering mechanism 427.

One embodiment of a spring-loaded levering mechanism 427 is illustrated in FIGS. 11A-11D, 12A-12D, 13 and 24. In the figures, pulling gripper 414 includes means for coupling to a torsion spring that limits rearward movement of gripper members 418. In one embodiment, gripper members 418 can include a pin 426. In another embodiment, gripper member 418 can include a protrusion 424 extending rearward from the member 418 lateral angled edge, and pin 426 extends inward from the protrusion at a substantially perpendicular angle, toward the gripping surface of member 418. Pin 426 advantageously can provide means for a spring-loaded mechanism to removably attach to gripper member 418. In one embodiment a spring-loaded mechanism can be provided by a torsion spring 432. Torsion spring 432 can include a spring 433 typically flanked at its ends by torsion spring pins 434 and grease zerks 436.

In one embodiment torsion spring 432 is coupled to a lever component 442 that removably couples to gripper pin 426. In another embodiment lever component 442 is a substantially U-shaped member having two laterally opposed arms 444 and 445, the arms being connected to one another by means of a bridging spanner 447. Each arm 444 and 445 can include means for removably catching or clasping or otherwise coupling to gripper pin 426. In a preferred embodiment, the position of the catching means on each arm and the distance between the arms of lever component 442 are configured such that each arm and its corresponding pin catching means are aligned with a gripper pin 426. In one embodiment, the gripper pin catching means on lever arms 444 and 445 can include a hollow or recess or slot 450 in the lever arm that begins at the lever edge that contacts gripper pin 426 and extends at least partway into the lever arm body. In another embodiment, the hollow or slot 450 follows a lateral path in from the lever edge and then curves downward substantially at least 90 degrees for a distance. In still another embodiment, slot 450 curves downward at least about 100 degrees. In another embodiment slot 450 has vertical "kidney-shape" or "bean-shape" appearance. It will be appreciated by those having ordinary skill in the art that slot 450 can include a recess in the lever arm or comprise a complete cutout in the lever arm.

In another embodiment, torsion spring 432 can couple to lever component 442 at bridging spanner 447. In particular, bridging spanner 447 can have a substantially hollow interior and axial openings 443, dimensioned to receive torsion spring 432. To activate the torsion spring in lever component 442, at least one end of torsion spring 432 is attached to a stationary surface and at least one end of torsion spring 432 also attaches to lever component 442. In a preferred embodiment both ends of torsion spring 432 also attach to a stationary surface. In another preferred embodiment, one end of torsion spring 432 attaches to bridging spanner 447 of lever component 442. Pins 431 are exemplary means for attaching torsion spring 432. Once torsion spring 432 is attached as described herein, movement of lever component arm 444 or 445 about the spring axis will have a spring-loaded tension.

In one embodiment, the stationary surface to which the torsion spring and lever component 442 can attach advantageously can be a hinge block 428. In one preferred embodiment, hinge block 428 can include two lateral opposing protrusions 438 extending rearward from the block and defining a gap or slot 440 dimensioned to receive lever component 442 and torsion spring 432. In another embodiment, hinge block protrusions 438 also can include lateral openings configured to align with bridging spanner axial openings 443 and through which torsion spring 432 can pass to enter the bridging spanner hollow interior. As will be appreciated by those having ordinary skill in the art, hinge block 428 can be an independent unit that can be removably coupled to rear assembly housing 402 as illustrated here, or it can be an integral element of housing 402. Where hinge block 428 is an independent component it can be attached to housing 402 by any standard means known in the art, such as by bolts 431. In one preferred embodiment, hinge block 428 can fit into a recess or gap in housing 402 posterior end so that the overall cylindrical shape of housing 402 and cylinder component 400 is maintained.

During cable pulling operation, the piston rod 118 pulling stroke pulls the attached rear gripper housing 402 rearward, and rear gripper members 418 are pulled forward along their grooved or keyed pathways into the housing tapered cavity and onto the cable surface. Lever gripper pin slots 450 are engaged with gripper pins 426 and lever arms 444 and 445 are in a vertical position with little or no torsion on torsion spring 432.

During the piston rod recovery stroke, piston rod 118 moves forward along with attached gripper housing 402, moving housing tapered cavity away from gripper 214, and gripper members 418 are free to move rearward along their channelled or keyed pathways and off the cable surface. As gripper members 218 move rearward, gripper pins 246 move along the path of engaged pin slot 450, pushing the corresponding lever arm rearward and engaging the torsion action of torsion spring 432. Engaged torsion action allows lever arms 444 and 445 to modulate the speed and distance attached rear gripper members travel rearward during the recovery stroke and keep them substantially in position for travelling forward again along their keyed paths and re-engaging again with the cable surface during the subsequent power stroke.

The rear pulling assembly described herein works in tandem with holding gripper system described above for pulling cable through a piston assembly. In particular, when piston rod 118 is traveling rearward during the power stroke, attached rear gripper housing also travels rearward forcing gripper 414 further into the taper cavity and onto the cable surface. The rearward pulling action on the cable pulls front holding gripper 214 rearward and out of its tapered cavity, so cable is free to move rearward. During the piston recovery stroke, attached rear gripper housing 402 travels forward, releasing gripper 414 from the tapered cavity and off the cable surface. This action allows cable to slide forward, which pushes front holding gripper forward into its tapered cavity and back onto the cable surface to hold the cable until piston rod 118 begins its next power stroke.

A latching mechanism now will be described for easily releasing rear gripper 414 from pulling gripper assembly 138. Once the cable pulling operation is complete, the cable needs to be disengaged from the pulling system 100. This process requires ensuring rear gripper 214 is off the cable surface and out of the way when the cable is extracted. The latching system described hereinbelow provides a quick, simple and reliable means for: (1) ensuring rear cable gripper members 218 are disengaged from the cable surface, and (2) removing gripper members 218 from the assembly without requiring additional tools. Means are provided for releasing lever slot 450 from gripper member pin 426 and holding lever 442 in an open, disengaged position so that rearward movement of gripper members 218 is no longer modulated or inhibited. In this position, gripper members move freely rearward along their keyed or channel paths and slide rearward at least partially out of housing cavity 405 where they can be accessed and removed. In one embodiment lever slot 450 can be released from gripper pin 426 by means of a latching mechanism that engages lever 442.

In one embodiment a latch 458, attached to housing 402, is configured to removably engage with at least one arm, referred to herein as trigger arm 444, of U-shaped lever 442. In one preferred embodiment latch 458 can rotate about its attachment axis. It will be appreciated by those having ordinary skill in the art that either arm 444 or 445 can be configured as the trigger arm. Also as will be appreciated by those having ordinary skill in the art, many standard means for attaching latch 458 to housing 402 are known and include, without limitation, a thumb screw or shoulder bolt 448 and O-ring. In another preferred embodiment latch 458 is attached to the housing 402 outer surface on its posterior face, at a location above housing cavity 405. In another preferred embodiment, the outer surface of housing 402 can include a slot or gap 472 having a side wall to which latch 458 is attached, and front wall 474 that latch 458 can be rotated to and stored when not in use. In another embodiment front wall 474 can include a forward-angled or beveled surface. In another embodiment trigger arm 444 can have a length sufficient to extend up to latch 458 attached to housing 402 so that latch 458 can couple with and engage a pin 462 on a surface of trigger arm 444. In another embodiment, trigger arm 444 can include one or more indentations 452 configured for easy gripping.

Housing surface gap 472 also can be configured to include a recess into which trigger arm 444 can pass when piston rod 118 is retracted into piston assembly 114. In another preferred embodiment, latch 458 can include a slot or hollow or groove 466 dimensioned and configured to catch or clasp or otherwise removably couple trigger arm latch pin 462. In another embodiment latch slot 466 can engage pin 462 when latch 458 is rotated into a substantially horizontal position and trigger arm 444 is at least partially extended. In another embodiment, latch slot 466 includes an angled path sufficient to hold lever pin 462 engaged and trigger arm 444 in an open, extended position in spite of the torsion imposed on trigger arm 444 by torsion spring 432 to return to a vertical position. In this position, gripper 414 is free to move rearward its channelled path and out of cavity 405.

In the embodiment illustrated herein, lever arm 444 is the trigger arm and includes latch pin 462 on its interior lateral surface. Latch 458 is attached to the left lateral wall of slot 472 on housing surface 402, when viewing the assembly rearward. In the illustrated embodiment, latch slot 466 is configured on the interior lateral surface of latch 458. As will be appreciated by those having ordinary skill in the art, other configurations of trigger arm 444 and latch 458 are contemplated and are within the skill of the art to create, given the present disclosure.

Dual System

As is evident from the figures, the rear gripper assembly mechanism and components are substantially the same for both a single and dual cylinder piston assembly. Dual cylinder piston rear gripper assembly 210 comprises a housing 482 that can include an anterior end 398 and a posterior end 399. In one embodiment, housing 482 can include laterally opposed protrusions 484 dimensioned and configured to fit into and movably slide in frame side panel slots 146.

VIII. Small Diameter Pipe Extraction Chassis

In some instances existing underground pipe can slide out with the cable during the cable pulling process and into the exit pit where the cable pulling system is located. This is particularly evident when smaller diameter pipes, such as 2-inch or 1-inch water or electrical pipes are being replaced. When existing pipe gets co-extracted or co-extruded, it needs to be removed from the cable exit area so that it does not interfere with the cable pulling process. Typically, an operator stands by and cuts or splits the extracted cable. This process can be cumbersome, slow and dangerous for an operator. When the cable pulling system includes a laterally positioned piston assembly positioned at the cable exit site in the pit, effectively removing extruded pipe can be difficult.

A pipe extraction chassis and cable pulling system are disclosed herein that (1) keeps the piston assembly elevated, in a substantially vertical position, away from the cable exit opening during the pulling operation and without the need for bolting the assembly into position, and (2) splits extracted or extruded cable as it exits the ground, without requiring operator participation. Other advantages of the pulling system include that it provides an adjustable chassis whose length can be varied according to desired pit dimensions, and it does not require bolting of the piston assembly to the chassis to hold the piston assembly in place. The system is compact and easy to use in small spaces. While the pipe extraction chassis and cable pulling system disclosed herein has particular application when small diameter pipe, such as, for example, 2-inches or less, is being replaced, those skilled in the art will appreciate it has utility in any application where underground pipe may be extracted during a cable pulling or replacement pipe operation and may need to be split.

Referring now to FIGS. 14A, 14B, 15, 16A and 16B, a pipe extraction pulling system 500 is shown. The system 500 can include a cable pulling apparatus 502 which can pull cable 104 and an attached bursting head and replacement pipe (not shown). The pipe extraction cable pulling apparatus 502 can include a piston assembly 111 and pipe extraction chassis 504. In the embodiment illustrated, the piston assembly is a closed path dual cylinder assembly 200. Chassis 504 provides an adjustable frame for holding a piston assembly away from the cable exit. Pipe extraction chassis 504 can include faceplate 506, a back plate 509, side braces 512, and support truss plate 510, which components can be removably coupled with bolts 519. Faceplate 506 can include an opening 508 through which a cable, a bursting head or any extracted pipe (not shown) can pass. Backplate 509 also can include an opening 513 configured to align with faceplate opening 508 and through which at least a cable can pass. The length of side braces 512 can be selected to provide a desired open space into which split extracted pipe can accumulate (see below). The open space also can be used for bursting head and cable disengagement. The height of pipe extraction chassis 504 can be any desired height, provided sufficient clearance is maintained for functional cable pulling operation. Those having ordinary skill in the art can readily select a preferred height provided with this disclosure and the particulars of their cable pulling operation. In one embodiment, a useful pipe splitting chassis height can be in the range of less than about 24-inches. In another embodiment, useful height ranges can include about 14-20 inches. In another embodiment, useful pipe splitting chassis widths can be in the range of about 10-16 inches. In another embodiment, useful lengths can be in the range of about 16-30 inches. In another embodiment, a pipe splitting chassis 504 can have a weight of less than about 60 lbs.

Truss plate 510 can be dimensioned to provide additional support for frame 504 and to provide means for holding a piston assembly and cable pulley mechanism. Truss plate 510 can include a floor plate 518 and two laterally opposed vertical front braces 503 that can attach to backplate 509. A pulley mechanism 525 can be included on two laterally opposed side braces 516. In one embodiment side braces 516 have an angled or tapered width to reduce weight and for ease of handling. A lateral support bar 520 also can be included that spans the distance between side braces 516. Pulley mechanism 525 can include pulley 526 and pulley axle 528 dimensioned to pass through a central axial opening in pulley 526. Pulley mechanism 525 can be included on frame 504 by attaching to the inner-facing lateral surfaces of side braces 516 by standard means known in the art. In one embodiment, pulley mechanism 525 can be attached by means of bushing 530 which attaches to side brace 516 at opening 532 and couples to pulley axle 528. Depending on the dimensions of the pulley selected and its proximity to back plate 509, it can be desirable to include clearance for pulley 526 by creating an opening in backplate 509. In the illustrated embodiment, backplate opening 513 includes a keyhole-shaped opening, the upper portion of which is dimensioned to accommodate pulley 526.

In one embodiment, the vertical height of front brace 503 is greater than attached side brace 516 such that the top edge of side brace 516 and front surface of front brace 503 form a shelf 522 dimensioned to receive and hold a piston assembly. In another embodiment, the top edge of side brace 516 can be angled to hold the piston assembly at an angle. Seating the piston assembly on shelf 522 having an angle less than 90 degrees can allow gravity to assist holding the assembly in place without the need for bolts or other attachment means that require tools to engage or disengage. Useful angle ranges for shelf 522 can be in the range of about 10-45 degrees. In one embodiment, the piston assembly includes dual cylinder assembly 200 and shelf 522 has an angle of in the range of about 15 degrees. As will be appreciated by those having ordinary skill in the art, useful shelf angles can vary depending on the piston assembly chassis dimensions selected, cable diameter, and chassis dimensions, for example. The piston assembly further can be removably held in place by cylinder assembly dowels 524 dimensioned and configured to access aligned openings 523 in the piston assembly. In one embodiment dowel openings 523 can be provided through the bottom surface of front gripper assembly manifold body 302. In the embodiment illustrated herein, dowel openings 523 advantageously can be provided through the bottom surface of laterally opposed front manifold protrusions 306 in piston assembly 200. It will be appreciated by those having ordinary skill in the art that other means of slidably interlocking or interconnecting a piston assembly to frame 504 are within the scope of the present disclosure. For example, piston assembly shelf can include side walls or side channels that accommodate manifold protrusions 306 or grooves or ridges made therein. Once the assembly and cable are in place, the cable pulling operation itself also can assist in holding the piston assembly in place due at least in part to the tension on the cable. In one embodiment, the lateral edges of pulley 526 can be bevelled, which can assist cable in staying in the pulley groove during the cable threading process at the start of a cable pulling operation.

Pipe extraction system 500 also can include a pipe splitter 534 assembly, illustrated in detail in FIGS. 20A and 20B. In one embodiment, pipe splitter assembly 534 includes means for splitting extracted pipe as it is extruded from a tunnel underground. Assembly 534 can include an axial opening dimensioned to allow passage of a cable therethrough, but not the extruded or extracted pipe. Pipe splitter assembly 534 also preferably can include means for easily engaging and disengaging the pipe splitter from the pipe extraction chassis without requiring tools.

Pipe splitter assembly 534 can include a pipe splitter 535 and attachment plate 542. Pipe splitter 535 can include a body 539 which can be substantially cylindrical in shape and can include a substantially hollow interior. Axial opening 537 is dimensioned to allow passage of a cable therethrough. Pipe splitter nose 536 can be dimensioned to fit inside the axial opening of an extruding pipe and guide it back towards one or more pipe splitting blades 538 disposed radially about the outer circumference of body 539. As cable is pulled rearward through pipe splitter axial opening 537, pipe splitter nose 536 can enter the axial opening of any extracted pipe that may accompany the cable. The rearward moving extruded pipe can be guided back along the outer surface of pipe nose 536 where blades 538 cut the rearward moving pipe. In one embodiment two blades are provided and the extruded pipe is split into two sections that splay out and away from the pipe splitter while the interior cable continues its rearward movement. In one embodiment nose 536 can have a tapered or angled outer surface, tapering towards axial opening 537. In another embodiment pipe splitter 535 can include a plurality of blades. In still another embodiment, the plurality of blades can be in the range of about 2-6. In the illustrated embodiment, two blades 538 are used to advantage. Those having ordinary skill in the art will appreciate that a greater or fewer number of blades also can be used to advantage, depending on the application and the diameter and type of extruded pipe to be split.

Pipe splitter 535 can be advantageously coupled to a surface by means of splitter attachment plate 542. Attachment plate 542 can include bolt holes 544 and an axial opening 543 configured to align with the posterior axial opening 537 of splitter body 539 such that cable being pulled through pipe splitter 535 can pass through attachment plate 542. In one embodiment, pipe splitter 535 can be fit into grooves or channels 546 in attachment plate 542 that are configured to fit distal ends of blades 538 and splitter body cylinder 539 such that axial openings 537 and 543 are aligned and pipe splitter 535 extends perpendicularly out of the plane of attachment plate 542. In one embodiment, pipe splitter 535 can include two blades 538 laterally opposed from one another about splitter body 539 and coupling groove 546 can include a groove encircling axial opening 543 and extending out therefrom in two directions that are 180 degrees opposed. In another embodiment, splitter 535 can be held in position on attachment plate 542 by means of one or more magnets 540 competent to attract and hold a metal portion of splitter 535. In still another embodiment, magnets 540 can be embedded in recesses 550 on attachment plate 542 such that they are flush with the attachment plate surface. At least one magnet can be used to hold splitter 535 to plate 542, and a plurality also are envisioned. In the embodiment illustrated here, two magnets 540 are used. As will be appreciated by those having ordinary skill in the art the number of magnets selected will depend on the magnetic strength desired and the size and weight of the pipe splitter assembly, all of which can be determined without undue experimentation provided with this disclosure. Attachment plate also can include one or more openings 548 that can reduce plate weight and enhance maneuverabilty, and also means for split pipe sections to pass if desired.

IX. Rear Cable Release Pipe Bursting Head

Provided herein and illustrated in FIGS. 17-22 are improvements in small bursting head devices (suitable for 2-inch pipe diameter or less) and large bursting head devices (suitable for 3-inch pipe diameter or more). In these drawings, the tapered nose cone of a bursting head is designated as the forward or proximal end, and this same orientation applies to the bursting head components described hereinbelow. The bursting heads described herein share many of the features and advantages of the bursting head devices disclosed in US 2014/0241812, and include additional improvements to that disclosure. In particular, the devices disclosed herein provide an integrated cable gripping and release assembly 600 and mechanism. In one embodiment no tools are needed to operate the integrated mechanism.

Figure 17:
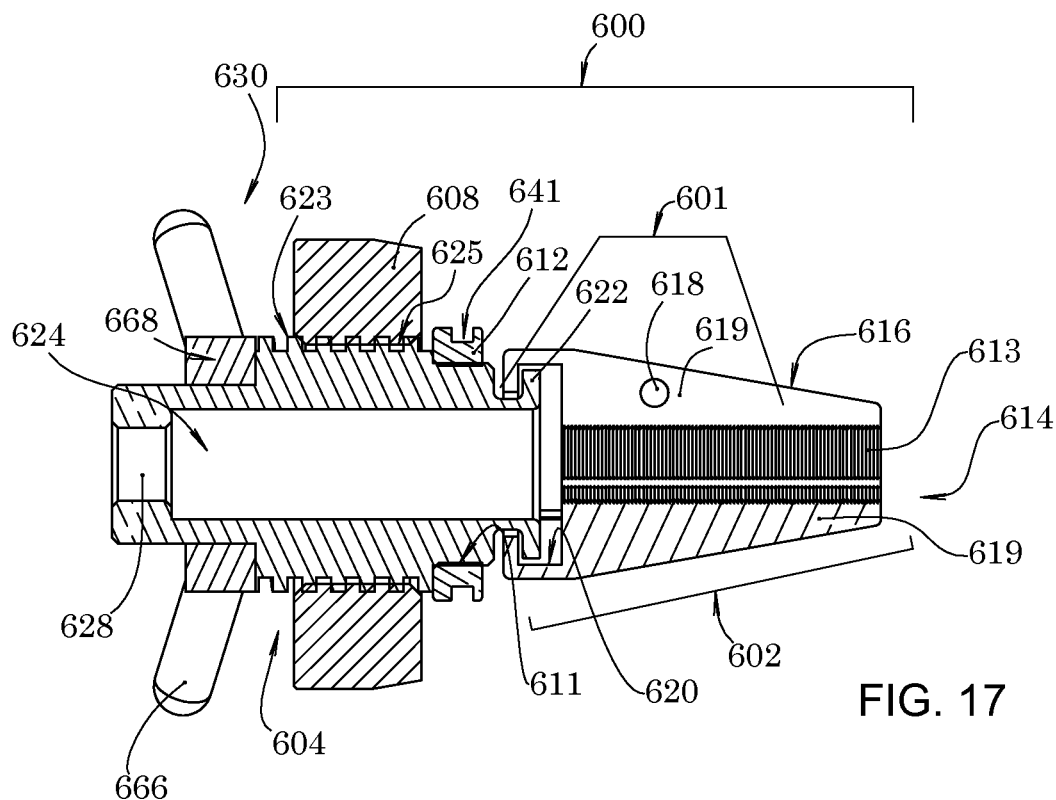
FIG. 17 is a cross-section of an integrated clamping jaw for a large diameter bursting head.
Figure 18:
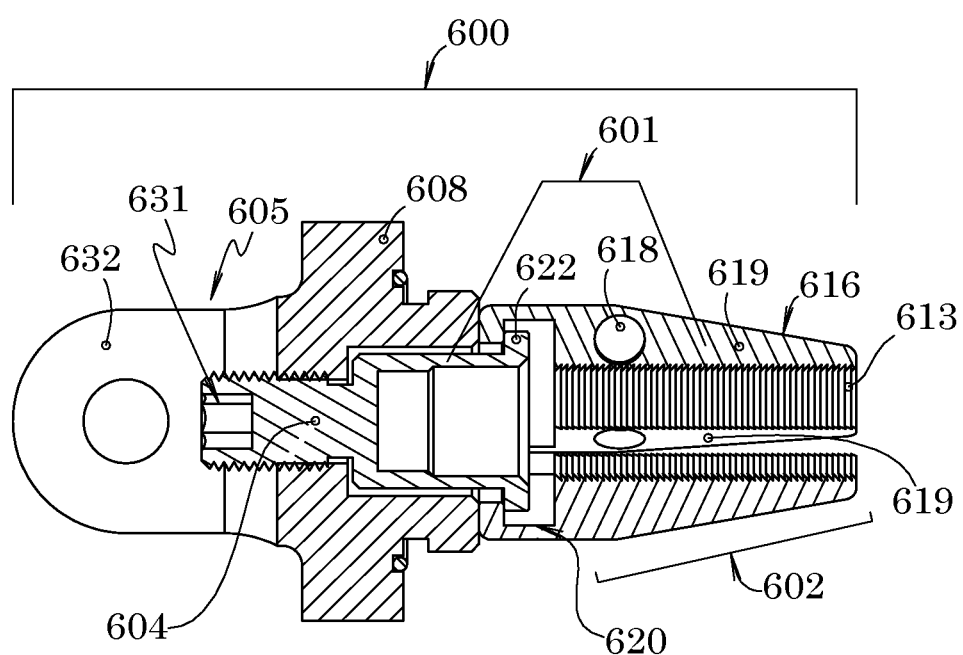
FIG. 18 is a cross-section of an integrated clamping jaw for a small diameter bursting head.

Referring first to FIGS. 17 and 18, two exemplary embodiments of an integrated cable clamping and release assembly 600 are illustrated for a large bursting head (FIG. 17) and a small bursting head (FIG. 18), respectively. Assembly 600 can include an integrated clamping jaw 601 comprising a cable gripper component 602 at its proximal end, and a plunger component 604 at its distal end, interlocked with cable gripper component 602. Integrated clamping jaw 601 also can include a central cavity 624 with an axial opening, and dimensioned to allow cable passage through cable gripper component 602 and into plunger component 604. In one embodiment cable can be fed into integrated clamping jaw 601 through axial opening 614 at the proximal end of cable gripper component 602. In one embodiment cavity 624 is closed at its distal end, and can provide a backstop for a free cable end. In another embodiment, cavity 624 can include a channel with an axial opening at its distal end, and a plug or screw 628 threaded into the distal axial opening can function as a cable backstop. In another embodiment, screw 628 can provide attachment means for a replacement pipe attachment mechanism. In one embodiment, the pipe replacement mechanism can include a clevis 632 and clevis pin 634. In another embodiment, screw 628 is a swivel screw and attachment to clevis 632 allows free rotation of clevis 632 about the screw axis.

Integrated cable clamping and release assembly 600 also can include means for moving integrated clamping jaw 601 forward or rearward in a bursting head along the bursting head's longitudinal axis so as to move cable gripper component 602 on or off a cable surface as desired. In one embodiment, integrated clamping jaw 601 longitudinal movement means can be provided by a backplate 608 configured to fit into the distal end of a bursting head cone 647 and to which integrated clamping jaw 601 can couple (see, e.g., FIG. 19). In another embodiment, integrated clamping jaw 601 longitudinal movement means can be provided by an endcap 605 configured to fit into the distal end of a bursting head cone 647 and to which integrated clamping jaw 601 can couple (see, e.g., FIGS. 20-21). In another embodiment particularly useful for small diameter bursting heads, endcap 605 can also function as a pipe replacement mechanism and can include a clevis 632.

In the embodiment where the means for moving integrated clamping jaw 601 forward or rearward in a bursting head is provided by backplate 608, coupling means can include coupling plunger component 604 to backplate 608. In another embodiment, backplate 608 has a central cavity 609 dimensioned to receive plunger component 604, and coupling means can include removably coupling the external surface of plunger component 604 with the inner surface of the backplate 608 cavity. In one embodiment, plunger component 604 can include external threads 623 that can couple with threads 625 on the inner surface of the backplate 608 cavity such that rotation of the plunger about its longitudinal axis will move integrated clamping jaw 601 forward or rearward, relative to backplate 608. The choice of thread form and thread direction can readily be determined by those having ordinary skill in the art. For example, for bursting heads where high strength may be desired, trapezoidal or Acme thread forms may be used to advantage. In addition, as will be appreciated by those skilled in the art, the preferred thread direction chosen will depend on the handedness of the lay cable selected. Preferably, the selected thread direction is the opposite of the cable handedness, to inhibit the natural tendency of cable to unwind during a cable pulling operation. Where a right-handed lay cable is used, for example, plunger external threads 623 can advantageously be left threading.

In the embodiment where the means for moving integrated clamping jaw 601 forward or rearward in a bursting head is provided by endcap 605 (FIGS. 18, 21-22), coupling means can include coupling plunger component 604 to endcap 605, preferably by threading plunger 604 into a threaded cavity in endcap 605 such that rotation of plunger 604 about its longitudinal axis will move integrated clamping jaw 601 forward or rearward, relative to endcap 605.

Integrated cable clamping and release assembly 600 movement means also can include an integrated element 630 that can be accessed by an operator to initiate longitudinal movement of clamping jaw 601 through backplate 608. In one embodiment, illustrated in FIGS. 17 and 19, integrated element 630 comprises a handle attached to the distal outer surface of plunger component 604. As will be appreciated by those having ordinary skill in the art, handle means are well characterized in the art, and a variety of suitable handles are contemplated and can be used to advantage provided with the present disclosure. In one embodiment, a protrusion or stem 670 can extend out from the distal end of plunger 604 and the handle means can be attached thereto. In the illustration, the handle means can include one or a plurality of spurs 666 that extend radially out from the outer surface of stem 670. In the figure, six spurs are provided, and a fewer or greater number also are contemplated. In another embodiment, spurs 666 can attach to plunger stem 670 by means of an annulus or cuff 668 having an inner circumference dimensioned to fit over the outer surface of plunger stem 670. In this embodiment, spurs 666 can extend radially from the outer surface of cuff 668. In another embodiment, cuff 668 can be press fit onto stem 670.

In another embodiment, integrated element 630 can include a receiver component 631 for a manually attachable handle. Use of a manually attachable handle can be advantageous for smaller diameter bursting head devices. In one embodiment, the receiver component 631 can include a hex screw that attaches to the distal end of plunger 604 or a plunger stem 670, and the manually attachable handle can include a key or allen wrench. Other manually attachable handles and handle receivers also are contemplated and are within the skill of the art to use, provided with the present disclosure.

Figure 22:
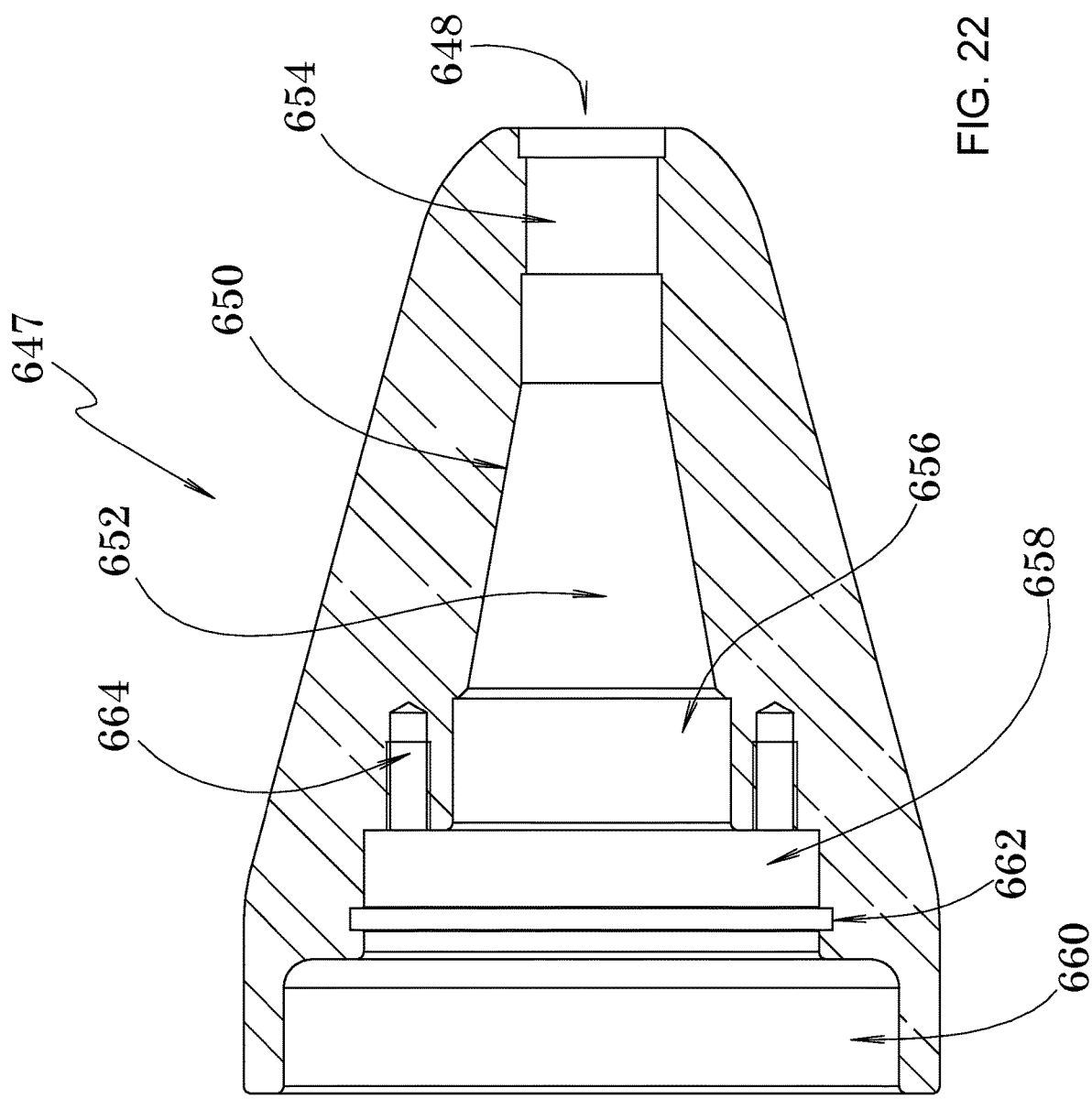
FIG. 22 is a cross-section of a large diameter bursting head cone.

As illustrated in FIG. 22, forward movement of clamping jaw 601 generally will be limited by contact of the gripper component tapered outer surface 616 with bursting head tapered inner surface 650. Integrated cable clamping and release assembly 600 also can include a stop ring 612 which functions to limit rearward movement of clamping jaw 601 in the bursting head. In one embodiment stop ring 612 can be an integral element of plunger component 604. In another embodiment, illustrated in FIGS. 17 and 19, stop ring 612 can comprise an independent element that includes a central axial opening dimensioned to fit over the outer surface of the plunger component 604 proximal end such that the inner circumference of stop ring 612 engages with a stop ring engaging surface 611 on at least a portion of the plunger component 604 outer surface. In another embodiment, engagement between stop ring 612 and the backstop engaging surface 611 on plunger component 604 can occur by mechanical coupling means, including by threading, for example. While threading is a preferred mechanical coupling means, those of ordinary skill in the art will appreciate that other coupling means known in the art could be used to advantage, provided with the present disclosure. Mechanical coupling of stop ring 612 to integrated clamping jaw 601 can allow an operator to vary the longitudinal travel distance of the integrated clamping jaw in a bursting head device. In another example, the outer surface of stop ring 612 can include a groove or channel 641 or other means for receiving a seal.

Figure 19:
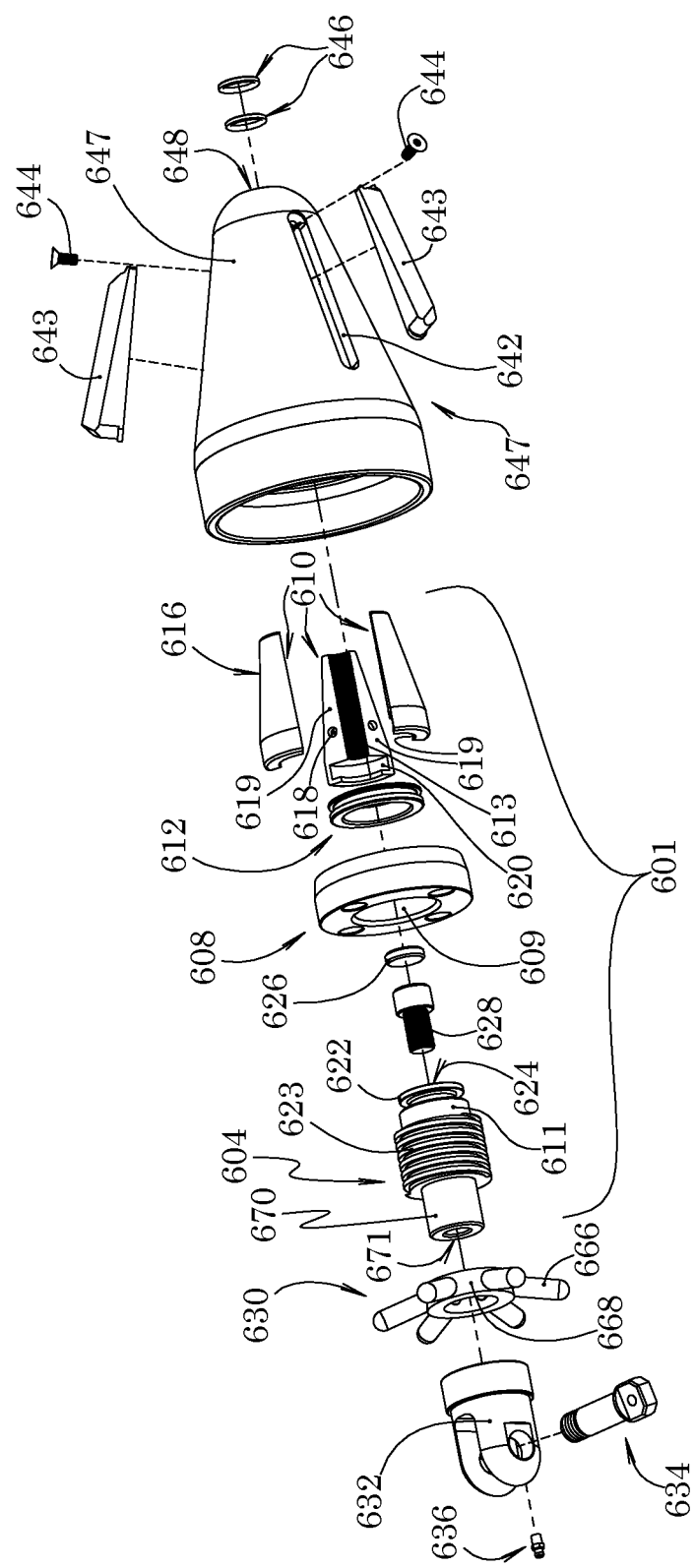
FIG. 19 is an exploded view of a large diameter bursting head device.

As will be appreciated by those having ordinary skill in the art, plunger component 604 can include a spacer section 670 between the back plate coupling means at its distal end and the gripper interlocking means at its proximal end. Spacer 670 can provide an additional means for modulating the longitudinal distance integrated clamping jaw 601 can travel. The length of spacer 670 will depend on the dimensions selected for other components of the bursting head device, including other components of the integrated cable gripping and release assembly. Spacer 670 can include a stop-ring engaging surface, as illustrated in FIGS. 17 and 19.

Gripper component 602 can comprise a plurality of member pieces 610 that are configured and function as sections 216 of holding gripper 214, described above. Key features include a tapered camming outer surface 616 that can engage a gripper housing tapered inner surface 650, in this case of a bursting head cone 647 (see FIG. 22); an interior concave surface 613 with barbs or ridges or teeth that can grip a cable; and aligned magnets 618 on each joining member surface, each magnet indexed such that adjoining magnets repel each other when two member joining surfaces are joined and the magnets are aligned. Gripper sections 610 further include means at their distal end for interlocking the proximal end of plunger 604 such that gripper component 602 and plunger 604 behave as a single unit throughout the cable pulling operation, particularly with respect to longitudinal movement of clamping jaw 601.

One embodiment of an interlocking means that can engage gripper component 602 and plunger component 604 of clamping jaw 601 is illustrated in FIGS. 17-21. In the example, the distal inner surface of gripper sections 610 can include a channel or groove 620 dimensioned to fit and interlock with a lip 622 extending laterally out from the proximal axial opening of plunger component 604. When gripper sections 610 come together to form gripper component 602, grooves 620 together form a recessed ring or channel around the interior circumference of gripper component 602.

One advantage of integrated clamping jaw 601 is that unintended or undesired longitudinal rearward movement of gripper component 602 during the cable pulling operation is substantially prevented as may happen, for example, due to an unanticipated jarring or jerking event to the bursting cone. This may occur for example, when a bursting head encounters an open lead joint. In prior art bursting heads, such an event could allow one or more gripper sections to momentarily move back and off the cable by, for example, causing a spring distal to the grippers to compress. When the gripper sections subsequently re-engage with the cable surface, cable alignment with the spring or the gripper sections could be altered and could impact efficiency of the cable pulling process. This undesired consequence is obviated by the present improvement which stabilizes and holds gripper section longitudinal positioning substantially immobile throughout a cable pulling operation.

Assembly and operation of the integrated cable gripping and release assembly in a bursting head device now will be described. An example of a 4-inch bursting head device is depicted in FIGS. 17, 19 and 22, and is representative of larger bursting head devices.

In one embodiment, spurs 666 can be attached to a cuff 668 and this assembly can be press fit onto a plunger stem 670. A replacement pipe attachment means 632 can be fit to the distal end of plunger 604 or stem 670 by providing screw 628 to replacement pipe attachment means 632 through plunger cavity 624 and distal axial opening 671 and threading it into a proximal opening in replacement pipe attachment means 632. Particularly where pipe attachment means 632 includes a clevis that can swivel about attached screw 632 inclusion of a grease zerk 636 can be advantageous. If desired, a pliable cable stop member 626 also can be provided to plunger cavity 624, proximal to screw 628. Cable stop member 626 can be made out of rubber or a flexible polymer, and can provide a cushion that absorbs impact to the cable end during operation. Plunger 604 then can be threaded into back plate 608 and stop ring 612 can be located at a desired position on plunger stop ring receiving surface 611 (and plunger spacer). Plunger lip 622 then can be set in gripper section groove 620. Advantageously, magnets 618 can hold gripper sections 610 together, slightly out of alignment with one another, for ease of insertion into the bursting head cone 647. Once inserted into cone 647, the tapered interior of the cone (see below) can force the sections into alignment.

Bursting head cone 647 has a tapered outer shape, where the proximal end is dimensioned to fit inside a pipe to be burst, and the distal end is dimensioned to exceed the pipe diameter so that, as the bursting head is pulled through the pipe, the distal end of bursting head cone 647 bursts or breaks apart the pipe. Bursting head cone 647 also can include one or more pipe splitting blades 643 that can removably attached to the cone's outer surface with, for example, screw 644. In one embodiment blades 643 can fit in one or more blade grooves 642 configured on the cone 647 outer surface. In another embodiment, blades 643 can be integral to the cone head outer surface.

Cone 647 also can include an axial opening 648 through which a free end of a cable to be pulled can pass, and can include an internal cavity 652 dimensioned to receive the integrated gripper and release assembly described. In particular, bursting head cone 647 includes a tapered cavity dimensioned to accommodate gripper component 602, the inner surface 650 of the tapered cavity providing a camming surface for gripper section tapered outer surface 616, and the angle of the tapered cavity being sufficient to align the gripper section joining members and substantially inhibit their forward movement. Distal to gripper cavity 652 are: cavity 656 dimensioned to receive plunger 604; cavity 658, dimensioned to receive stop ring 612; cavity 662, dimensioned to receive a seal; and cavity 660, dimensioned to receive backplate 608. In one preferred embodiment, cavity 660 is dimensioned such that backplate 608 is recessed in bursting cone head 647. In another embodiment, cavity 660 is dimensioned such that both backplate 608 and integrated handle element 630 are recessed in bursting head cone 647. Bursting head cone 647 also can include means for bolting backplate 608 to the cone. Bursting head axial opening 648 also can include a channel or cavity 654 dimensioned to receive one or more O-rings 646 to inhibit entry of debris or liquid into the bursting head cone interior.

Once the assembly described above is inserted in cone 647, backplate 608 is bolted into the cone at bolt positions 664. Integrated clamping jaw movement means handle 630 can be turned in the appropriate direction to move clamping jaw 601 as far back as stop ring allows so cable can be inserted. In this position, gripper members are pulled back from the proximal end of taper cavity 652 and aligned magnets 618 repel joining member surfaces 619 away from each other and off the central axis, allowing a cable to be threaded into the cavity. Handle 630 then can be turned to move clamping jaw 601 forward until the front end of tapered cavity 652 prevents further forward movement. In this position, gripper sections 610 are forced down onto the cable surface. The cable pulling operation now can begin. At the end of the operation, handle 630 can again be turned to pull plunger component 604 and interlocked gripper component 602 back, creating space for magnets 618 to repel joining member sections 610 away from each other and off the cable surface, and cable can be released.

Figure 20:
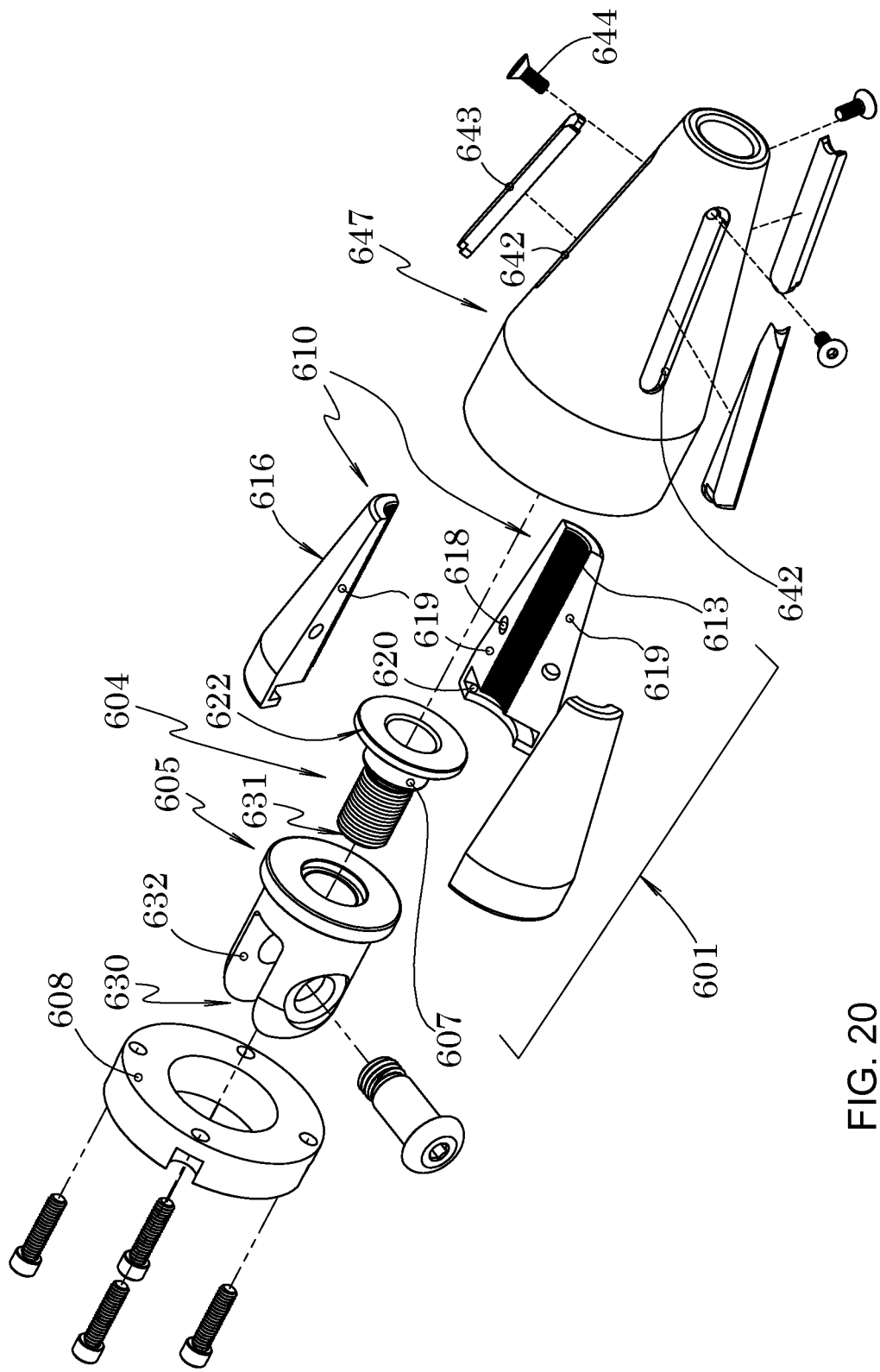
FIG. 20 is an exploded view of one small diameter bursting head device.
Figure 21:
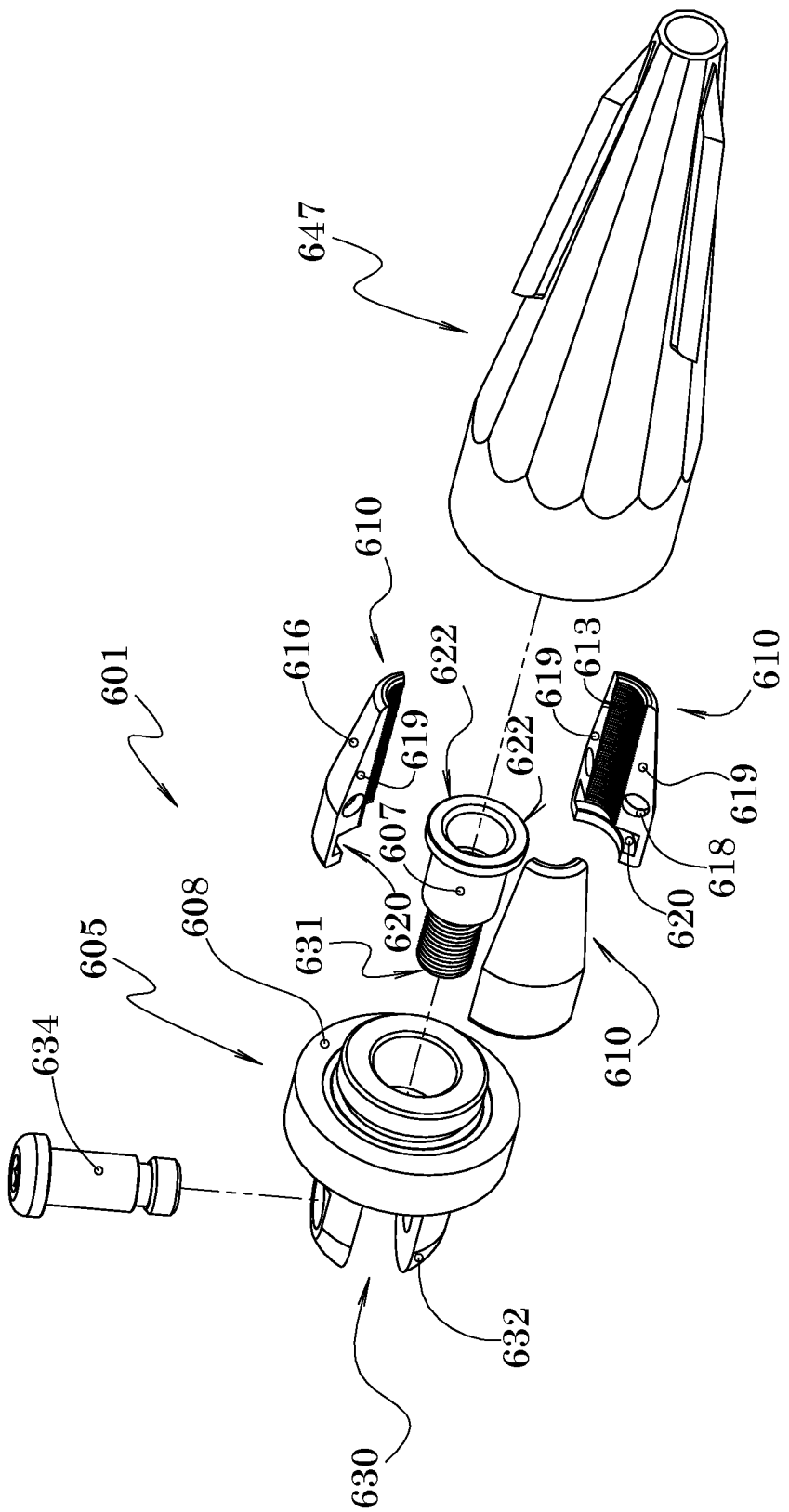
FIG. 21 is an exploded view of another small diameter bursting head device.

Assembly of an exemplary 2-inch bursting head is illustrated in FIG. 20, and assembly of an exemplary 1-inch bursting head device is illustrated in FIG. 21. In these examples, replacement pipe attachment means 632 can be a clevis, which may or may not swivel. As described above, in these embodiments replacement pipe attachment means 632 is integral to endcap 605, and endcap 605 also provides the longitudinal movement means for integrated clamping jaw 601. The distal end of plunger component 604 can be threaded into the cavity of endcap 605, and plunger lip 622 can be interconnected with gripper sections 610 by means of grooves 620. This assembly then can be inserted into bursting head cone 647, which has a substantially hollow tapered interior, providing substantially the same function as tapered cavity 652 in FIG. 22. The assembly can be secured by means of a backplate 608. Backplate 608 can be bolted into position as illustrated in FIG. 20, or can be integral to endcap 632 and, for example, threaded into or otherwise couple with, bursting cone 647, as illustrated in FIG. 21. Bursting head cutting blades 643 can be integral to the cone body (FIG. 21) or removably attached (FIG. 20). In these embodiments longitudinal movement of clamping jaw 601 can be initiated by means of an integrated element 630 accessible from the distal end of endcap 605 and associated with plunger 604. In these examples, integrated element 630 includes a receiver 631 having an outer, engagable surface accessible from the distal end of endcap 605.

X. Sealed Cable Ends

In the operation of cable pulling systems and pipe replacement operations it can be advantageous to provide cables with a sealed free end. One advantage of such cable is that the sealed free end facilitates cable threading, for example into a bursting head. Another advantage is that the sealed end inhibits the tendency of a cable end to fray, unwind or otherwise have its structural integrity compromised as a result of use. In the art, free cable ends can be sealed by, for example, crimping, cauterizing or soldering. Disclosed herein is a sealing method having particular advantage in cable pulling operations. Advantages of the sealed cable ends provided herein include ease of manufacture, sealed end uniformity, enhanced strength and durability, and provide for a fabricator to form a cable seal with a desired dimension and shape.

Figures 23A, 23B:
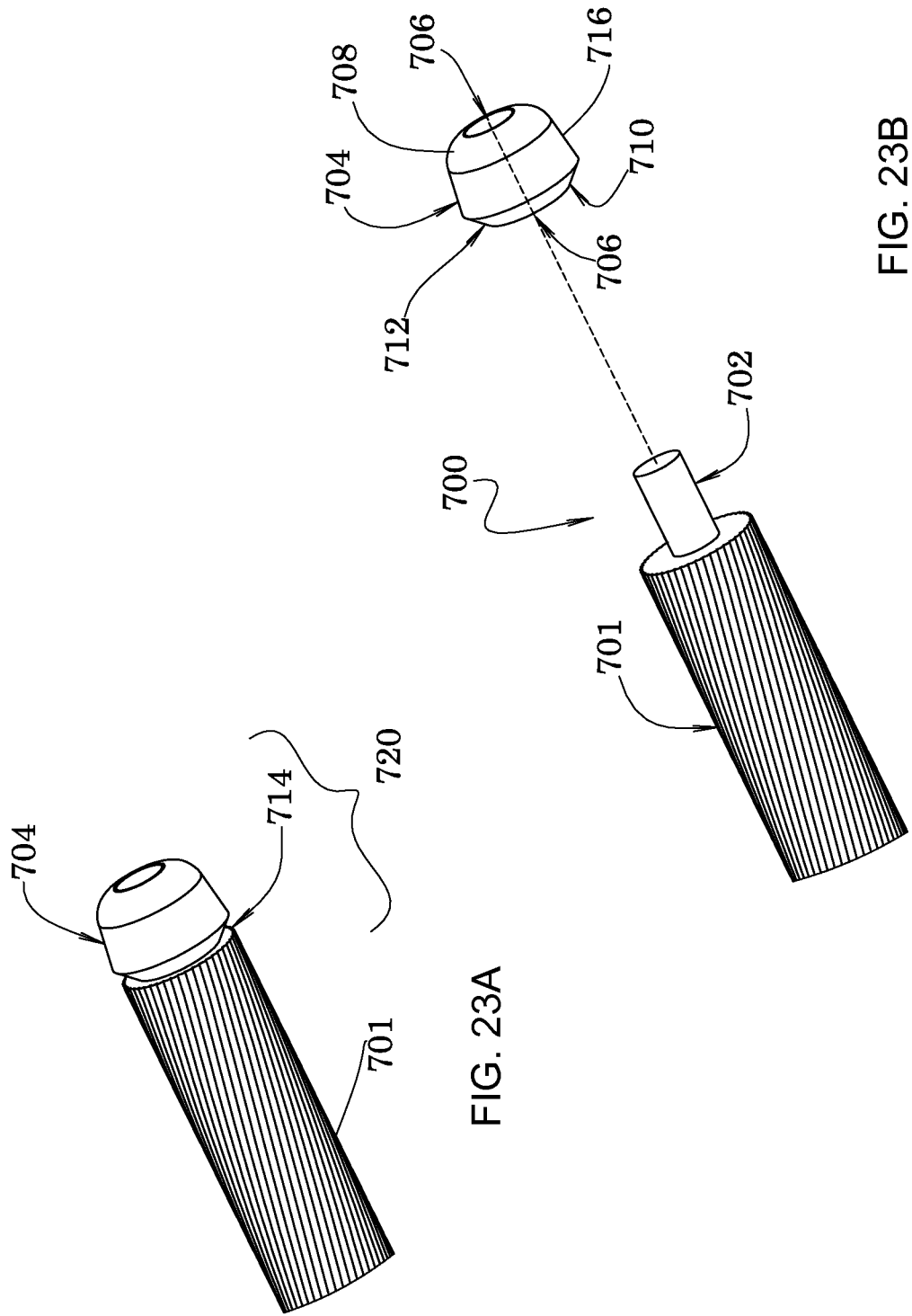
FIGS. 23A and 23B are assembled (23A) and exploded (23B) views of a sealed cable end.
Figure 24:
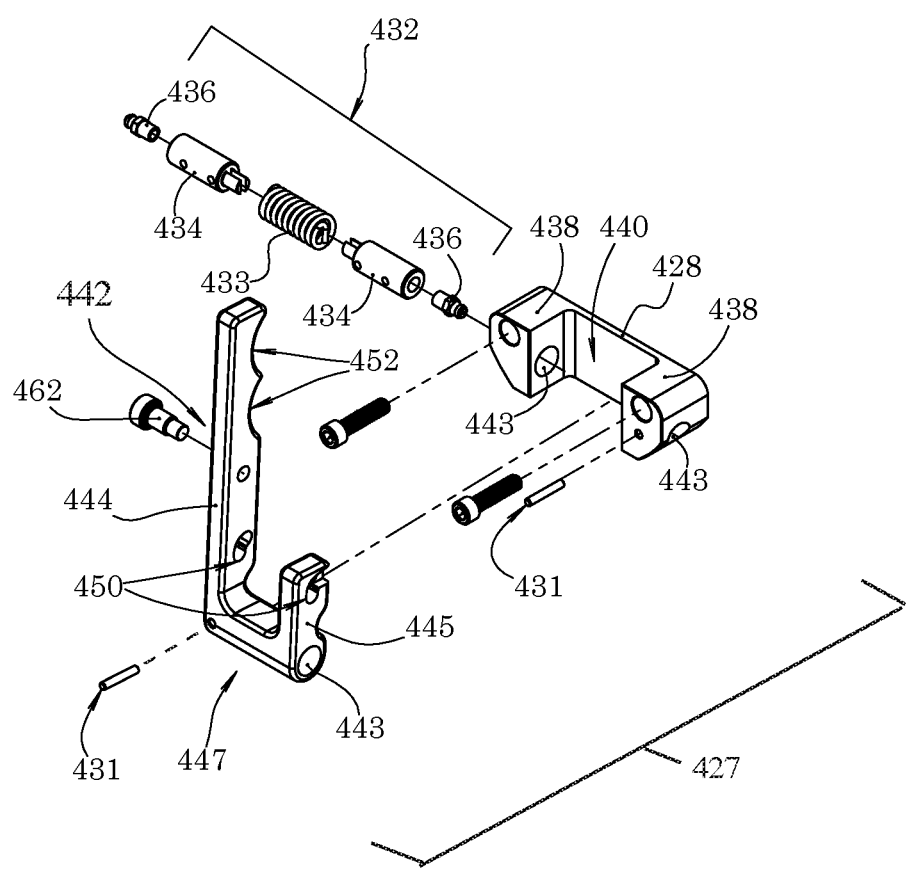
FIG. 24 is an exploded view of a rear gripper latching mechanism.

FIGS. 23A and 23B illustrate one embodiment of a free cable end seal 720. In the method, an outer edge of a cable free end 700 is cut away to expose a stem 702, having a smaller diameter than that of cable body 701. In one embodiment, the stem can be exposed by girdling the cable perimeter at a desired position distal to the cable end, thereby removing a portion of the cable outer perimeter to reveal the stem. A cuff 704, having a substantially hollow interior dimensioned to receive stem 702, then can be placed on the cable end by inserting stem 702 through the cuff's distal axial opening 706. Melted solder or other liquid bonding material then is provided to the cuff/cable interface 714 to secure cuff 704 to stem 702. In one embodiment, melted solder infiltrates interface 714 and cuff distal axial opening 706 to penetrate the cuff interior, providing solder to at least part of stem 702 and the interior cavity of cuff 704 and securing stem 702 to the cuff interior as the solder cools. In another embodiment, solder penetrates the length of the cuff interior cavity.

One embodiment of a cuff 704 is illustrated in the figure. As will be appreciated by those having ordinary skill in the art, other cuff shapes are contemplated and can be configured without undue experimentation provided with the present disclosure. In one embodiment cuff 704 can be substantially cylindrical in shape. In another embodiment, cuff 704 can be tapered from its distal end to its proximal end. Its proximal edge 708 also can be rounded or beveled, for ease of threading the cable end into a channel or orifice, for example. In another embodiment, a substantially flat distal cuff end 710 in provided, maximizing contact between cuff end 710 and the cable body 701 at interface 714. In another embodiment, the transitional edge 712 between cuff end 710 and cuff side 716 can include a bevel or chamfer or can be otherwise sloped. As will be appreciated by those having ordinary skill in the art, the choice of materials, length of stem 702, and dimensions and shape of cuff 704 can be varied as desired for different cable uses.

XI. Method of Operation

One method of performing a pipe busting operation now will be described. The method can include attaching a bursting head to a replacement pipe to be installed. For example, this can include assembling a bursting head of a desired diameter as described above and attaching by standard means a replacement pipe to a clevis 632 extending from the bursting head's distal end. One cable free end, which can include an end seal 720 as described above, can be attached to the bursting head. For example, bursting head integrated movement initiator handle 630 is rotated to move integrated clamping jaw 600 rearward and gripper sections 610 back and away from the interior axial channel. The sealed free cable end is inserted into bursting head axial opening 648 and gripper axial opening 614 until it reaches the bursting head interior cable backstop. Integrated movement initiator handle 630 then is rotated in the opposite direction to move integrated clamping jaw 600 forward such that gripper sections move forward into the bursting head tapered cavity 652 and down onto the cable surface. The cable is now engaged with the bursting head.

The other free end of a cable 104, which also can include an end seal 720, can be inserted through an underground pipe to be replaced and exit the pipe through a wall of an exit pit where a cable pulling apparatus is provided. For example, chassis 110, assembled as described above, can be provided with a laterally positioned piston assembly 111, for example closed path dual piston assembly 200. Dual assembly forward manifold 160 protrusions 306 can be inserted into chassis slots 146 and the piston body can rest on chassis track 147. Chassis pins 153 can be inserted through manifold protrusion pin holes 307 and into rear chassis pinholes 152. The free cable end can be provided to chassis 110 through faceplate opening 142 in faceplate 140 which abuts the exit pipe wall such that faceplate opening 142 aligns with the exit pipe opening.

Front manifold lever 310 can be moved into the unlocked position so piston assembly 200 can receive the cable end. Moving lever 310 into the unlocked position moves threaded piston 308 rearward into threaded insert 314 and pushes holding gripper 214 rearward and away from its tapered cavity confinement, compressing spring 218 in the process. Repelling magnets 223 keep gripper member pieces 216 back and away from the axial channel.

Rear pulling grippers can be placed in a cable receiving position by pulling trigger lever 444 rearward and moving latch 458 into position on lever pin 462 to hold lever 444 in an open position. This action can allow holding gripper 414 to move rearward along channels 410 providing a space for cable to pass through.

The free cable end can be inserted into the piston assembly through front manifold axial opening 304, through interior piston channel 206 and exit the piston assembly through rear gripper housing axial opening 480. The cable can be held in position for pulling by releasing latch 458 and returning it to its resting position in slot 472, and moving lever 310 on front manifold assembly 160 into the locked position. Moving lever 310 into the locked position moves threaded piston forward, decompressing spring 218 and pushing gripper 214 forward into the housing tapered cavity and onto the cable surface. The cable pulling apparatus now is ready for operation.

The pistons then can be actuated back and forth using standard hydraulic controls and pull cable through the assembly as described above. Once the bursting head reaches the faceplate, front manifold lever 310 can again be moved into the unlocked position, and rear assembly latch 458 engaged with trigger arm pin 462 to disengage cable. Chassis pins 153 can be extracted from their pin holes and piston assembly 200 can be moved forward so manifold pin holes 307 align with font chassis pin holes 150, and pins 153 reinserted. Front manifold lever 310 can again be moved into a locked position and rear assembly latch released from pin 462 and returned to its resting position. Pistons can again be actuated to pull the bursting head into the chassis interior. Bursting head integrated handle 630 then can be rotated to move integrated clamping jaw 600 distally relative to the bursting head tapered cone and releasing the cable end inside. Front manifold lever 310 once again can be moved into the unlocked position and latch 458 engaged with pin 462. The cable now can be extracted forward from the bursting head, through piston assembly channel 206 and out front manifold axial opening 304. The bursting head can be released from the an attached replacement pipe by removing clevis pin 634 from clevis 632.

In the example where a pipe extraction chassis is used, cable attachment to a bursting head and piston assembly can be the same as described above. In this method, a pipe extraction chassis can be provided to an exit pit. Dual piston assembly 200 for example can be provided to the chassis by inserting chassis dowels 524 into piston assembly dowel openings 523 on the assembly's front manifold protrusions. Pipe extraction chassis faceplate can abut the exit pipe pit wall with faceplate opening 508 aligning with the exposed pipe end. Pipe splitter 534 can be provided to chassis backplate 509 such that pipe splitter axial opening 537 aligns with backplate opening 513. One free end of a cable can be attached to a bursting head as described above. The other end can be threaded through the underground pipe to be replaced and passed through faceplate opening 508, through pipe splitter axial opening and backplate opening 513. Cable then can be pulled over pulley 526 and inserted into the piston front manifold axial opening 304 and passed through the assembly as described above. The piston actuated cable pulling operation can proceed as described above. As pipe gets extruded from the exit pipe opening, pipe splitter nose 536 can engage the pipe and guide it back to be split by blades 535. Split cable pieces can fall away from the chassis backplate 509 and into the exit pit for later collection.

Embodiments of this disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes that come within the meaning and range of equivalency of the claims are therefore intended to be embraced therein. While illustrative embodiments have been illustrated and described, it will be appreciated that various changes can be made therein without departing from the spirit and scope of the disclosure.

The embodiments of the invention in which an exclusive property or privilege is claimed are defined as follows:

1. An integrated cable clamping and release mechanism useful in a bursting head device comprising a substantially hollow cone body having an axial opening at an anterior end for receiving a free cable end, an annular posterior opening, and a tapered interior surface, the mechanism comprising:
   (a) a gripper component comprising a plurality of gripper members that together define a longitudinal axial bore for receiving and engaging a cable, each member having an inner surface radius defining a fraction of a bore circumference, an outer camming surface for engaging said cone body tapered interior surface, an anterior end aligned with said cone body anterior end, and a posterior end comprising a coupling means;
   (b) a rigid tubular component having an axial cavity dimensioned to receive the cable, an outer surface comprising external threads, an anterior end configured to removably engage each said gripper member posterior end coupling means, and a posterior end comprising actuator engage means; and
   (c) an annulus comprising means for engaging said cone body posterior opening, and an inner threaded circumference dimensioned to receive and engage said tubular component outer surface external threads, such that:
      when said tubular component anterior end is coupled to said gripper component member posterior end coupling means, said gripper member axial bore is aligned-in line with said tubular component axial cavity,
      said tubular component outer surface is engaged with said annulus inner circumference by said external threads,
      said annulus is engaged with said cone body posterior opening,
      the cable is disposed in said cone body axial opening, gripper member axial bore and tubular component axial cavity,
      and an actuator means competent to cause axial rotation of said tubular component engages said tubular component posterior end engagement means,
      rotation of said tubular component in one direction by said actuator means initiates movement of said coupled gripper members forward into said cone body and onto said cable, and rotation of said tubular component in a reverse direction initiates movement of said coupled gripper members rearward and off said cable.

2. The mechanism of claim 1 wherein said tubular component proximal end engages said gripper member posterior end coupling means by means of an interlocking lip and groove.

3. The mechanism of claim 2 wherein said gripper member posterior end coupling means defines said groove, dimensioned to engage said lip extending perpendicularly from said tubular component anterior end.

4. The mechanism of claim 1 wherein said actuator means is integral to said tubular component posterior end.

5. The mechanism of claim 1 wherein said actuator means comprises a rotatable handle.

6. The mechanism of claim 1 wherein said wherein said actuator means comprises a hex screw.

7. The mechanism of claim 1 wherein said gripper members further comprise adjoining surfaces having an indexed magnet embedded therein and competent to repel a magnet on an adjoining surface.

8. The mechanism of claim 1 further comprising means for limiting rearward movement of said tubular component.

9. The mechanism of claim 8 wherein said rearward movement limiting means comprises a radial extension at said tubular component anterior end having a circumference greater than said annulus inner circumference.

10. The mechanism of claim 9 wherein said radial extension is manually positionable.

11. A bursting head device comprising:
   (a) a substantially hollow cone body having an axial opening at an anterior end for receiving a free cable end, an annular posterior opening, and a tapered interior surface;
   (b) gripper component comprising a plurality of gripper members that together define a longitudinal axial bore for receiving and engaging a cable, each member having an inner surface radius defining a fraction of said bore circumference, an outer camming surface for engaging said cone body tapered interior surface, an anterior end aligned with said cone body anterior end, and a posterior end comprising a coupling means;
   (c) a rigid tubular component having an axial cavity dimensioned to receive the cable, an outer surface comprising external threads, an anterior end configured to removably engage each said gripper member posterior end coupling means and a posterior end comprising actuator engagement means, and;
   (d) an annulus comprising means for engaging said cone body posterior opening and an inner threaded circumference dimensioned to receive and engage said tubular component outer surface external threads, such that
      when said tubular component anterior end is coupled to said gripper component member distal end coupling means, said gripper member axial bore is aligned-in line with said tubular component axial cavity,
      said tubular component outer surface is engaged with said annulus inner circumference by said external threads, said annulus is engaged with said cone body distal opening, and an actuator means competent to cause axial rotation of said tubular component engages said tubular component distal end engagement means, and the cable is disposed in said cone body axial opening, gripper member axial bore and tubular component axial cavity,
      rotation of said tubular component in one direction initiates movement of said coupled gripper members forward into said cone body and onto said cable, and rotation of said tubular component in a reverse direction initiates movement of said coupled gripper members rearward and off said cable.

12. The bursting head device of claim 11 wherein said tubular component proximal end engages said gripper member posterior end coupling means by means of an interlocking lip and groove.

13. The bursting head device of claim 11 wherein said gripper member posterior end coupling means defines said groove, dimensioned to engage said lip extending perpendicularly from said tubular component anterior end.

14. The bursting head device of claim 11 wherein said actuator means is integral to said tubular component posterior end.

15. The bursting head device of claim 11 wherein said actuator means comprises a rotatable handle.

16. The bursting head device of claim 15 wherein said actuator means comprises a hex screw.

17. The bursting head device of claim 11 wherein said gripper members further comprise adjoining surfaces having an indexed magnet embedded therein and competent to repel a magnet on an adjoining surface.

18. The device of claim 11 further comprising an endcap comprising means for coupling to a replacement pipe.

19. The device of 86 wherein said replacement pipe coupling means allows rotation of said replacement pipe about said coupling means.

20. The device of claim 11 further comprising means for limiting rearward movement of said tubular component.

21. The device of claim 20 wherein said limiting means comprises a radial extension at said tubular component anterior end having a circumference greater than said annulus inner circumference.

22. The method of claim 21 wherein said actuator comprises a rotatable handle.

23. A method for pulling pipe through a tunnel underground, the method comprising:
   (a) providing a bursting head comprising:
      a substantially hollow cone body having an axial opening at an anterior end for receiving a free cable end, an annular posterior opening, and a tapered interior surface;
      a gripper component disposed in said hollow cone body and comprising a plurality of gripper members that together define a longitudinal axial bore for receiving and engaging a cable, each member having an inner surface radius defining a fraction of a bore circumference, an outer camming surface for engaging said cone body tapered interior surface, an anterior end aligned with said cone body anterior end, and a posterior end comprising a coupling means;
      a rigid tubular component having an axial cavity dimensioned to receive the cable, an outer surface comprising external threads, an anterior end coupled to said gripper member posterior end coupling means such that said gripper member axial bore is aligned-in line with said tubular component axial cavity, and a posterior end comprising actuator engagement means;
      an annulus coupled to said cone body posterior opening and comprising an inner threaded circumference engaged with said tubular component outer surface external threads,
      and replacement pipe coupling means extending rearward from said bursting head device;
   (b) providing the cable disposed in said tunnel and comprising a front free end and a back free end, said front free end attached to a cable pulling apparatus;
   (c) coupling a replacement pipe to said replacement pipe coupling means;
   (d) actuating axial rotation of said threaded tubular component to initiate rearward movement of said coupled gripper members in said cone body, said movement enlarging said gripper member axial bore to receive the cable;
   (e) inserting said cable back free end in said cone body anterior axial opening, through said enlarged gripper member axial bore and said tubular component axial cavity;
   (f) actuating axial rotation of said tubular component to initiate forward movement of said coupled gripper members into said cone body and onto said cable to engage said cable, and;
   (g) pulling said cable, together with said engaged bursting head device and coupled replacement pipe, through said tunnel by means of said cable pulling apparatus.

24. The method of claim 23 wherein said tubular component proximal end engages said gripper member posterior end coupling means by means of an interlocking lip and groove.

25. The method of claim 23 wherein said step of actuating axial rotation of said threaded tubular component occurs by means of an actuator integral to said tubular component posterior end.

26. The method of claim 23 wherein said step of actuating axial rotation of said threaded tubular component occurs by means of a hex screw operationally engaged with said threaded tubular component.

27. The method of claim 23 wherein said gripper members further comprise adjoining surfaces having an indexed magnet embedded therein and competent to repel a magnet on an adjoining surface.

* * * * *